United States Patent
Zane et al.

(10) Patent No.: US 10,277,041 B2
(45) Date of Patent: Apr. 30, 2019

(54) AUTONOMOUS BATTERY CONTROL AND OPTIMIZATION

(71) Applicants: Utah State University, Logan, UT (US); FORD GLOBAL TECHNOLOGIES, LLC, Dearborn, MI (US); ALLIANCE FOR SUSTAINABLE ENERGY, LLC, Golden, CO (US); THE REGENTS OF THE UNIVERSITY OF COLORADO, A BODY, Denver, CO (US)

(72) Inventors: Regan A. Zane, North Logan, UT (US); Michael Evzelman, Logan, UT (US); Daniel Costinett, Knoxville, TN (US); Dragan Maksimovic, Boulder, CO (US); Richard Dyche Anderson, Plymouth, MI (US); Kandler Smith, Golden, CO (US); Michael Scott Trimboli, Colorado Springs, CO (US); Gregory L. Plett, Colorado Springs, CO (US)

(73) Assignees: UTAH STATE UNIVERSITY, Logan, UT (US); ALLIANCE FOR SUSTAINABLE ENERGY, LLC, Golden, CO (US); FORD GLOBAL TECHNOLOGIES, LLC, Dearborn, MI (US); THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 127 days.

(21) Appl. No.: 15/224,123

(22) Filed: Jul. 29, 2016

(65) Prior Publication Data
US 2016/0336767 A1 Nov. 17, 2016

Related U.S. Application Data

(63) Continuation of application No. 14/591,917, filed on Jan. 7, 2015, now Pat. No. 10,063,066.
(Continued)

(51) Int. Cl.
H02J 7/00 (2006.01)
H02J 1/10 (2006.01)
H02M 3/335 (2006.01)

(52) U.S. Cl.
CPC ............ *H02J 7/0016* (2013.01); *H02J 1/102* (2013.01); *H02J 7/0021* (2013.01);
(Continued)

(58) Field of Classification Search
USPC ........................................................ 320/119
See application file for complete search history.

(56) References Cited

U.S. PATENT DOCUMENTS 5,264,777 A 11/1993 Smead
6,873,134 B2 3/2005 Canter
(Continued)

OTHER PUBLICATIONS

International Searching Authority, Notification of Transmittal of the Written Opinion of the International Searching Authority, or the Declaration, for PCT Application PCT/US2015/010537, dated May 11, 2015.
(Continued)

*Primary Examiner* — Robert Grant
(74) *Attorney, Agent, or Firm* — Kunzler, PC; Bruce R. Needham

(57) ABSTRACT

An apparatus includes a battery state module that determines a battery state of each of a plurality of battery cells forming a battery unit. A battery state includes a health of the battery cell. A battery state of a battery cell differs from a battery state of other battery cells of the battery unit. Each battery
(Continued)

cell is connected to a shared bus through a bypass converter that provides power from the battery cell to the shared bus. A charge/discharge modification module determines, based on battery state, an amount to vary a charging characteristic for each battery cell compared to a reference charging characteristic. Each charging characteristic varies as a function of a reference state. A charge/discharge module adjusts charging/discharging of a battery cell of the battery unit based on the charging characteristic of the battery cell.

31 Claims, 32 Drawing Sheets

Related U.S. Application Data

(60) Provisional application No. 61/924,644, filed on Jan. 7, 2014.

(52) U.S. Cl.
CPC .......... *H02J 7/0052* (2013.01); *H02J 7/0068* (2013.01); *H02M 3/33507* (2013.01); *H02J 2007/0059* (2013.01)

(56) References Cited

U.S. PATENT DOCUMENTS

| | | | |
|---|---|---|---|
| 7,605,492 | B2 | 10/2009 | Elder |
| 2002/0070705 | A1 | 3/2002 | Buchanan |
| 2005/0077867 | A1 | 4/2005 | Cawthorne |
| 2006/0033473 | A1 | 2/2006 | Stanzel |
| 2006/0097698 | A1 | 5/2006 | Plett |
| 2008/0042493 | A1 | 2/2008 | Jacobs |
| 2010/0013306 | A1 | 1/2010 | Heineman |
| 2011/0140536 | A1 | 6/2011 | Adest |
| 2012/0043923 | A1 | 2/2012 | Ikriannikov |
| 2012/0228931 | A1 | 9/2012 | Butzmann |
| 2012/0319657 | A1* | 12/2012 | Ke ................ H02J 7/0021 320/134 |
| 2013/0038289 | A1* | 2/2013 | Tse ................ H02M 3/158 320/118 |
| 2013/0144547 | A1* | 6/2013 | Yun ............... G01R 31/3624 702/63 |
| 2014/0042815 | A1 | 2/2014 | Maksimovic |
| 2014/0312844 | A1 | 10/2014 | Mercier |

OTHER PUBLICATIONS

Costinett, Daniel et al., Active Balancing System for Electric Vehicle with Incorporated Low Voltage Bus, DOI: 10.1109/APEC.2014.6803768 Conference: IEEE Applied Power Electronics Conference and Exposition APEC, Mar. 2014, pp. 3230-3236.

Zane, Regan et al., Robust cell-level modeling and control of large battery packs, AMPED Kickoff Meeting Slides, Jan. 8-9, 2013.

Zane, Regan et al., Robust cell-level modeling and control of large battery packs,ARPA-E Innovation Summit Posters, Feb. 2013.

Reham, M. et al., Modular Approach for continuous Cell-Level Balancing to Improve Performance of Large Battery Packs, IEEE Energy Conversion Congress and Exposition, Sep. 14-18, 2014, Pittsburgh, PA.

Zeng, Yu et al., An Active Balancing System for Lithium-Ion Battery Pack, Proceedings of the 2nd International Conference on Computer Science and Electronics Engineering, Mar. 22-23, 2013, Hangzhou, China.

Zane, Regan et al., Robust cell-level modeling and control of large battery packs, AMPED Annual Meeting: Government Panel Review, Jan. 9, 2014.

Zane, Regan et al., Robust cell-level modeling and control of large battery packs, AMPED Annual Meeting Review, Jan. 8, 2014.

Costinett et al ,Acitive Balancing System for Electric Vehicle with Incorporated Low Voltage Bus, DOI: 10.1109/APEC.2014 6803768 Conference: IEEE Applied Power Electronics Conference and Exposition APEC, Mar. 2014, pp. 3230-3236.

Zane et al., Robust cell-level modeling and control of large battery packs, AMPED Kickoff Meeting Slides, Jan. 8-9, 2013.

Zane et al., Robust cell-level modeling and control of large battery packs,ARPA-E Innovation Summit Posters, Feb. 2013.

Reham et al., Modular Approach for continuous Cell-Level Balancing to Improve Performance of Large Battery Packs, IEEE Energy Conversion Congress and Exposition, Sep. 14-18, 2014, Pittsburgh, PA.

Zeng et al., An Active Balancing System for Lithium-Ion Battery Pack, Proceedings of the 2nd International Conference on Computer Science and Electronics Engineering, Mar. 22-23, 2013, Hangzhou, China.

Zane et al., Robust cell-level modeling and control of large battery packs, AMPED Annual Meeting: Government Panel Review, Jan. 9, 2014.

Zane et al., Robust cell-level modeling and control of large battery packs, AMPED Annual Meeting Review, Jan. 8, 2014.

U.S. Appl. No. 14/591,917, filed Jan. 7, 2015, Office Action dated Jan. 30, 2017.

U.S. Appl. No. 14/591,917, filed Jan. 7, 2015, Office Action dated Nov. 24, 2017.

U.S. Appl. No. 15/224,275, Office Action dated Aug. 27, 2018.

J.L. Lee et al., Discrete-time realization of transcendental impedance models, with application to modeling spherical solid diffusion, Journal of Power Sources, Jan. 2012, pp. 367-377, vol. 206.

J.L. Lee et al., One-dimensional physics-based reduced-order model of lithium-ion dynamics, Journal of Power Sources, Aug. 2012, pages 430-448, vol. 220.

Stetzel et al., Electrochemical state and internal variables estimation using a reduced-order physics-based model of a lithium-ion cell and an extended Kalman filter, Journal of Power Sources, 2015, pp. 490-505, vol. 278.

Van Overschee et al., Continuous-time frequency domain subspace system identification, Signal Processing, 1996, Elsevier Science B.V., pp. 179-194, vol. 52.

\* cited by examiner

261

| Optical Data 262 |
| Cell Voltage 130 |
| Cell Current 109 |
| pH Data 264 |
| Strain Data 266 |
| Pressure Data 268 |
| Gas Composition Data 270 |

222

| Chemical Properties 282 |
| Electrical Properties 284 |
| Thermal Properties 286 |
| Physical Properties 288 |

380

| Divergence Time Interval 382 |
| Divergence Limits 384 |
| Control Constant 386 |
| Maximum Shared Bus Voltage 388 |
| Maximum Supply Current 390 |
| Predefined Cell Capacity 392 |
| Predefined Nominal Capacity 394 |
| Predefined Cell Resistance 396 |

AUTONOMOUS BATTERY CONTROL AND OPTIMIZATION

CROSS-REFERENCE TO RELATED APPLICATIONS

This is a continuation application of and claims priority to U.S. patent application Ser. No. 14/591,917 entitled "BATTERY CONTROL" and filed on Jan. 7, 2015 for Regan Zane, et al., which claims the benefit of U.S. Provisional Application No. 61/924,644 entitled "BATTERY CONTROL" and filed on Jan. 7, 2014 for Regan Zane, et al., both of which are incorporated herein by reference for all purposes. U.S. patent application Ser. No. 15/224,275, entitled "MODEL PREDICTIVE CONTROL AND OPTIMIZATION FOR BATTERY CHARGING AND DISCHARGING," filed on Jul. 29, 2016 for Michael S. Trimboli, et al, is incorporated herein by reference for all purposes.

GOVERNMENT RIGHTS

This invention was made with government support under award DE-AR0000271 awarded by the Department of Energy. The government has certain rights in the invention.

FIELD

The subject matter disclosed herein relates to battery control and more particularly relates to autonomous battery charge and discharge of battery cells in a battery unit and optimization of the life of the battery cells.

BACKGROUND

Batteries are being used in many different applications, such as electric vehicles. However, batteries often have limitations based on size, capacity, cost, etc. that limit usefulness and popularity. For example, electric vehicles have distance limitations based on battery capacity that may be unacceptable to consumers. In addition, electric vehicles often require batteries to be replaced at a large cost on a time interval that may make electric vehicles an expensive alternative to fossil fuel powered vehicles. Increasing battery capacity and useful life helps to increase popularity of electric vehicles and other battery powered devices.

BRIEF SUMMARY

An apparatus for battery control is disclosed. A method and system also perform the functions of the apparatus. The apparatus includes a battery state module that determines a battery state of each battery cell of a plurality of battery cells forming a battery unit. A battery state of a battery cell includes a health of the battery cell and a battery state of at least one battery cell of the battery unit differs from a battery state of one or more other battery cells of the battery unit. Each battery cell is connected to a shared bus through a bypass converter, and each bypass converter provides power from the battery cell to the shared bus. The apparatus includes a charge/discharge modification module that determines, based on the determined battery state of each battery cell of the battery unit, an amount to vary a charging characteristic for each battery cell of the battery unit with respect to a reference charging characteristic. The charging characteristic for each battery cell varies as a function of a reference state. The apparatus includes a charge/discharge module that adjusts charging and discharging of a battery cell of the battery unit based on the charging characteristic of the battery cell.

In one embodiment, the reference state comprises one of voltage of the shared bus, a reference state-of-charge, a reference cell voltage, a reference cell open circuit voltage, a reference cell history, and a reference signal from an equation calculating one or more parameters of the reference state. In another embodiment, each charging characteristic includes a maximum target state-of-charge correlated to a maximum value of the reference state. In another embodiment, the reference charging characteristic includes a maximum target state-of-charge of a healthiest battery cell of the battery unit correlated to the maximum value of the reference state, where the maximum target state-of-charge of the healthiest battery cell is higher than the maximum target state-of-charge of the battery cells of the battery unit other than the healthiest battery cell. In a related embodiment, the maximum target state-of-charge of a battery cell is proportionally related to the maximum target state-of-charge of the healthiest battery cell based on battery state.

In another embodiment, the reference charging characteristic includes a charging characteristic of an average battery cell, where each charging characteristic includes a maximum target state-of-charge correlated to a maximum value of the reference state. The maximum target state-of-charge of each battery cell is related to the maximum target state-of-charge of the average battery cell based on battery state compared to the battery state of the average battery cell. In another embodiment, the charging characteristic of the average battery cell includes an average battery state based on the battery states of each battery cell of the battery unit, or a predetermined reference charging characteristic.

In one embodiment, the charge/discharge modification module populates an objective map for each battery cell of the battery unit. The objective map of a battery cell includes a target state-of-charge for each value of the reference state between at least a maximum value of the reference state and a minimum value of the reference state. In another embodiment, each objective map includes a same target state-of-charge for a transition value of the reference state, where the transition value of the reference state includes a value of the reference state between the minimum value of the reference state and the maximum value of the reference state.

In another embodiment, the apparatus includes a life control module that determines a maximum target state-of-charge for each battery cell based on the battery state of each battery cell compared to the reference charging characteristic and populates the objective map of each battery cell of the battery unit to have the same target state-of-charge at the transition voltage as the reference charging characteristic and to diverge in target state-of-charge from the reference charging characteristic as the reference state approaches the maximum value of the reference state. In another embodiment, the objective map for each battery cell of the battery unit diverges linearly from the same target state-of-charge at the transition value of the reference state to the maximum target state-of-charge of each battery cell of the battery unit.

In another embodiment, the apparatus includes a power optimized balancing module that determines values for the objective map for a battery cell of the battery unit based on an internal resistance of the battery cell. The target state-of-charge for a particular value of the reference state below the transition value of the reference state is correlated to a battery cell voltage at or above a minimum battery cell voltage plus a voltage drop across the internal resistance of the battery cell at a maximum battery cell current. In a related embodiment, the power optimized balancing mode module determines a minimum target state-of-charge corresponding to the minimum value of the reference state based on the internal resistance of the battery cell, where the minimum target state-of-charge of the battery cell is determined to maintain the battery cell voltage at the minimum battery cell voltage, while the reference state is at the minimum value of the reference state, accounting for voltage drop across the internal resistance while current for the battery cell is at a maximum cell current. The power optimized balancing mode module populates the objective map of the battery cell to transition linearly between the minimum target state-of-charge and the same target state-of-charge at the transition value of the reference state.

In one embodiment, the charge/discharge modification module determines the amount to vary the charging characteristic of a battery cell of the battery unit based on a current age of the battery cell and a target end-of-life age of a reference battery cell associated with the reference charging characteristic and a difference between a capacity of the battery cell and the reference battery cell at the current age of the battery cell and the reference battery cell. In another embodiment, the charge/discharge modification module adjusts a maximum target state-of-charge of the battery cell to minimize a projected difference between the capacity of the battery cell and the capacity of the reference battery cell at the target end-of-life age of the reference battery cell.

In one embodiment, the apparatus includes a direct current ("DC") to DC bypass converter connected between each battery cell of the battery unit and the shared bus, where the charge/discharge module of a battery cell of the battery unit controls the bypass converter for the battery cell to adjust charging and discharging of the battery cell based on the charging characteristic of the battery cell. In another embodiment, the bypass converter includes at least one dual active bridge converter stage. In another embodiment, each bypass converter is controlled by a separate charge/discharge module and autonomously controls charging and discharging of the connected battery cell independent of other bypass converters and associated charge/discharge modules of other battery cells of the battery unit. Each charge/discharge module adjusts charging and discharging based on the charging characteristic for the associated battery cell as determined by the charge/discharge modification module.

In another embodiment, each charge/discharge module also includes a droop controller that provides a control characteristic for each bypass converter for control of output voltage of each bypass converter. The control characteristic includes a ratio of output voltage of the bypass converter to output current of the bypass converter, and the ratio includes a value wherein output voltage of the bypass converter decreases as output current of the bypass converter decreases and the bypass converters connected to the shared bus each contribute current to the shared bus based on the charging characteristic of the respective bypass converters while output voltage of each bypass converter remains within a voltage regulation range.

In one embodiment, the battery state module determines the battery state of a battery cell based on a battery model and input from one or more battery sensors. The battery model describes properties of the battery cells of the battery unit including chemical properties, electrical properties, thermal properties, and/or physical properties. The one or more battery sensors include a temperature sensor, an optical sensor, a voltage sensor, a current sensor, a pH sensor, a strain sensor, a pressure sensor, and/or a gas composition sensor. In another embodiment, at least a portion of the battery cells of the battery unit are connected in series and form a high voltage bus, where the high voltage bus is connected to one or more high voltage loads of an electric vehicle and the shared bus feeds a battery and/or an auxiliary load at a voltage lower than a voltage of the high voltage bus.

A method for battery control includes determining a battery state of each battery cell of a plurality of battery cells forming a battery unit. A battery state of a battery cell includes a health of the battery cell and a battery state of at least one battery cell of the battery unit differs from a battery state of one or more other battery cells of the battery unit. Each battery cell is connected to a shared bus through a bypass converter, and each bypass converter provides power from the battery cell to the shared bus. The method includes determining, based on the determined battery state of each battery cell of the battery unit, an amount to vary a charging characteristic for each battery cell of the battery unit with respect to a reference charging characteristic, where the charging characteristic for each battery cell varies as a function of a reference state. The method includes adjusting charging and discharging of a battery cell of the battery unit based on the charging characteristic of the battery cell.

In one embodiment, the reference state includes voltage of the shared bus, a reference state-of-charge, a reference cell voltage, a reference cell open circuit voltage, a reference cell history, or a reference signal from an equation calculating one or more parameters of the reference state. In another embodiment, each charging characteristic includes a maximum target state-of-charge correlated to a maximum value of the reference state. The reference charging characteristic includes a maximum target state-of-charge of a healthiest battery cell of the battery unit correlated to the maximum value of the reference state. The maximum target state-of-charge of the healthiest battery cell is higher than the maximum target state-of-charge of the battery cells of the battery unit other than the healthiest battery cell. In another embodiment, the method includes populating an objective map for each battery cell of the battery unit. The objective map of a battery cell includes a target state-of-charge for each value of the reference state between at least a maximum value of the reference state and a minimum value of the reference state.

In another embodiment, the method includes determining a maximum target state-of-charge for each battery cell based on the battery state of each battery cell compared to the reference charging characteristic and populating the objective map of each battery cell of the battery unit to have the same target state-of-charge at the transition value of the reference state as the reference charging characteristic and to diverge in target state-of-charge from the reference charging characteristic as the reference state approaches the maximum value of the reference state. The objective map for each battery cell of the battery unit diverges linearly from the same target state-of-charge at the transition value of the reference state to the maximum target state-of-charge of each battery cell of the battery unit.

In another embodiment, the method includes determining values for the objective map for a battery cell of the battery unit based on an internal resistance of the battery cell. The target state-of-charge for a particular value of the reference state below the transition value of the reference state is determined to be at or above a minimum battery cell voltage plus a voltage drop across the internal resistance of the battery cell at a maximum discharge battery cell current. In another embodiment, the method includes determining a minimum target state-of-charge corresponding to the minimum value of the reference state based on the internal resistance of the battery cell. The minimum target state-of-charge of the battery cell is determined to maintain the battery cell voltage at the minimum battery cell voltage at the minimum value of the reference state accounting for voltage drop across the internal resistance while discharging current for the battery cell is at a maximum cell voltage, and populating the objective map of the battery cell to transition linearly between the minimum target state-of-charge and the same target state-of-charge at the transition value of the reference state.

In one embodiment, determining the amount to vary the charging characteristic of a battery cell of the battery unit is based on a current age of the battery cell and a target end-of-life age of a reference battery cell associated with the reference charging characteristic and a difference between a capacity of the battery cell and the reference battery cell at the current age of the battery cell and the reference battery cell. In another embodiment, the method includes adjusting the maximum target state-of-charge of the battery cell to minimize a projected difference between the capacity of the battery cell and the capacity of the reference battery cell at the target end-of-life age of the reference battery cell.

A system for battery control includes a plurality of direct current ("DC") to DC bypass converters. Each bypass converter is connected to a battery cell of a plurality of battery cells forming a battery unit, and to a shared bus. The battery unit provides power to a load and each bypass converter provides power from the battery cell to a shared bus. The system includes a battery state module that determines a battery state of each battery cell of the battery unit. A battery state of a battery cell includes a health of the battery cell, where a battery state of at least one battery cell of the battery unit differs from a battery state of one or more other battery cells of the battery unit. The system includes a charge/discharge modification module that determines, based on the determined battery state of each battery cell of the battery unit, an amount to vary a charging characteristic for each battery cell of the battery unit with respect to a reference charging characteristic. The charging characteristic for each battery cell varies as a function of a reference state. The system includes a charge/discharge module that adjusts charging and discharging of a battery cell of the battery unit based on the charging characteristic of the battery cell. In another embodiment, the system includes the battery unit and/or the shared bus, where the shared bus provides power to a shared bus battery and/or an auxiliary load.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2O is a schematic block diagram illustrating one alternate embodiment of a bypass converter;

DETAILED DESCRIPTION OF THE INVENTION

Figure 1A:
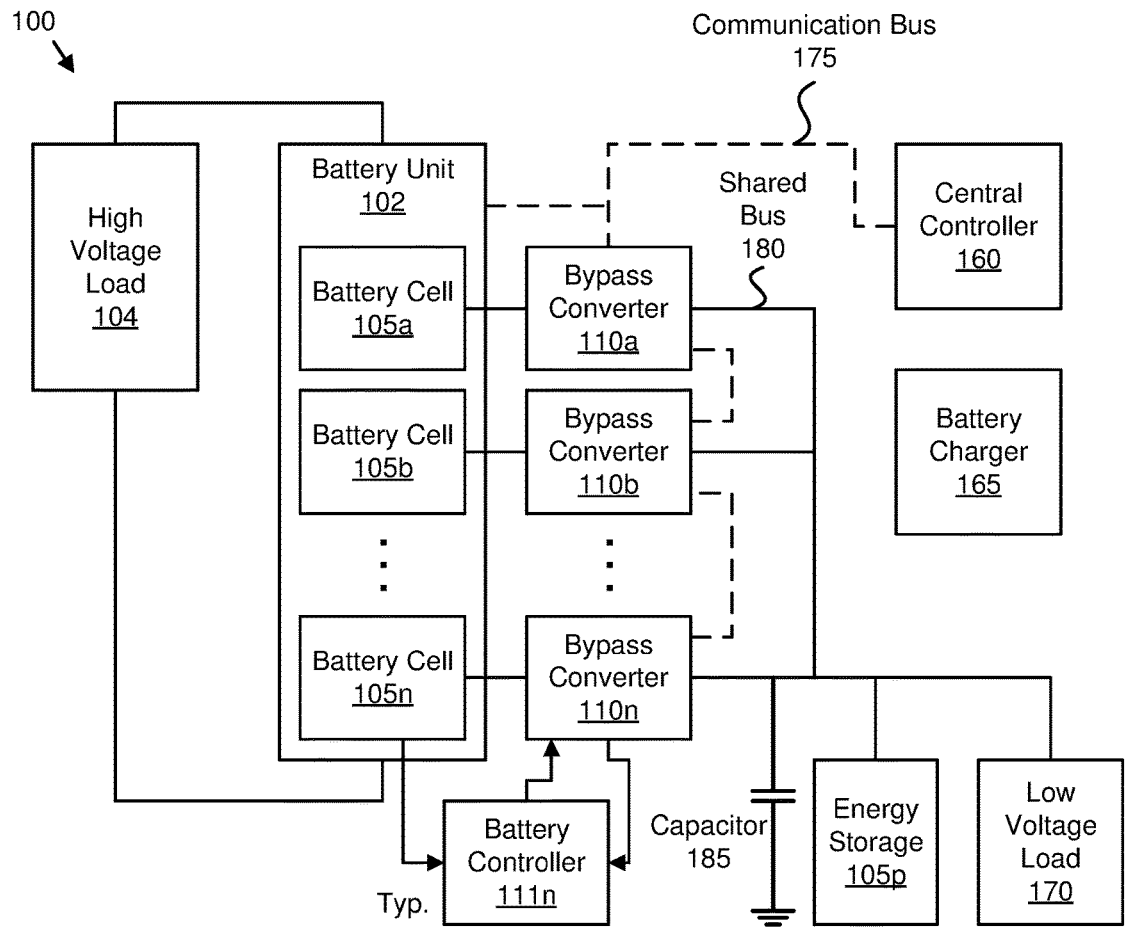
FIG. 1A is a schematic block diagram illustrating one embodiment of a system for battery control.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computing device, partly on the user's computing device, as a stand-alone software package, partly on the user's computing device and partly on a remote computer or entirely on the remote computer or server. In the latter scenario, the remote computer may be connected to the user's computing device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by hardware circuits, programmable hardware devices, computer readable program instructions, and the like.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software as executable code for execution by various types of processors. An identified module of program instructions may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. Note that for clarity, the word "unit" in the parent application, U.S. Ser. No. 14/591,917 [hereinafter "the '917 application"] and its associated provisional application, U.S. 61/924,644 [hereinafter the '644 application] have been replaced in the present application with "cell" so that a "battery unit" in the '917 and the '644 applications is a "battery cell" in the present application, "unit voltage" becomes "cell voltage," "unit current" becomes "cell current," and the like. In the present Application, a plurality of battery cells forms a battery unit.

The articles and presentations Zane, Regan, et al. "Robust Cell-Level Modeling and Control of Large Battery Packs," Control Number 0675-1537; Costinett, Daniel, "Active Balancing System for Electric Vehicles and Incorporated Low Voltage Bus;" Zane, Regan, "Robust Cell-Level Modeling and Control of Large Battery Packs," AMPED Annual Meeting: Government Panel Review, Jan. 9, 2014; Zane, Regan, "Robust Cell-Level Modeling and Control of Large Battery Packs," AMPED Annual Meeting Review, Jan. 8, 2014; Zane, Regan, "Robust Cell-Level Modeling and Control of Large Battery Packs," AMPED Q3 Quarterly Review; Zane, Regan, "Robust Cell-Level Modeling and Control of Large Battery Packs," AMPED Poster (two pages); "Robust Cell-Level Modeling and Control of Large Battery Packs," AMPED Poster; Levron, Yoash et al. "Low Complexity Kalman Filter for Battery Charge Estimation;" and Zane, Regan, "Robust Cell-Level Modeling and Control of Large Battery Packs;" Technology, Advantages, and Differentiation are incorporated herein by reference.

In one aspect of the embodiments, an open circuit cell voltage $V_{OC,max}$ is controlled to an upper limit as $$V_{OC,max} = V_{max} - K \frac{\partial V_{OC}}{\partial Q}(Q - Q_i),$$

where $V_{max}$ is a maximum cell voltage limit, K is a nonzero control constant, $Q_i$ is a cell capacity of the given battery cell of a battery unit, and Q is a cell capacity of a maximum capacity battery cell, an average cell capacity of the plurality of battery cells, or a predefined cell capacity.

In one aspect of the embodiments, an apparatus includes a shared bus and a central controller controlling a plurality of direct current (DC) to DC bypass converters each with an associated battery cell of a battery unit. Outputs of each bypass converter are in parallel electrical communication with the shared bus. In one embodiment, a central controller determines a battery state for each battery cell of a battery unit and decreases a rate of divergence of the battery cell state from a reference state.

In one aspect of the embodiments, an apparatus includes a shared bus and a plurality of isolated balancing DC to DC bypass converters, where each bypass converter is associated with one battery cell of the battery unit. In one embodiment, inputs of each bypass converter are in parallel electrical communication with the associated battery cell and outputs of each bypass converter are in parallel electrical communication with the shared bus, and each bypass converter determines a battery state for the associated battery cell and decreases a rate of divergence of the battery state from a reference state. In one embodiment, the reference state is the shared bus voltage. In another embodiment, the reference state is a reference state-of-charge, which may be calculated based on battery system measurements from a single battery cell, from an average of all battery cells, and the like, or may be calculated based on equations from at least a portion of a battery model of any or all battery cells.

In one aspect of the embodiments, the battery state may include a cell state-of-charge, a cell state-of-discharge, a cell capacity, a cell state-of-health, a cell impedance, a cell voltage, a cell current, a minimum cell voltage, a maximum cell voltage, a cell temperature, a cell power capability, a cell history, a cell electrochemical model parameter, a cell life-prognostic model parameter, and the like. In another embodiment, the reference state may include a reference state-of-charge, a reference state-of-discharge, a reference capacity, a reference state-of-health, a reference cell impedance, a reference cell resistance, a reference cell voltage, a reference cell open circuit voltage, a reference cell current, a reference minimum cell voltage, a reference maximum cell voltage, a reference cell temperature, a reference power capability, a reference cell history, a reference cell electrochemical parameter, a reference cell life-prognostic parameter, and the like. In one example, the charging characteristic for the reference state or a battery cell may include one or more of the variables and characteristics listed above.

In one aspect of the embodiments, the battery state for each battery cell of a battery unit is determined to reduce variability of any battery state between a plurality of battery cells. In another aspect of the embodiments, the variability of the battery state between the plurality of battery cells of a battery units is reduced over a divergence interval. In another aspect of the embodiments, the apparatus includes a capacitor in parallel electrical communication with the shared bus. In another aspect of the embodiments, the shared bus voltage is proportional to a charging characteristic of the reference state. In another aspect of the embodiments, the apparatus includes a central controller that senses the shared bus voltage. In another aspect of the embodiments, the central controller communicates with each of the plurality of bypass converters on an analog shared communications bus and/or a digital shared communications bus.

In one embodiment, the central controller communicates a control signal to each of the plurality of bypass converters that modifies a charging characteristic of the battery state. In another embodiment, the central controller determines the battery state for each battery unit. In another embodiment, the divergence is a cell capacity mismatch. In another embodiment, the shared bus charges the battery units by supplying power from an external power supply to the shared bus. In yet another embodiment, each of the plurality of battery units are in series electrical communication.

In one embodiment, the apparatus includes a current sensor that senses current in the series connection of the plurality of battery units. In another embodiment, the current sensor communicates over one of an analog bus and a digital bus to each of the plurality of bypass converters. In another embodiment, the current sensor communicates with a central controller. In another embodiment, the shared bus provides power to one of a load and a bus that provides power to the load. In another embodiment, each bypass converter includes a dual active bridge converter employing duty cycle control, frequency control, and/or phase shift control. In another embodiment, a battery unit includes one or more battery cells in parallel electrical communication. In another embodiment, a battery unit is comprised of one or more parallel connected battery cells in series electrical communication. In another embodiment, the battery unit includes some battery cells in series forming a string with multiple strings of battery cells connected in parallel.

In one embodiment, the apparatus includes a battery charger connected in parallel electrical communication to the plurality of battery units, and in communication with any one of a central controller, the shared bus, and the plurality of bypass converters, and the battery charger modifies the charging current based on the communications. In another embodiment, the apparatus includes a battery charger providing charge to series connected battery cells in the battery unit and the bypass converters adjust charging between battery cells of the battery unit based on the battery state of each battery cell.

In one embodiment, the apparatus includes a first and a second plurality of isolated balancing DC to DC bypass converters, where each bypass converter is associated with one battery cell of a battery unit. The first bypass converters are each connected to a battery cell of a first string of battery cells connected in series and the second bypass converters are each connected to a battery cell of a second string of series connected battery cells. Inputs of each bypass converter are in parallel electrical communication with the associated battery cell and outputs of the second plurality of bypass converters are in parallel electrical communication with the shared bus. In another embodiment, a first bypass converter cycles current through an associated first battery cell of a battery unit to heat the first battery cell. In another embodiment, the plurality of bypass converters further identifies at least one battery cell with a battery state parameter that does not satisfy a reference state parameter and modifies the battery state to decrease a rate of divergence of the battery reference parameter from the reference state parameter.

In one embodiment, each bypass converter controls the cell current as a function of a battery model of the associated battery cell. In one embodiment, a state-of-charge is calculated as a function of an open circuit cell voltage in a no load state. In another embodiment, the open circuit battery cell voltage in the no load state is calculated as a function of the cell voltage, a cell current, and a cell resistance. In another embodiment, a first bypass converter characterizes the associated battery cell in an off-line state. In another embodiment, a first bypass converter perturbs a cell current or a cell voltage of the first battery cell and characterizes the associated battery cell in response to the perturbation. In another embodiment, the characterization includes a cell impedance, a cell capacity, a cell temperature, a cell state-of-charge, and/or a cell state-of-health. In another embodiment, a first bypass converter performs a diagnostic on an associated first battery cell of a battery unit. In another embodiment, the first battery cell is heated to lower a cell impedance of the first battery cell.

In one embodiment, an objective map of a battery controller uses model predictive control ("MPC") to decrease a rate of divergence of the battery state from the reference state. In another embodiment, the battery model includes a reduced-order electrochemical state estimation of internal battery processes. In another embodiment, the battery model determines the battery state in response to inputs from a temperature sensor, an optical sensor, a voltage sensor, a current sensor, a pH sensor, a strain sensor, a pressure sensor, and/or a gas composition sensor. In another embodiment, the battery model describes properties of the battery cell comprising chemical properties, electrical properties, thermal properties, and physical properties. In another embodiment, the chemical properties include a formation of dendrites, a gas composition, a gas pressure, a cell pH, and the like. In another embodiment, the electrical properties include a cell impendence, a cell capacity, and/or a cell voltage. In another embodiment, the thermal properties include a cell temperature and/or a cell temperature distribution. In another embodiment, the physical properties include an expansion of a battery unit package.

In one embodiment, an apparatus includes a shared bus, a plurality of battery cells forming a battery unit, a plurality of isolated balancing DC to DC bypass converters, where each bypass converter is associated with one battery cell of the plurality of battery cells of the battery unit. Inputs of each bypass converter are in parallel electrical communication with the associated battery cell of the battery unit, and outputs of each bypass converter are in parallel electrical communication with the shared bus.

In one embodiment, a battery controller controls a cell state-of-charge for a given battery cell of the battery unit as a function of a cell capacity mismatch between a cell capacity of the given battery cell and a cell capacity of a maximum capacity battery cell, an average cell capacity of the plurality of battery cells, or a predefined cell capacity, such that a battery cell with a higher cell capacity reaches a higher maximum cell state-of-charge than a battery cell with a lower cell capacity. In another embodiment, a cell voltage $V_{OC}$ at open circuit of a given $i^{th}$ battery cell of the battery unit and is controlled to an upper limit calculated as $$V_{OC} = V_{max} - K\frac{\partial V_{OC}}{\partial Q}(Q - Q_i),$$

where $V_{max}$ is a maximum cell voltage limit, K is a nonzero control constant, $Q_i$ is a cell capacity of the given battery cell, and Q is a cell capacity of a maximum capacity battery cell, an average cell capacity of the plurality of battery cells, or a predefined cell capacity.

In one embodiment, if the cell state-of-charge ("SOC") exceeds a control threshold, the battery controller controls a cell state-of-charge for a given battery cell of the battery unit as a function of a cell capacity mismatch between a cell capacity of the given battery cell and a cell capacity of a maximum capacity battery cell, an average cell capacity, or a predefined cell capacity. If the cell state-of-charge is less than the control threshold, the battery controller controls the cell state-of-charge for the given battery cell as a function of a cell resistance mismatch between a cell resistance of the given battery cell and an average cell resistance for the plurality of battery cells, a cell resistance of a maximum resistance battery cell, or a predefined cell resistance.

In one aspect of the embodiments, a cell voltage $V_{OC,i}$ at open circuit of a given $i^{th}$ battery cell is controlled to a lower limit calculated as $V_{OC} = V_{min} - I_{max}(\text{avg}(R) - R_i)$ if the cell voltage is less than the control threshold, and controlled to an upper limit calculated as $$V_{OC} = V_{max} - K\frac{\partial V_{OC}}{\partial Q_i}(Q - Q_i)$$

if the cell voltage exceeds the control threshold, where $V_{max}$ is a maximum cell voltage limit, $V_{min}$ is a minimum cell voltage limit, K is a nonzero control constant and $Q_i$ is a cell capacity of the given battery cell, Q is one of a cell capacity of a maximum capacity battery cell, an average cell capacity of the plurality of battery cells, and a predefined cell capacity, $I_{max}$ is a maximum cell current, $R_i$ is a cell resistance for the given battery cell, and R is an average cell resistance for the plurality of battery cells of a battery unit.

In one aspect of the embodiments, Q is max(Q) and is calculated as max(Q)=$Q_i+\Delta Q_i$ where $\Delta Q_i$ is a cell capacity mismatch between the given battery cell and the maximum capacity battery cell and is calculated as $$\Delta Q_i = Q_i - \frac{m_i Q_i I_{str}}{m_{nom}(I_{str} + I_{g,i})},$$

where $I_{str}$ is a supply current, $I_{g,i}$ is a bypass converter input current for the given battery cell, $m_i$ is a capacity parameter for the given battery cell calculated as $$m_i = \frac{Q_i - b_i}{V_{bus}}$$

where $V_{bus}$ is a shared bus voltage, $b_i$ is a predefined capacity constant, and $m_{nom}$ is predefined nominal capacity In one aspect of the embodiments, the cell voltage $V_C$ is controlled to an open circuit voltage of the battery cell $V_{OC,i}$ which is calculated as $$V_{C,i} = \frac{V_{max}(V_{OC,i} - R_i|I_{max}|) - V_{min}(V_{OC,i} + R_i|I_{max}|)}{V_{max} - V_{min} - 2R_i|I_{max}|}$$

wherein $V_{C,i}$ is a cell voltage for a given $i^{th}$ battery cell, $V_{max}$ is a maximum cell voltage limit, $V_{min}$ is a minimum cell voltage limit, $R_i$ is a cell resistance for the given battery cell, and $I_{max}$ is a maximum cell current for the given battery cell if the cell state-of-charge is less than the control threshold In one embodiment, controlling the battery state includes extending a cell lifetime of the first plurality of battery cells. In another embodiment, the battery state includes a cell voltage. In another embodiment, the battery state includes a cell state-of-charge. In another embodiment, the battery state includes a shared bus voltage. In another embodiment, the battery state for each battery cell is modified to extend a range of a first plurality of battery cells for a drive cycle, where the range is a function of a sum of the cell power capabilities of the first plurality of battery cells.

In one embodiment, each bypass converter estimates a battery state for each battery cell and controls the battery state to a reference state or reference charging characteristic. In various embodiments, the reference state may be a reference state-of-charge, a reference cell open circuit voltage, and the like. In another embodiment, the reference state or reference charging characteristic is based on a shared bus voltage. In another embodiment, each bypass converter further modifies the reference state or reference charging characteristic using an objective map based on a parameter mismatch between one or more battery cells. In another embodiment, modifying the reference state or reference charging characteristic reduces a rate of divergence of the parameter mismatch. In another embodiment, the objective map is embodied in one of one or more bypass converters and the central controller. In another embodiment, the reference state or reference charging characteristic is modified in response to a bypass converter input current and a droop resistance.

In one embodiment, the battery state includes a cell state-of-charge and the parameter mismatch is a capacity mismatch between a cell capacity of the given battery cell and one of a cell capacity of a maximum capacity battery cell, an average cell capacity of the plurality of battery cells, and a predefined cell capacity, such that a battery cell with a higher cell capacity reaches a higher maximum cell state-of-charge than a battery cell with a lower cell capacity. In another embodiment, the battery state includes a cell state-of-charge and the parameter mismatch is a cell capacity mismatch between a cell capacity of the given battery cell and a cell capacity of a maximum capacity battery cell, an average cell capacity, or a predefined cell capacity if the cell state-of-charge exceeds a control threshold, and the parameter mismatch is a cell resistance mismatch between a cell resistance of the given battery cell and an average cell resistance for the plurality of battery cells, a cell resistance of a maximum resistance battery cell, or a predefined cell resistance if the cell state-of-charge is less than the control threshold. In if the cell state-of-charge exceeds a control threshold, the apparatus includes a battery charger connected in parallel electrical communication to the plurality of battery cells, and in communication with any one of a central controller, the shared bus, and the plurality of bypass converters, and the battery charger modifies the charging current based on the communications.

In one embodiment, a central controller estimates a battery state for each battery cell and controls the battery state to a reference state using the bypass converters of each battery cell. In if the cell state-of-charge exceeds a control threshold, a droop controller is embodied in one or more bypass converters or the central controller.

FIG. 1A is a schematic block diagram illustrating one embodiment of a system 100 for battery control. The system 100 includes a battery unit 102 that includes a plurality of battery cells 105a-105n (collectively "105"), bypass converters 110a-110n (collectively "110"), a battery controller 111 (only one battery controller is shown e.g. 111a, for clarity), a high voltage load 104, energy storage device 105p, a central controller 160, a battery charger 165, a low voltage load 170, a communication bus 175 and a shared bus 180, which are described below.

The system 100 includes a battery unit 102 includes a plurality of battery cells 105 where the battery cells 105 may be in various configurations. For example, the battery cells 105 may be arranged in series, in parallel or in strings of series connected battery cells 105 where the strings are connected in parallel. The battery cells 105 are rechargeable and may be lithium-ion, lead-acid, nickel metal hydride, and the like. The battery cells 105 are typically of a type where charging to a lower maximum state-of-charge ("SOC") helps to extend battery life. The battery unit 102 may be used in an electric vehicle, an electric powered device or other device that includes several battery cells 105. The battery unit 102 is connected, in one embodiment, to a high voltage load 104. The high voltage load 104 typically has a voltage higher than voltage on the shared bus 180. Typically, the shared bus 180 voltage is lower than voltage across terminals of the battery unit 102 feeding the high voltage load 104. In another embodiment, voltage feeding a load connected to terminals of the battery unit 102 is comparable or lower than voltage on the shared bus 180.

The system 100 includes a bypass converter 110 connected to each battery cell 105 and to a shared bus 180. Each bypass converter 110 is a DC to DC converter. In on embodiment, each bypass converter 110 includes a dual active bridge converter which may employ duty cycle control, frequency control, phase shift control, or other type of control. Other embodiments include other DC to DC converter technologies. Each bypass converter 110 is connected on one side to a battery cell 105 (e.g. a first bypass converter 110a is connected to a first battery cell 105a). Each bypass converter 110 is also connected on the opposite side to a shared bus 180. Typically, the shared bus 180 is a low voltage bus feeding one or more low voltage loads 170, an energy storage device 105p, such as a 12-volt battery, etc.

The low voltage loads 170 may include control power, vehicle auxiliary loads, and the like. The energy storage device 105p typically provides power for the low voltage load 170 independent of the battery unit 102. In some embodiments, the system 100 does not include an energy storage device 105p and the battery unit 102 provides power to the low voltage loads 170 through the shared bus 180.

The system 100 includes a battery charger 165. The battery charger 165, in one embodiment, is connected to the battery unit 102 and provides battery charging of the battery cells 105 independent of the bypass converters 110. For example, the battery charger 165 may independently monitor voltage across the battery unit 102 and may control battery charging based on the voltage across the battery unit 102, battery sensors, etc. In another embodiment, the battery charger 165 works in conjunction with the bypass converters 110 to charge the battery cells 105.

The system 100, in one embodiment, includes a central controller 160 that may provide various control functions associated with determining battery state and control of the bypass converters 110. For example, the central controller 160 may determine battery state of each battery cell 105a-n and may populate an objective map 114 for each battery cell 105a-n based on the battery state of each battery cell 105a-n. The central controller 160 may communicate with the battery unit 102, battery cells 105, and bypass converters 110 over a communication bus 175. In another embodiment, the functions of the central controller 160 are distributed in the battery controller 111 for each bypass converters 110.

The system 100, in one embodiment, includes a battery controller 111 for each bypass converter 110. The battery controller 111 may include control functions associated with the battery cell 105 connected to the bypass converter 110 connected to the battery cell 105 and controls the bypass converter 110.

Figure 1B:
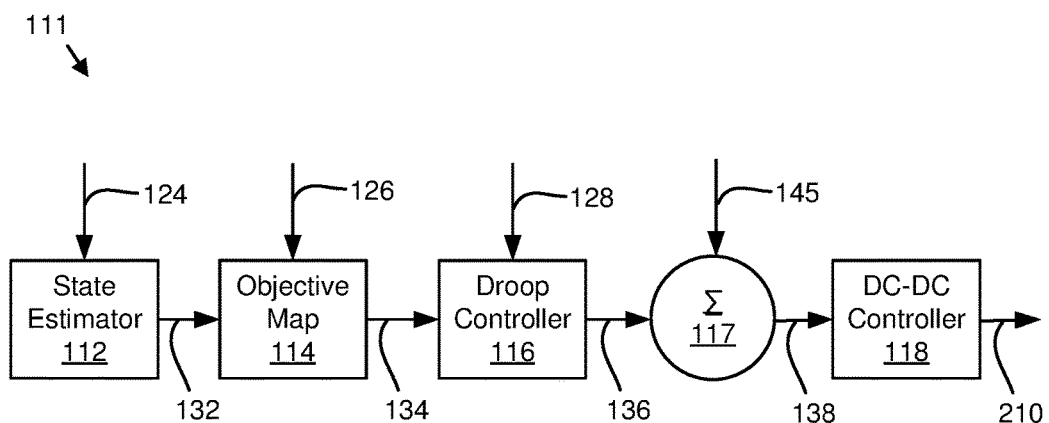
FIG. 1B is a schematic block diagram illustrating one embodiment of battery controller.

FIG. 1B is a schematic block diagram illustrating one embodiment of a battery controller 111. The battery controller 111 may control the battery system 100. The battery controller 111 may be embodied in semiconductor circuits, a processor, a computer readable storage medium, or combinations thereof. The battery controller 111 may include a state estimator 112, an objective map 114, a summing function 117, and a DC-DC controller 118. In addition, the battery controller 111 may include a droop control 116.

The state estimator 112 may receive one or more state inputs 124 from one or more battery cells 105. The state inputs 124 may include a battery cell voltage, a battery cell current, and/or a battery cell temperature. The state estimator 112 may generate one or more state estimates 132 for the one or more battery cells 105 including a cell state-of-charge, a cell state of discharge, a cell capacity, a cell state-of-health, a cell resistance, a cell impedance, and/or cell power capability. For example, the state estimator 112 may generate an open circuit cell voltage $V_{oc}$.

The objective map 114 may receive the state estimate 132 and one or more parameter mismatches 126. The parameter mismatch 126 may specify between parameters of 2 or more battery states. The objective map 114 may generate a shared bus reference voltage 134. The objective map 114 may control a battery cell (e.g. 105a) using the control input 134.

The droop control 116 may receive the control input 134 and one or more droop inputs 128. The droop inputs 128 may include an input current to a bypass converter and a droop control resistance. A droop controller typically allows a voltage droop over a specified current range and is expressed as ratio of change in voltage divided by change in current, which may be expressed linearly as a slope or a droop resistance. The droop control 116 may generate a modified shared bus reference voltage 136. The modified shared bus reference voltage 136 may facilitate the sharing of a load current between one or more bypass converters.

The summing function 117 may receive a shared bus voltage 145 that will be described hereafter. In addition, the summing function 117 may receive one of the shared bus reference voltage 134 and the modified shared bus reference voltage 136. The summing function 117 may subtract the shared bus voltage 145 from the shared bus reference voltage 134 or the modified shared bus reference voltage 136 to generate a control signal 138. The DC-DC controller 118 may receive the control signal 138 and generate one or more DC-DC controls 210 that could control a DC-DC converter as will be described hereafter. In one embodiment, each bypass converter 110 is controlled by a DC-DC controller 118.

In one embodiment, the functions of the battery controller 111 are distributed among one or more battery controllers 111. Alternatively, the functions of the battery controller 111 may be performed by a central controller 160. In addition, the functions of the battery controller 111 may be distributed among the one or more bypass converters 110 and the central controller 160.

Figure 2A:
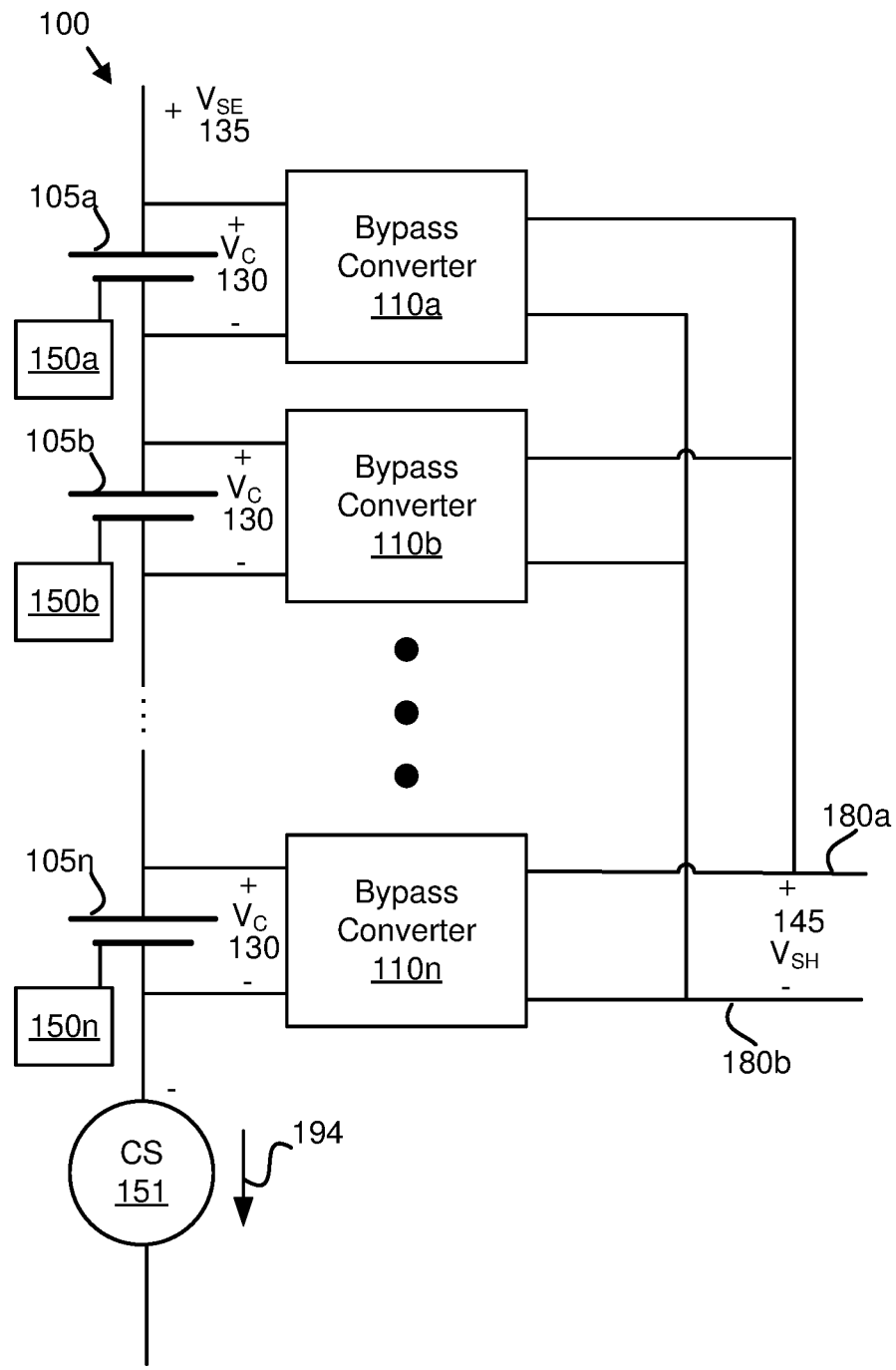
FIG. 2A is a schematic block diagram illustrating one embodiment of a battery system.

FIG. 2A is a schematic block diagram illustrating one embodiment of a battery system 100. The system 100 includes a plurality of battery cells 105. Each battery cell 105 may include one or more cells in a series configuration, a parallel configuration, or combinations thereof. In the depicted embodiment, the battery cells 105 are arranged in series electrical communication forming a battery unit 102. Each battery cell 105 is in parallel electrical communication with inputs of a bypass converter 110. The bypass converter 110 is described in greater detail hereafter. Outputs of each bypass converter 110 are in parallel communication with a shared bus 180. In the depicted embodiment, the shared bus 180 includes positive 180a and negative 180b conductors. The shared bus 180 may have a shared bus voltage 145.

A battery sensor 150a-n (collectively "150") is connected to each battery cell 105. The battery sensor 150 may include at least one of a temperature sensor, an optical sensor, a voltage sensor, a current sensor, a pH sensor, a strain sensor, a pressure sensor, and a gas composition sensor. The battery sensor 150 may measure a cell voltage 130 for the battery cell 105. In addition, the battery sensor 150 may measure one or more of a cell impedance, a cell current, a minimum cell voltage, a maximum cell voltage, a cell temperature, the cell power capability, and the like for the battery cell 105. In one embodiment, the plurality of battery cells 105 forms a battery pack. The plurality of battery cells 105 may have a series voltage $V_{SE}$ 135. In addition, a current sensor CS 151 may sense a string current 194 of the series connection of the plurality of battery cells 105.

Each bypass converter 110 may determine a battery state for the associated battery cell 105. The bypass converter 110 may control the battery cell 105 to the battery state during charging and discharging of the battery cell 105. In addition, the battery controller 111 and/or each bypass converter 110 may decrease a rate of divergence of the battery state from a reference state as will be described hereafter. The reference state represents an objective battery state for the plurality of battery cells 105. The battery states are managed over a longer divergence time interval to decrease a rate of divergence from the reference state. In one embodiment, the battery states are converged to the reference state. Alternatively, the divergence of the battery states from the reference state may be minimized.

In one embodiment, the reference state is shared bus voltage $V_{SH}$ 145. In the embodiment, shared bus voltage $V_{SH}$ 145 may correlate to the reference state-of-charge, which is also correlated to the shared bus reference voltage 134. In another embodiment, the reference state includes a correlation of the reference state-of-charge correlated to the shared bus reference voltage 134. In other embodiments, the reference state is a reference cell voltage, a reference cell open circuit voltage, a reference cell history, or a reference signal from an equation calculating one or more parameters of battery models for any or all battery cells 105. For example, the energy storage device 105p may maintain the shared bus voltage $V_{SH}$ 145 at more of a fixed value or other reason where the shared bus voltage $V_{SH}$ 145 may not vary as desired. The central controller 160 may include one or more equations, for example, equations that model a battery cell 105 or the like where the equation has a variable output that may serve as the reference state. The equations may model state-of-charge, cell open circuit voltage, etc. based on current in and out of the battery cells 105 and may vary based on a current modeled battery state.

The battery state may include a control signal, a state-of-charge, a state-of-discharge, a capacity, a state-of-health, a cell impedance, a cell voltage 130, a cell current, a minimum cell voltage, a maximum cell voltage, a cell temperature, a cell power capability, a cell history, a cell electrochemical model parameter, and/or a cell life-prognostic model parameter and may be used to define a charging characteristic. The reference state may include a reference state-of-charge, a reference state-of-discharge, a reference capacity, a reference state-of-health, a reference cell impedance, a reference cell voltage, a reference cell current, a reference minimum cell voltage, a reference maximum cell voltage, a reference cell temperature, a reference power capability, a reference cell history, a reference cell electrochemical model, and/or a reference cell life-prognostic model and may be used to define a reference charge characteristic.

Figure 2B:
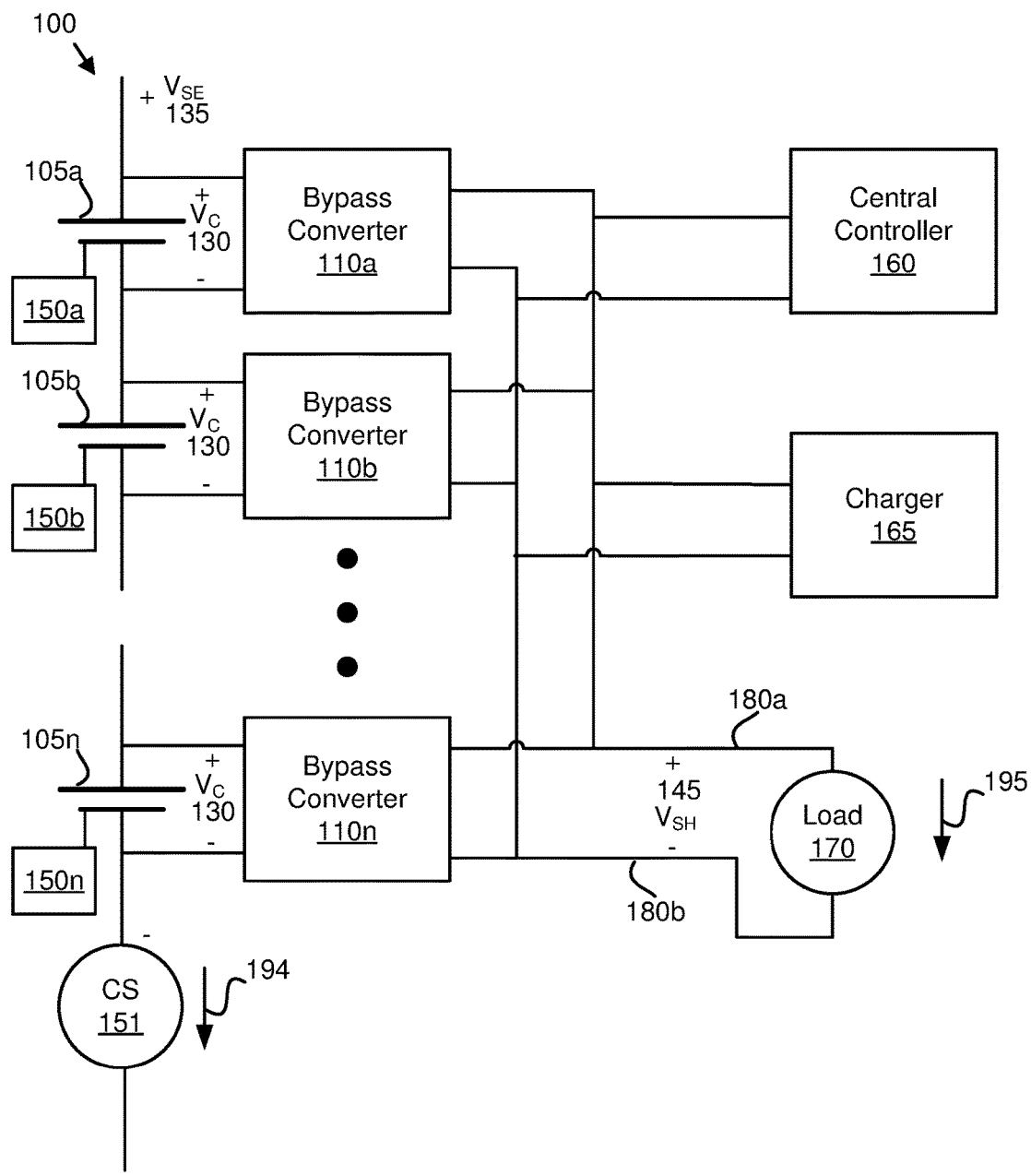
FIG. 2B is a schematic block diagram illustrating one alternate embodiment of a battery system.

FIG. 2B is a schematic block diagram illustrating one alternate embodiment of the battery system 100. In the depicted embodiment, a load 170 is electrical communication with the shared bus 180. In addition, a central controller 160 and a battery charger 165 are also in electrical communication with the shared bus 180.

The central controller 160 may sense the shared bus voltage 145 of the shared bus 180. In one embodiment, the central controller 160 is in communication with the bypass converters 110. In addition, the central controller may be in communication with the current sensor 151. In one embodiment, the central controller 160 may modify the reference state for the battery cells 105. For example, the reference state may be the shared bus voltage 145 and the central controller 160 may communicate the shared bus voltage 145 to the bypass converters 110. Alternatively, the central controller 160 may communicate a control signal to the plurality of bypass converters 110. The control signal may modify the battery state for the battery cells 105.

The battery charger 165 is connected in electrical communication with the shared bus 180. In an alternative embodiment, the battery charger 165 is in parallel electrical communication to the series connected plurality of battery cells 105. The battery charger 165 may charge the battery cells 105 by supplying power from an external power supply to the shared bus 180.

In one embodiment, the battery charger 165 is in communication with at least one of the central controller 160, the shared bus 180, and the plurality of bypass converters 110. The battery charger 165 may modify the charging current based on the communications with the central controller 160, the shared bus 180, and/or the plurality of bypass converters 110.

Figure 2C:
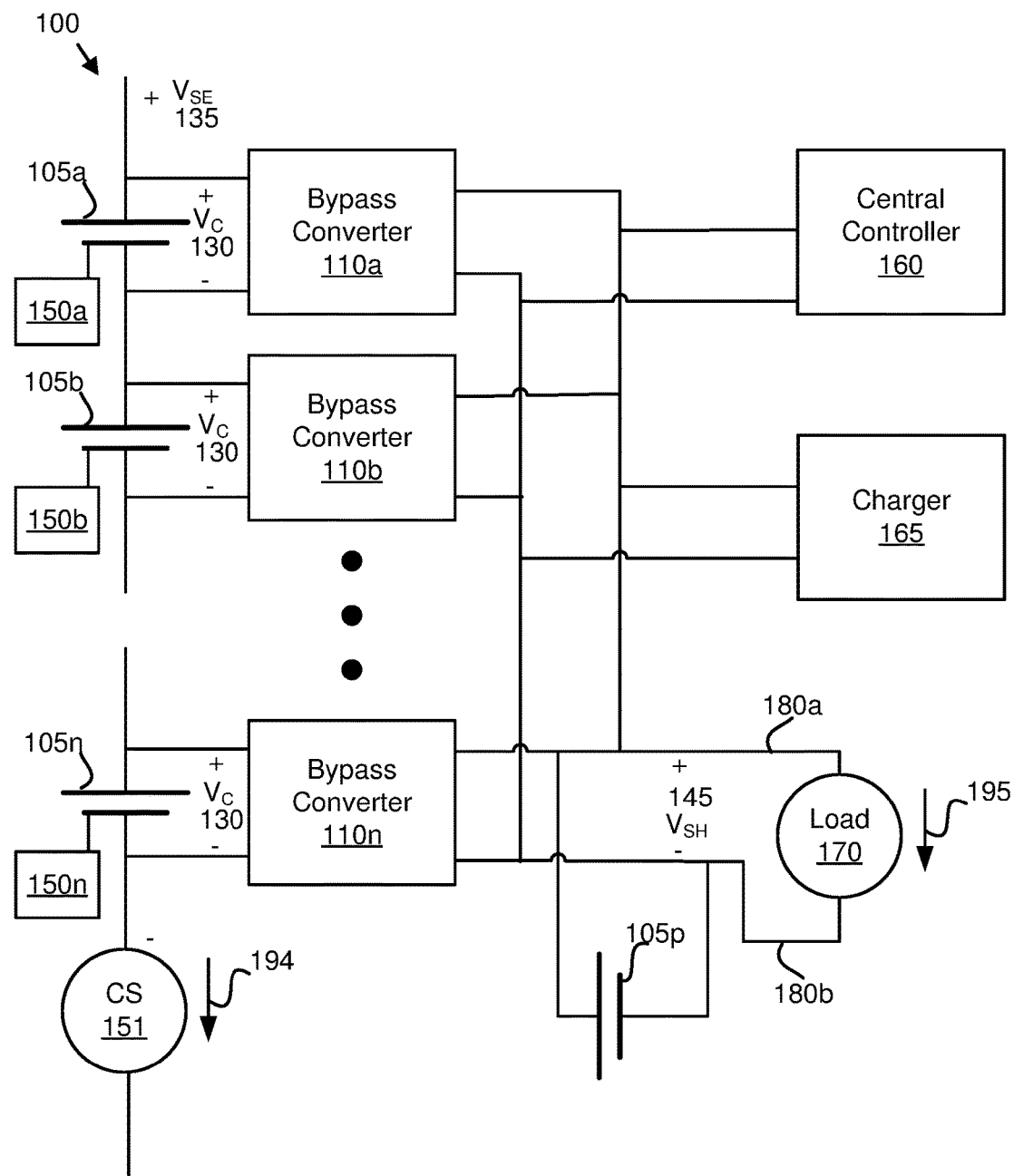
FIG. 2C is a schematic block diagram illustrating one alternate embodiment of a battery system.

FIG. 2C is a schematic block diagram illustrating another alternate embodiment of the battery system 100. In the depicted embodiment, an energy storage device 105*p* is in parallel electrical communication with the shared bus 180. In a certain embodiment, the energy storage device 105*p* drives the shared bus voltage 145. In another embodiment (not shown), a separate battery charger controls charging the energy storage device 105*p* and the energy storage device 105*p* is not connected directly to the shared bus 180 during charging of the energy storage device 105*p*, but is instead connected when the bypass converters 110 are not proving sufficient providing power to the shared bus 180.

Figure 2D:
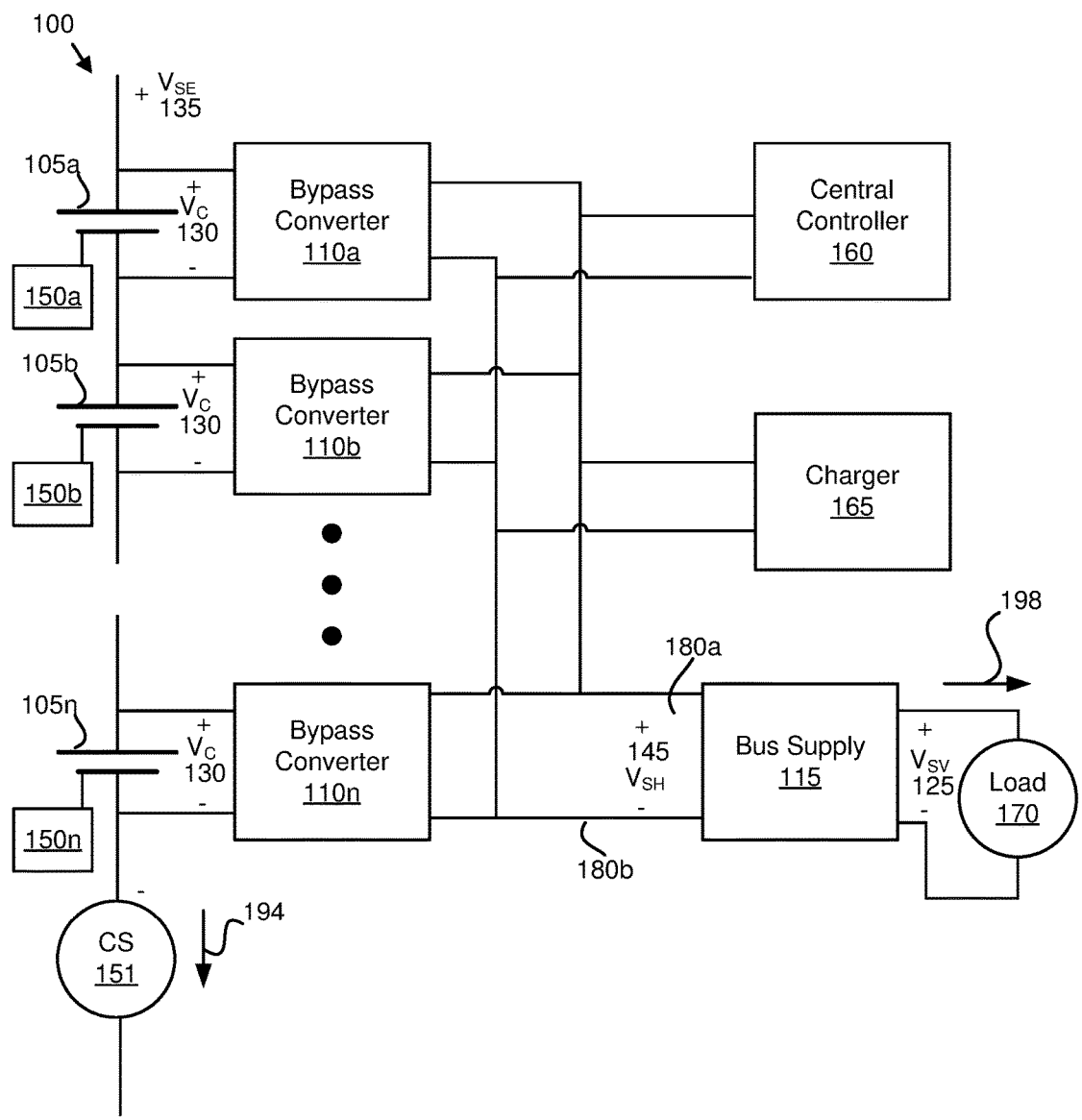
FIG. 2D is a schematic block diagram illustrating one alternate embodiment of a battery system.

FIG. 2D is a schematic block diagram illustrating one alternate embodiment of the battery system 100. In the depicted embodiment, the shared bus 180 is in electrical communication with the bus supply 115. The bus supply 115 may be a DC to DC converter. In one embodiment, the bus supply 115 provides a supply voltage 125 and a supply current 198. The supply current 198 may drive the load 170. In one embodiment, the bus supply 115 may provide an auxiliary power system such as a 12 Volt power supply. Alternatively, the bus supply 115 may provide high-voltage power. The bus supply 115 may be a separate DC to DC converter or other regulator that closely regulates voltage to the load 170 and/or converts the shared bus voltage 180 to another voltage.

Figure 2E:
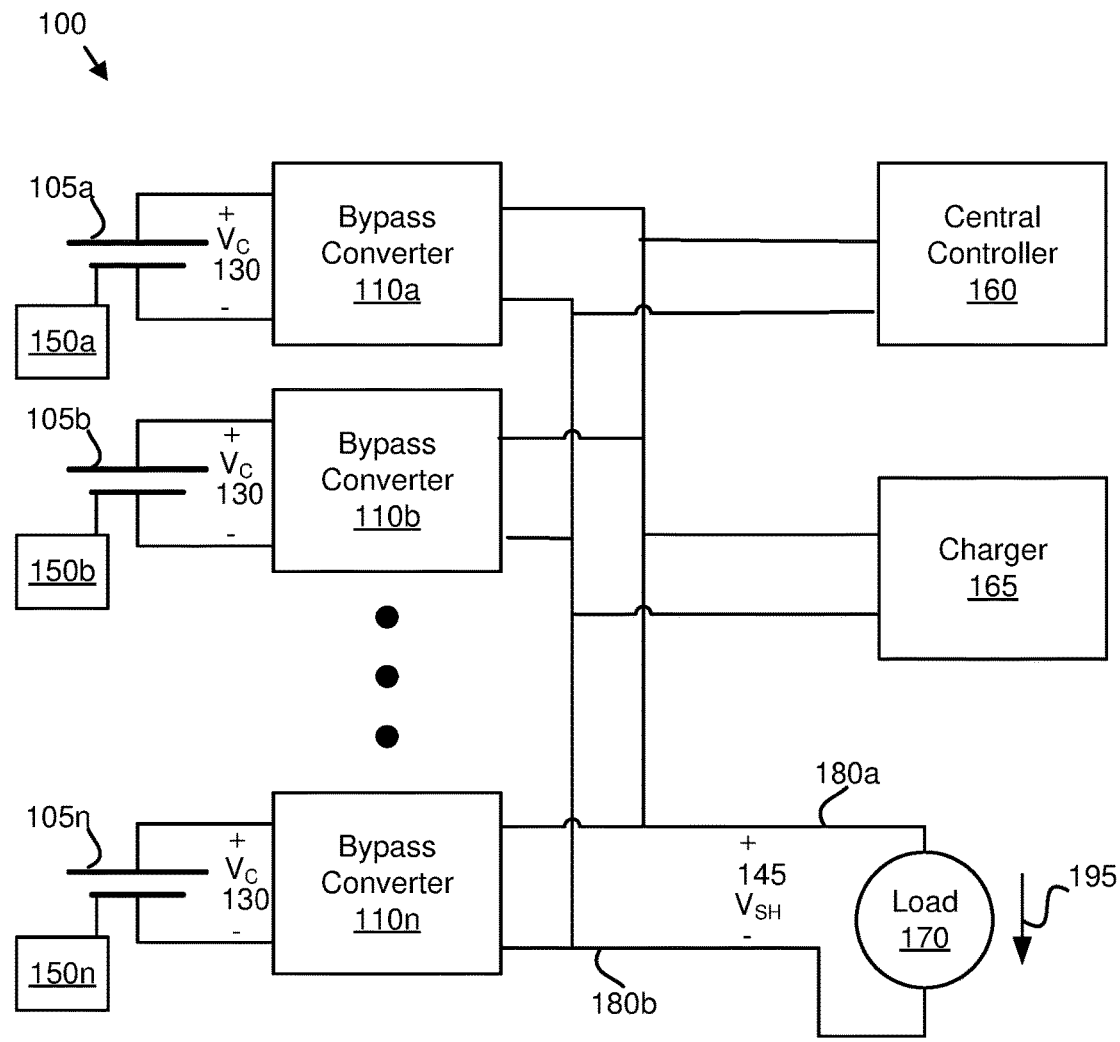
FIG. 2E is a schematic block diagram illustrating one alternate embodiment of a battery system.

FIG. 2E is a schematic block diagram illustrating one alternate embodiment of the battery system 100. In the depicted embodiment, the battery cells 105 are not in series electrical communication. Instead, the shared bus 180 may provide power for the load 170. For example, the battery cells 105 may be connected in parallel in the battery unit 102, but may be a different voltage than the shared bus 180 and the bypass converters 110 change voltage of the battery cells 105 to the voltage on the shared bus 180.

Figure 2F:
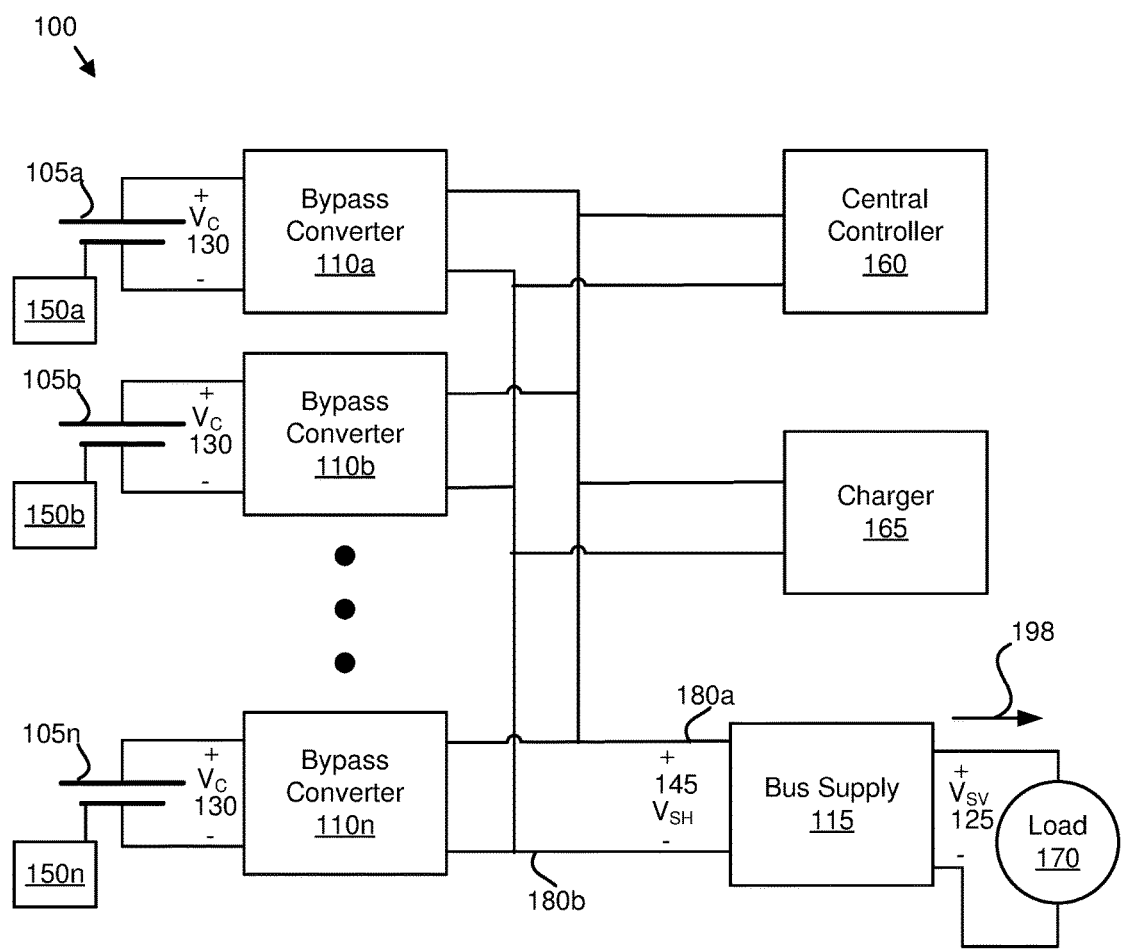
FIG. 2F is a schematic block diagram illustrating one alternate embodiment of a battery system.

FIG. 2F is a schematic block diagram illustrating one alternate embodiment of the battery system 100. As in FIG. 2E, the battery cells 105 are not in series electrical communication. The shared bus 180 drives the bus supply 115 which provides power for the load 170. The bus supply 115 may be a DC to DC converter and may supply the load 170 at a supply voltage 125 that is greater than or less than the shared bus voltage 145.

Figure 2G:
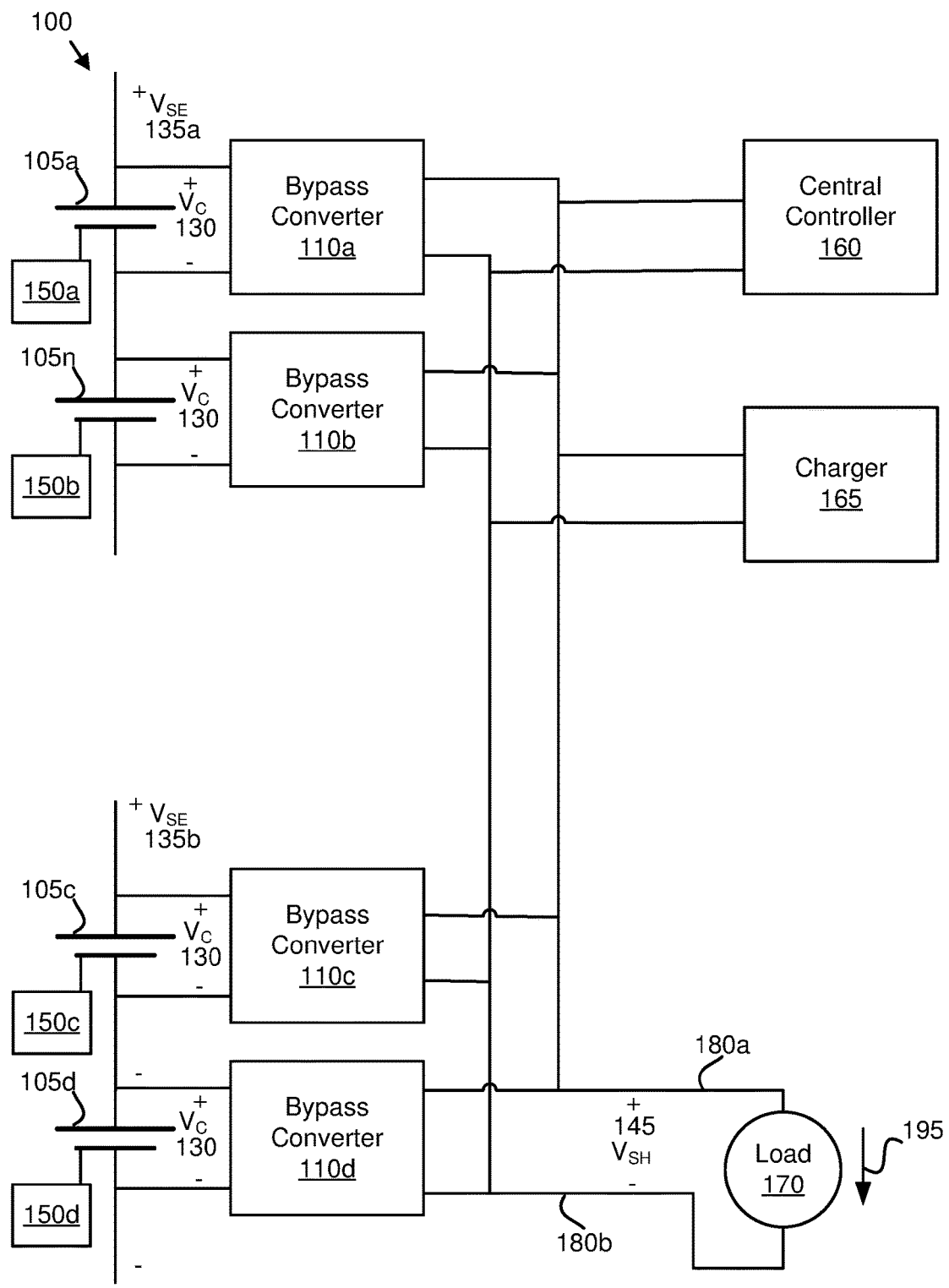
FIG. 2G is a schematic block diagram illustrating one alternate embodiment of a battery system.

FIG. 2G is a schematic block diagram illustrating one alternate embodiment of the battery system 100. In the depicted embodiment, a first plurality of battery cells 105*a-b* is in series electrical communication while a second plurality of battery cells 105*c-d* are also in series electrical communication but are not an electrical communication with the first plurality of battery cells 105*a-b*. The bypass converters 110 associated with the first plurality of battery cells 105*a-b* and the bypass converters 110 associated with a second plurality of battery cells 105*c-d* are in electrical communication with the shared bus 180. As a result, the first plurality of battery cells 105*a-b* may provide power independent of the second plurality of battery cells 105*c-d* while the shared bus 180 provides power to the load 170.

Figure 2H:
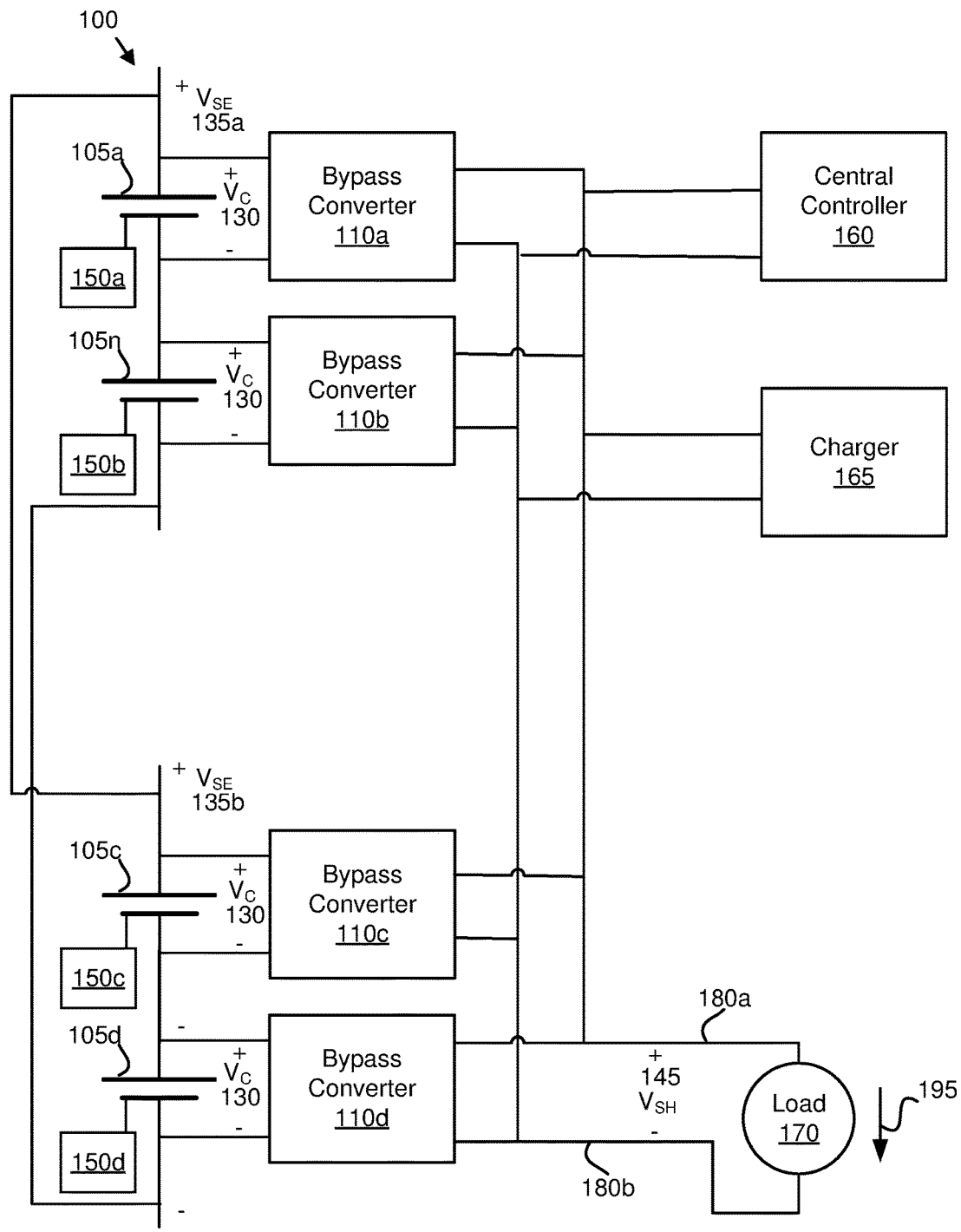
FIG. 2H is a schematic block diagram illustrating one alternate embodiment of a battery system.

FIG. 2H is a schematic block diagram illustrating one alternate embodiment of the battery system 100. The first plurality of battery cells 105*a-b* and the second plurality of battery cells 105*c-d* of FIG. 2G are depicted in parallel electrical communication.

Figure 2I:
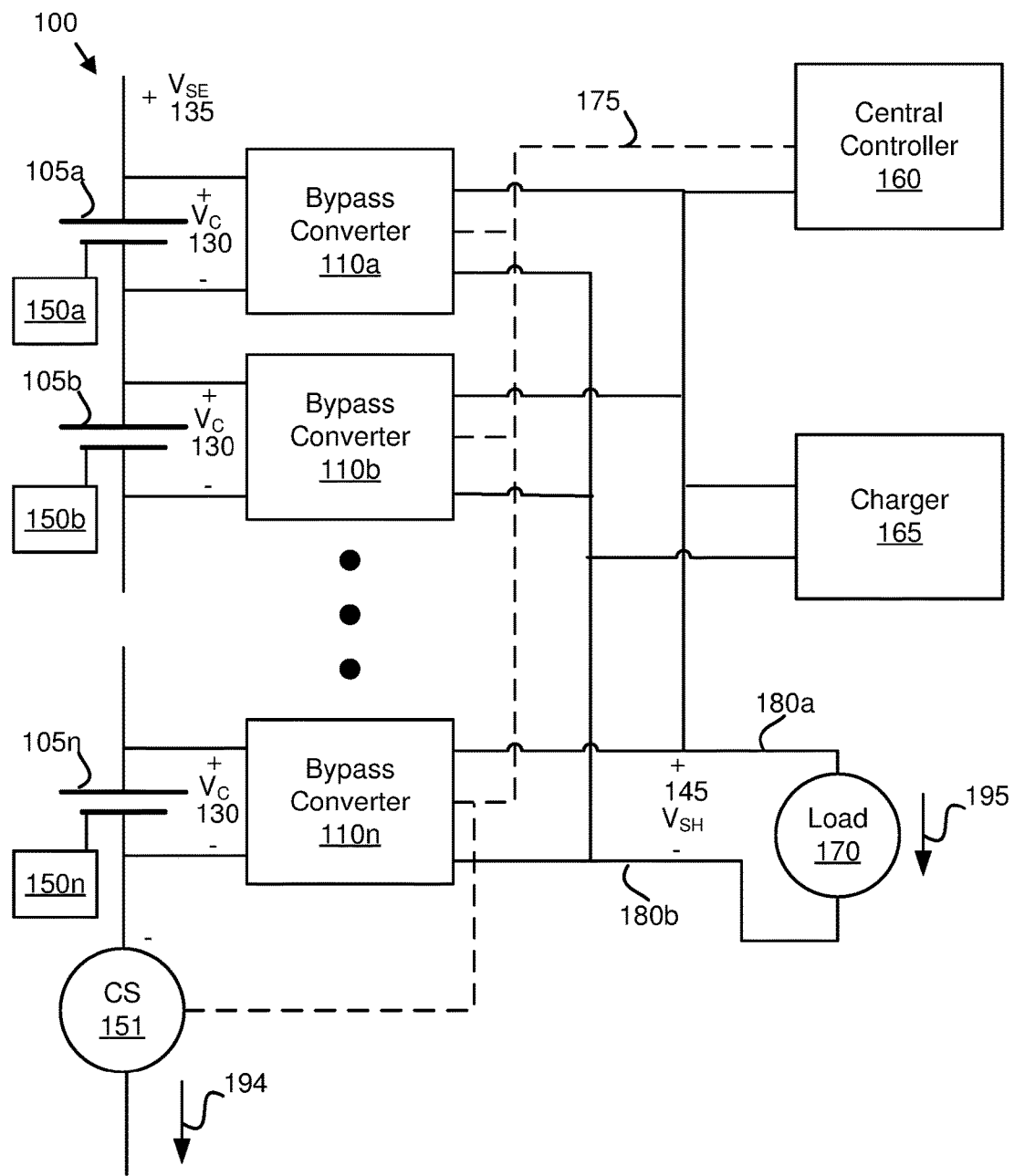
FIG. 2I is a schematic block diagram illustrating one alternate embodiment of a battery system.

FIG. 2I is a schematic block diagram illustrating one alternate embodiment of the battery system 100. In the depicted embodiment, the central controller 160 communicates with the bypass converters 110 over a shared communications bus 175. The shared communications bus 175 may be an analog bus. Alternatively, the shared communications bus 175 may be a digital bus. The current sensor 151 may also communicate with the bypass converters 110 over the shared communication bus 175. In an alternative embodiment, the shared communication bus 175 is not in communication with the central controller 160. In a certain embodiment, the current sensor 151 communicates with the bypass converters 110 over a dedicated bus such as an analog bus or a digital bus.

Figure 2J:
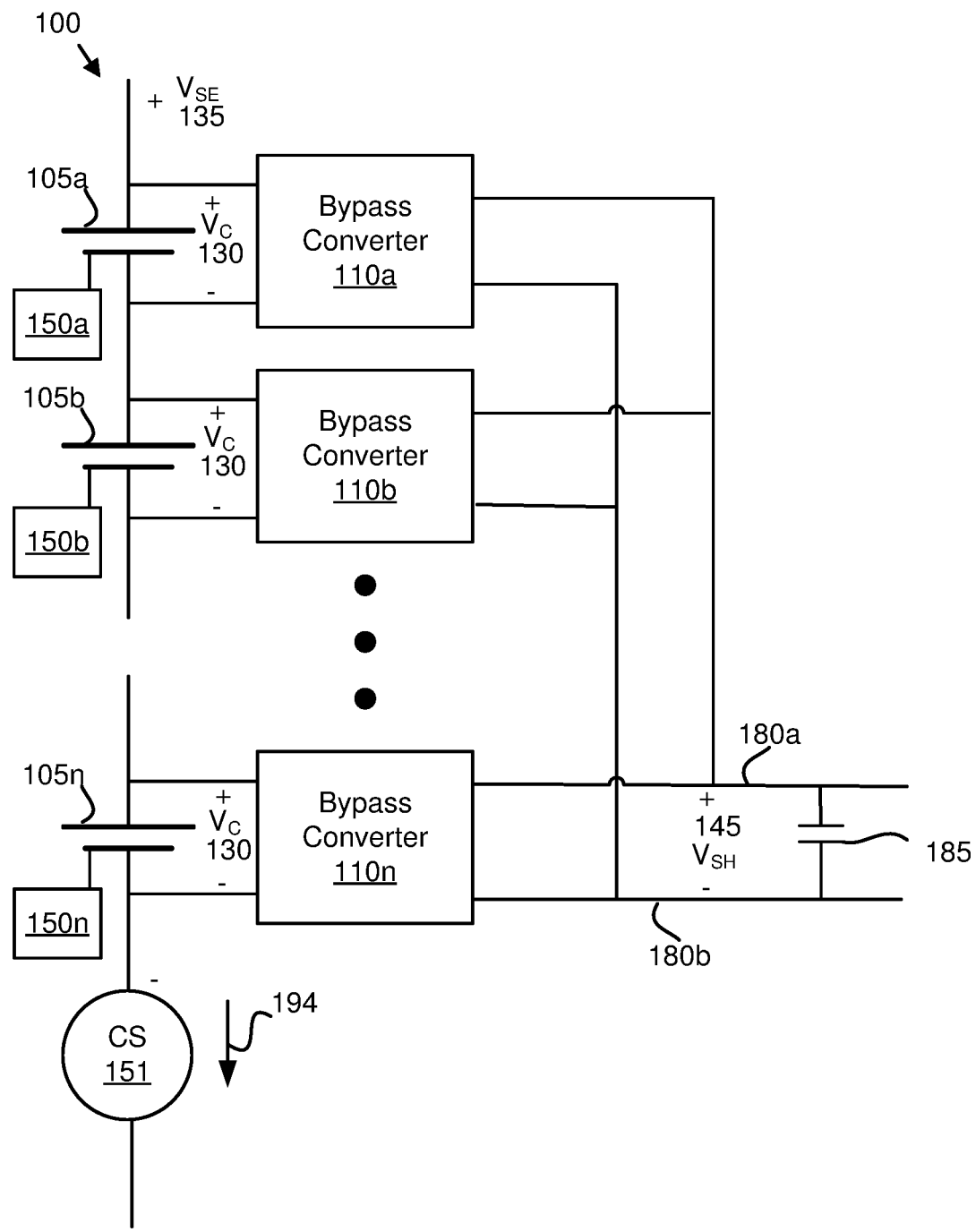
FIG. 2J is a schematic block diagram illustrating one alternate embodiment of a battery system.

FIG. 2J is a schematic block diagram illustrating one alternate embodiment of the battery system 100. In the depicted embodiment, a capacitor 185 is in parallel electrical communication with the shared bus 180.

Figure 2K:
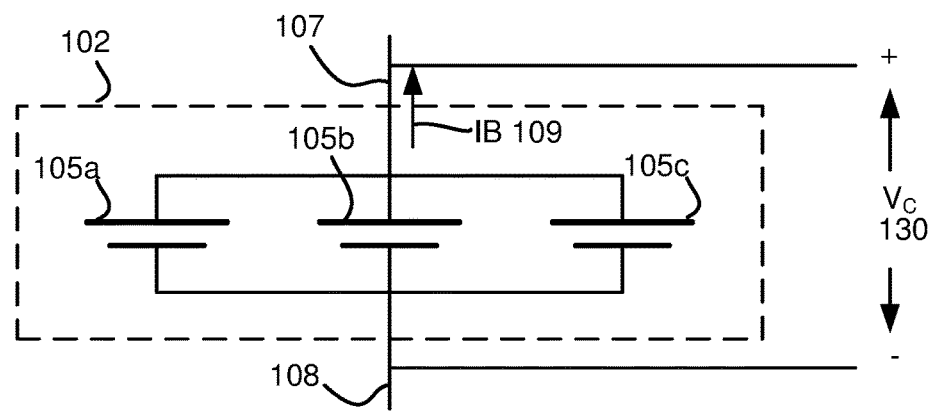
FIG. 2K is a schematic block diagram illustrating one embodiment of a battery unit.
Figure 2L:
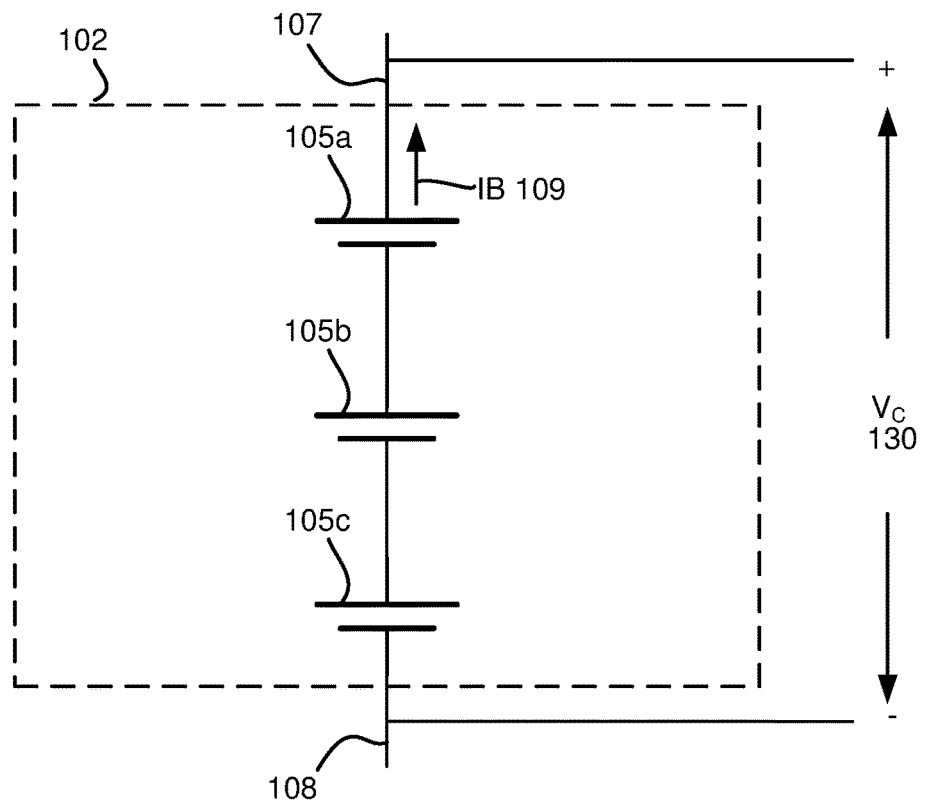
FIG. 2L is a schematic block diagram illustrating one alternate embodiment of a battery unit.
Figure 2M:
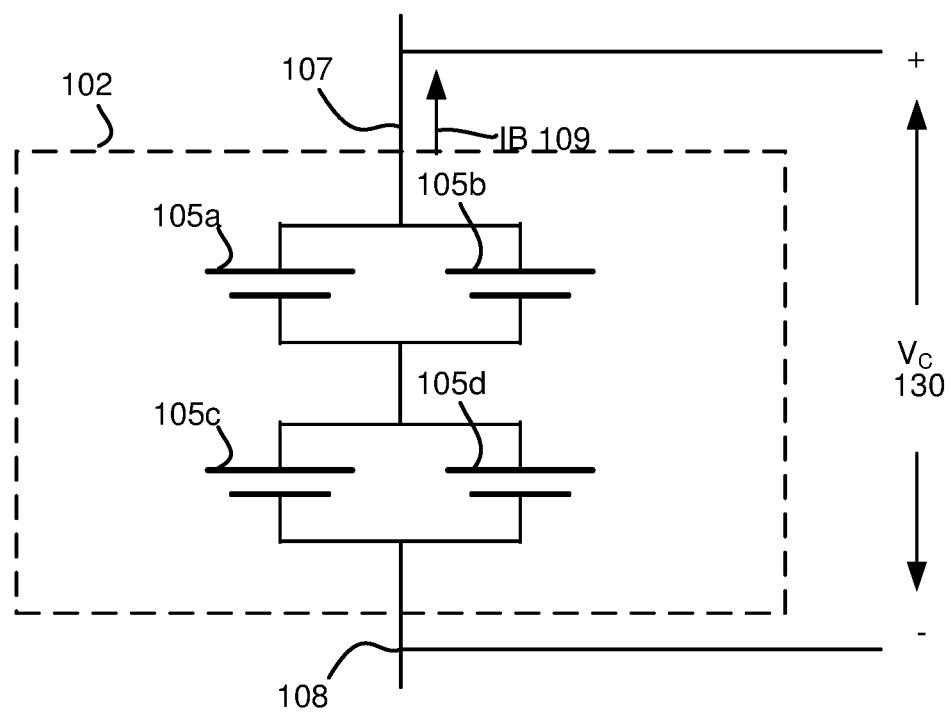
FIG. 2M is a schematic block diagram illustrating one alternate embodiment of a battery unit.

FIG. 2K is a schematic block diagram illustrating one embodiment of the battery cell 105 forming a battery unit 102. In the depicted embodiment, the battery unit 102 includes three battery cells 105*a-c* in parallel electrical communication. The battery unit 102 may include any number of battery cells 105*a-n* and that the battery cells 105 may be organized in multiple configurations. FIGS. 2K-M illustrate three configurations that are exemplary and not limiting.

The battery unit 102 includes a positive connector 107 and a negative connector 108. The positive connector 107 and the negative connector 108 may be in electrical communication with the bypass converter 110. The cell voltage 130 is the voltage between the positive connector 107 and the negative connector 108. The cell current 109 flows through the battery unit 102. The battery unit 102 also includes a cell impedance. In addition, the battery unit 102 may include a cell resistance. The cell resistance may be a series resistance. In addition, the cell resistance may include the resistance of the positive connector 107, the negative connector 108, and all other connections.

FIG. 2L is a schematic block diagram illustrating one alternate embodiment of a battery unit 102. In the depicted embodiment, three battery cells 105*a-c* are depicted in series electrical communication.

FIG. 2M is a schematic block diagram illustrating one alternate embodiment of a battery unit 102. In the depicted embodiment, pairs of battery cells 105*a-b*, 105*b-c* are in parallel electrical communication, while the pairs of battery cells 105*a-d* are in series electrical communication. One or more sets of parallel connected battery cells 105 may be in series electrical communication.

Figure 2N:
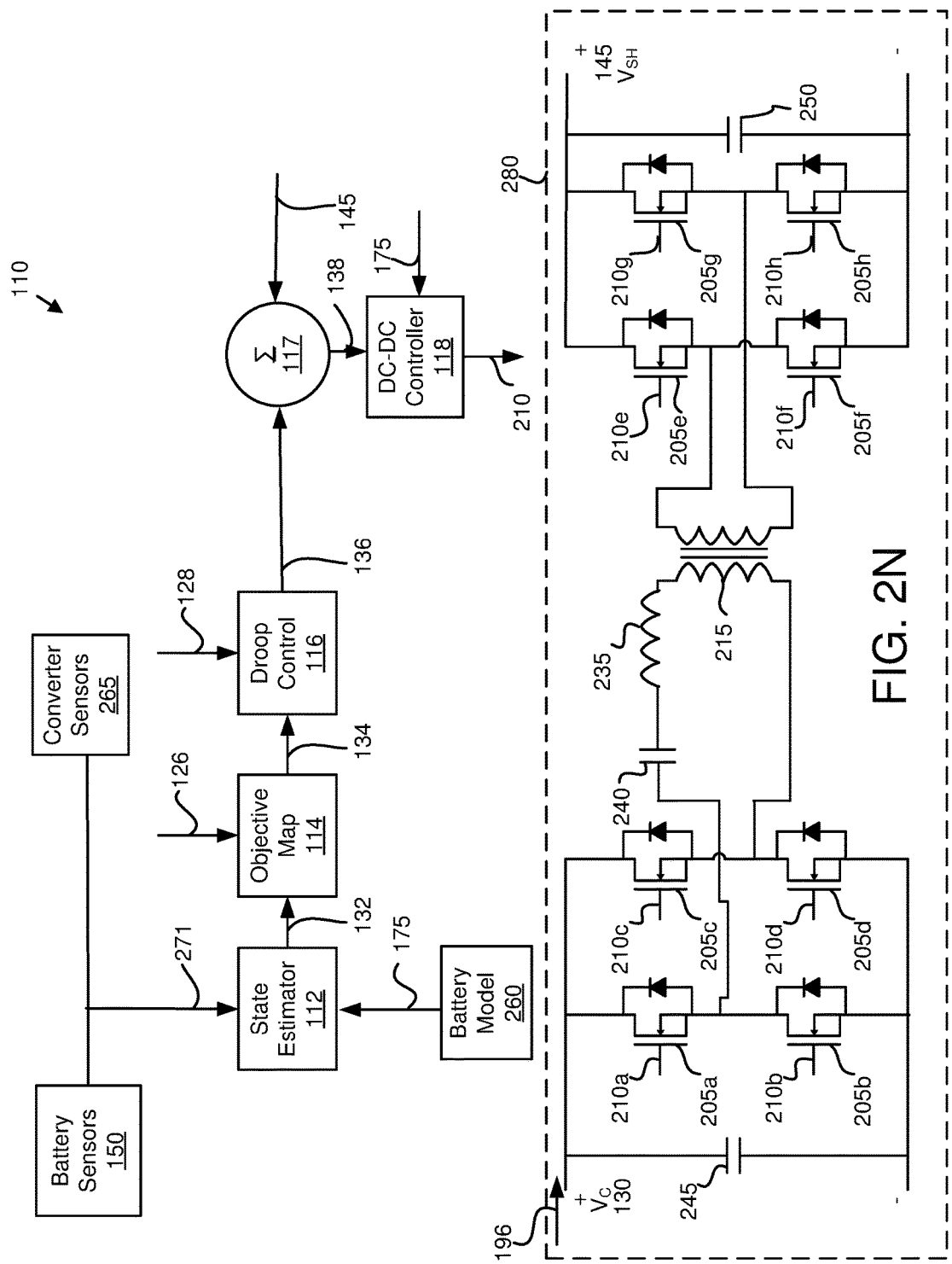
FIG. 2N is a schematic block diagram illustrating one embodiment of a bypass converter.
Figure 20:
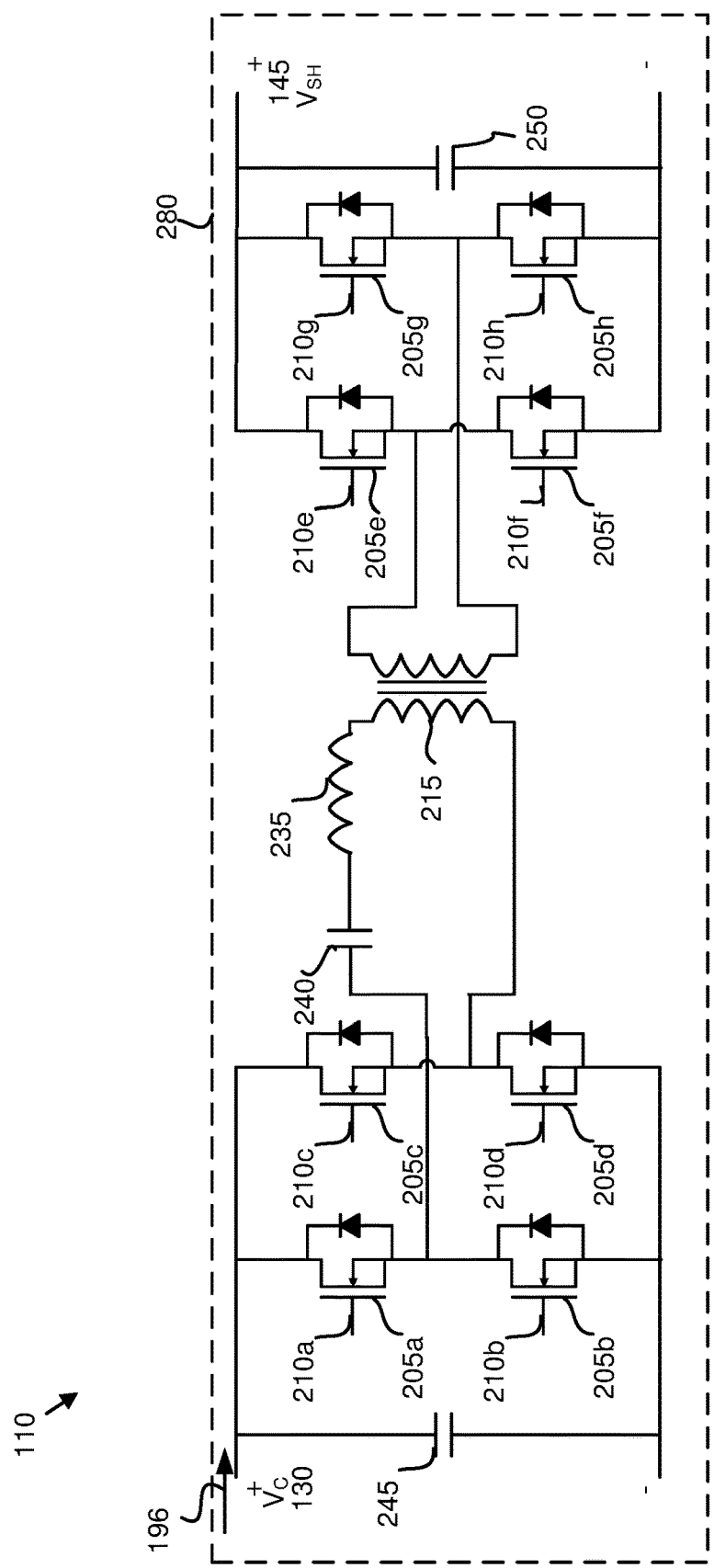

FIG. 2N is a schematic block diagram illustrating one embodiment of the bypass converter 110. In the depicted embodiment, the bypass converter 110 may provide distributed control of a battery cell 105. For distributed control, the bypass converter 110 includes the battery sensors 150, a battery model 260, converter sensors 265, a DC-DC controller 118, and a DC to DC converter 280. The bypass converter 110 receives a bypass converter input current 196 from the battery cell 105.

The state estimator 112 may receive inputs 271 such as the shared bus reference voltage 134 from the battery sensors 150 and/or the converter sensors 265. In the depicted embodiment, the DC-DC converter 280 is a dual active bridge converter. In alternative embodiments, the DC to DC converter 280 may be a half bridge converter, a flyback converter, a push-pull converter, or a switched capacitor converter. Other configurations of DC to DC converter 280 may be employed.

In the depicted embodiment, the DC to DC converter 280 includes a plurality of switches 205, an inductor 235, and a transformer 215. In addition, the DC to DC converter 280 may include one or more capacitors 240, 245, 250. In one embodiment, each switch 205 includes a field effect transistor and one or more diodes, which may include a body diode. The DC-DC controller 118 may control the switches 205 employing duty cycle control, frequency control, phase shift control, and the like.

The battery model 260 may be a mathematical representation of one or more cells of the battery cell 105. In one embodiment, the battery model 260 includes an equivalent circuit representation of the battery cell 105. Alternatively, the battery model 260 may include an electrochemical representation of the cells of the battery cell 105. The battery model 260 may receive state inputs 124 from the battery sensors 150. The battery model 260 may be updated based on the state inputs 124. In addition, the battery model 260 may receive commands and/or inputs from the central controller 160 over the shared communications bus 175. The battery model 260 may be used by the state estimator 112.

In one embodiment, the battery model 260 includes reduced-order electrochemical state estimation of internal battery processes for the battery cell 105. The battery model 260 may determine the battery state response to inputs from the battery sensor 150 of the battery cell 105. The battery model 260 may estimate properties of the battery cell 105. The DC-DC controller 118 may generate the DC-DC controls 210 that drive the switches 205 to control the output of the battery cell 105.

FIG. 2O is a schematic block diagram illustrating one alternate embodiment of a bypass converter 110. Portions of the bypass converter 110 of FIG. 2N are shown. In the depicted embodiment, the central controller 160 controls the battery cells 105 by generating the DC-DC controls 210 for the bypass converter 110.

Figure 3:
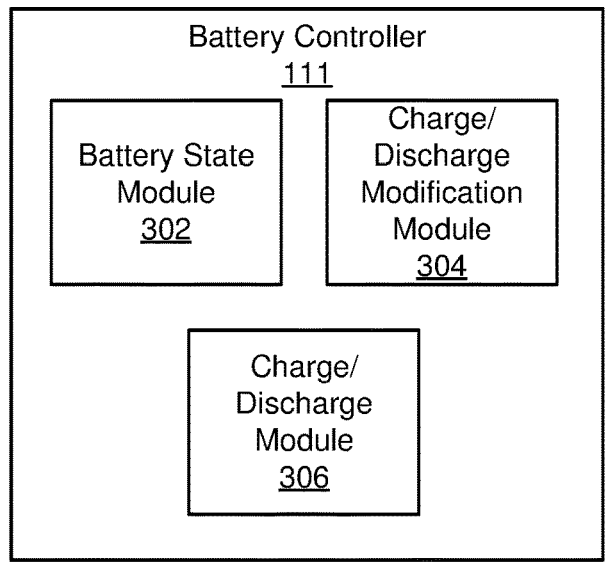
FIG. 3 is a schematic block diagram illustrating one embodiment of an apparatus for battery charging.

FIG. 3 is a schematic block diagram illustrating one embodiment of an apparatus 300 for battery charging. The apparatus 300 includes one embodiment of a battery controller 111 that includes a battery state module 302, a charge/discharge modification module 304, a charge/discharge module 306, which are described below.

The apparatus 300 includes a battery state module 302 that determines a battery state of each battery cell 105 of a plurality of battery cells 105 forming a battery unit 102. A battery state of a battery cell includes a health of the battery cell 105, where a battery state of at least one battery cell (e.g. 105a) of the battery unit 102 differs from a battery state of one or more other battery cells (e.g. 105b-n) of the battery unit 102. The battery state may include a cell state-of-charge, a cell state-of-discharge, a cell capacity, a cell state-of-health, a cell impedance, a cell voltage, a cell current, a minimum cell voltage, a maximum cell voltage, a cell temperature, a cell power capability, a cell history, a cell electrochemical model parameter, a cell life-prognostic model parameter, and the like. The battery state module 302 uses sensor data from battery sensors 150 connected to the associated battery cell (e.g. 105a), and possibly from converter sensors 265 monitoring the associated bypass converter (e.g. 110a) to determine the battery state along with models, equations, and the like. For example, the battery state module 302 may include the battery model 260 depicted in FIG. 2N.

Each battery cell 105 is connected to the shared bus 180 through a bypass converter 110. In one embodiment, each bypass converter 110 is bidirectional and each bypass converter 110 provides charge to the battery cell 105 and provides power from the battery cell 105a to the shared bus 180. In another embodiment, each bypass converter 110 is unidirectional, for example, where battery charging is supplied through the high voltage terminals of the battery unit 102 and enough load is drawn by the shared bus 180 that differences in current from each battery cell 105 to their respective bypass converters 110 maintain positive current only from the bypass converters 110 to the shared bus 180.

The apparatus 300 includes a charge/discharge modification module 304 that determines, based on the determined battery state of each battery cell 105 of the battery unit 102, an amount to vary a charging characteristic for each battery cell 105 of the battery unit 102 with respect to a reference charging characteristic. In one embodiment, the charging characteristic for each battery cell 105 varies as a function of shared bus voltage $V_{SH}$ 145 of the shared bus 180. In another embodiment, the reference charging characteristic directly correlates the reference state-of-charge with the shared bus reference voltage 134 and the charge/discharge modification module 304 varies the charging characteristic of each battery cell 105 with respect to the reference charging characteristic. In other examples, the reference characteristic varies with a reference cell voltage, a reference cell open circuit voltage, a reference cell history, or a reference signal from an equation calculating one or more parameters of the reference state.

In one embodiment, the charging characteristic is a relationship between shared bus voltage $V_{SH}$ 145 and state-of-charge of the battery cell 105. In another embodiment, the charging characteristic is a relationship between shared bus voltage $V_{SH}$ 145 and the reference state, which may be another battery parameter that correlates to state-of-charge of the battery cell 105. For example, the charging characteristic may be shared bus voltage $V_{SH}$ 145 correlated with battery cell open circuit voltage $V_{OC}$. One of skill in the art will recognize other battery parameters that correlate to state-of-charge that may be used in a charging characteristic of a battery cell 105a.

In one example, the charging characteristic for a battery cell 105 may be included in an objective map 114 correlated to the battery cell 105. For example, the objective map 114 may be a lookup table where shared bus voltage $V_{SH}$ 145 or other reference state may be input and a state-of-charge is returned. In another embodiment, the objective map 114 includes a function. Using a lookup table may be advantageous by compensating for non-linear characteristics versus state-of-charge, allowing maximum state-of-charge to be scheduled versus years age (e.g. to deliver uniform capacity for a particular time, such as 10 years, followed by tapering capacity thereafter), allowing maximum state-of-charge to be scheduled versus cell health or differential cell health, and controlling reference battery cell(s) to meet a desired target capacity after a predetermined number of years. The lookup table may include state-of-charge and/or open circuit voltage of a battery cell 105. One of skill in the art will recognize other ways to implement an objective map 114 of a battery cell 105.

The reference charging characteristic represents a particular charging characteristic to be compared with a current battery cell 105 and may be a charging characteristic assigned to a battery cell (e.g. 105a) of the battery unit 102 or may be an ideal charging characteristic, average charging characteristic, etc. that is not specifically correlated to a battery cell 105 of the battery unit 102. In one embodiment, the reference charging characteristic includes a charging characteristic of a healthiest battery cell (e.g. 105a) of the battery unit 102. For example, the battery state module 302 may determine which battery cell 105 of the battery unit 102 is the healthiest battery cell 105a and may use a charging characteristic derived for the healthiest battery cell 105a. In one embodiment, the battery state module 302 modifies an idealized or standard charging characteristic for a battery type matching battery cells 105 of the battery unit 102 based on the battery state of the healthiest battery cell 105a, and the charge/discharge modification module 304 may then be modified based on the resulting charging characteristic of the healthiest battery cell 105a.

In one embodiment, each charging characteristic includes a maximum target state-of-charge. In one embodiment, the maximum target state-of-charge is correlated to a maximum shared bus voltage $V_{SH, max}$ of the shared bus 180. In another embodiment, the maximum target state-of-charge is correlated directly to a maximum target state-of-charge of a reference charging characteristic. The charge/discharge modification module 304, in one embodiment, adjusts the charging characteristic of a particular battery cell (e.g. 105b) in relation to the maximum state-of-charge at the maximum shared bus voltage $V_{SH, max}$ of the shared bus 180. For example, if the maximum state-of-charge of the reference charging characteristic is 100%, the charge/discharge modification module 304 may determine that the maximum state-of-charge for the particular battery cell 105b should be 95%. The charge/discharge modification module 304 may then proportionally adjust the charging characteristic of the battery cell 105b based on the maximum state-of-charge for battery cell 105b. In other embodiments, functions, charging objectives, etc. may be used to modify the charging characteristic of the battery cell 105b consistent with the reduced maximum state-of-charge of the battery cell 105b.

In one embodiment, the reference charging characteristic includes a maximum target state-of-charge of a healthiest battery cell (e.g. 105a) of the battery unit 102 correlated to the maximum value of the reference state or a maximum shared bus voltage $V_{SH, max}$, where the maximum target state-of-charge of the healthiest battery cell 105a is higher than the maximum target state-of-charge of the battery cells 105b-n of the battery unit 102 other than the healthiest battery cell 105a. In another embodiment, the maximum target state-of-charge of a battery cell 105b is proportionally related to the maximum target state-of-charge of the healthiest battery cell 105a based on battery state.

In another embodiment, the reference charging characteristic includes a charging characteristic of an average battery cell (e.g. 105c) and each charging characteristic includes a maximum target state-of-charge correlated to the maximum value of the reference state or the maximum shared bus voltage $V_{SH, max}$ of the shared bus 180. The maximum target state-of-charge of each battery cell 105a,b,d-n is related to the maximum target state-of-charge of the average battery cell 105c based on battery state compared to the battery state of the average battery cell 105c. In another embodiment, the charging characteristic of the average battery cell 105c includes an average battery state based on the battery states of each battery cell 105 of the battery unit 102. In one embodiment, the reference charging characteristic includes a charging characteristic of an average battery cell 105a. In another embodiment, the reference charging characteristic includes a predetermined reference charging characteristic. In one embodiment, the reference charging characteristic includes a charging characteristic for a weakest battery cell (e.g. 105n). Using the weakest battery cell 105n may help to ensure that all of the battery cells 105a-n are above a certain capacity at end-of-life.

In one embodiment, the charge/discharge modification module 304 populates an objective map 114 for each battery cell 105 of the battery unit 102, using a lookup table, equation, etc. and the objective map 114 of a battery cell 105 includes a target state-of-charge for each value of the reference state between a maximum value of the reference state and a minimum value of the reference state or each voltage $V_{SH}$ of the shared bus 180 between at least a maximum shared bus voltage $V_{SH, max}$ and a minimum shared bus voltage $V_{SH, min}$ of the shared bus 180. In another embodiment, the objective map 114 of a battery cell 105 includes a target state-of-charge for each state-of-charge of a reference charging characteristic of a reference state. In other embodiments, the objective map 114 of a battery cell 105 includes is a reference cell voltage, a reference cell open circuit voltage, a reference cell history, or a reference signal from an equation calculating one or more parameters of the reference state.

In another embodiment, each objective map 114 includes a same target state-of-charge for a transition voltage or a control threshold, which may be a transition value of the reference state. The transition voltage is a voltage of the shared bus 180 between the minimum voltage $V_{SH, min}$ and the maximum shared bus voltage $V_{SH, max}$. The transition value of the reference state, in one embodiment, is a point of change of battery control from one mode to another, as explained further in conjunction with the apparatus 400 of FIG. 4. Where the objective map 114 is correlated to the reference charging characteristic, the objective map may include a change at a control threshold, which may represent a particular state-of-charge where the control strategy changes. Other versions of an objective map 114 are correlated to a reference cell voltage, a reference cell open circuit voltage, a reference cell history, a reference signal from an equation calculating one or more parameters of the reference state, and the like.

The apparatus 300 includes a charge/discharge module 306 that adjusts charging and discharging of a battery cell (e.g. 105a) of the battery unit 102 based on the charging characteristic of the battery cell 105a and based on the reference state. In one embodiment, each charge/discharge module 306 includes a droop controller 116 that provides a control characteristic for each bypass converter 110 for control of output voltage of each bypass converter 110. The control characteristic, in one embodiment, includes a ratio of output voltage of the bypass converter 110, which is shared bus voltage $V_{SH}$, to output current of the bypass converter 110.

The ratio is a value where output voltage of the bypass converter 110 decreases as output current of the bypass converter 110 decreases and the bypass converters 110 connected to the shared bus 180 each contribute current to the shared bus 180 based on the charging characteristic of the respective bypass converters 110 and battery cells 105 while output voltage of each bypass converter 110 remains within a voltage regulation range. For example, the regulation range of the shared bus may be between 12 volts ("V") and 13 V. In the example, each objective map 114 includes a minimum target state-of-charge corresponding to 12 V and a maximum target state-of-charge corresponding to 13 V.

In one embodiment, each bypass converter (e.g. 110a) is controlled by a separate charge/discharge module 306 and autonomously controls charging and discharging of the connected battery cell (e.g. 105a) independent of other bypass converters (e.g. 110b-n) and associated charge/discharge modules 306 of other battery cells (e.g. 105b-n) of the battery unit 102, where each charge/discharge module 306 varies charging and discharging of the associated battery cell 105*a* based on the charging characteristic for the associated battery cell 105*a* as determined by the charge/discharge modification module 304.

Figure 4:
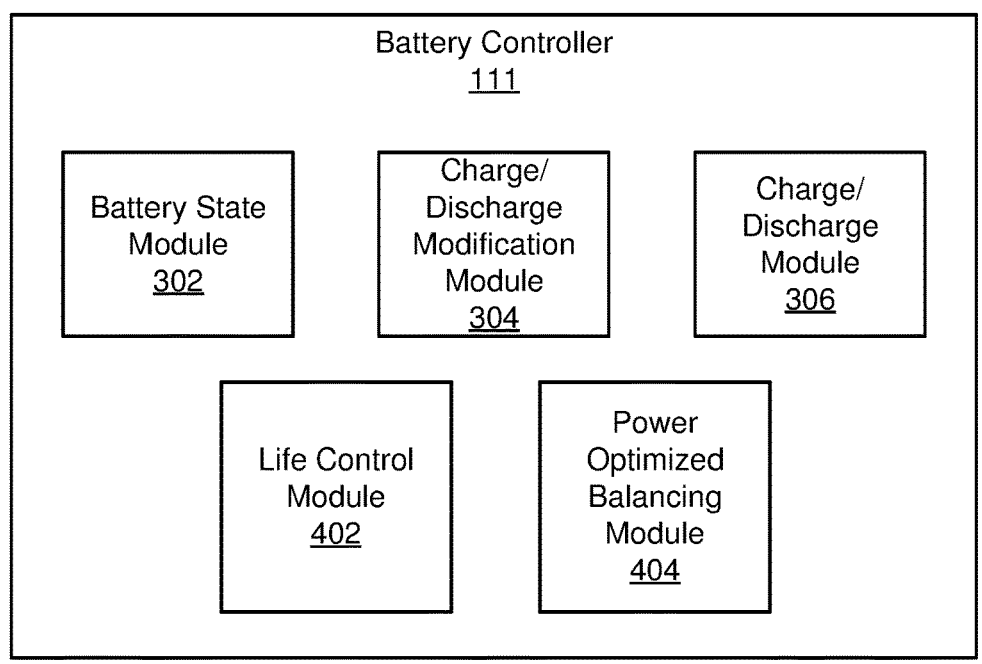
FIG. 4 is a schematic block diagram illustrating one embodiment of an alternate apparatus for battery charging.

FIG. 4 is a schematic block diagram illustrating one embodiment of an alternate apparatus 400 for battery charging. The apparatus 400 includes another embodiment of the battery controller 111 with a battery state module 302, a charge/discharge modification module 304, and a charge/discharge module 306, which are substantially similar to those described above in relation to the apparatus 300 of FIG. 3. The apparatus 400 may also include in various embodiments, a life control module 402 and a power optimized balancing module 404, which are described below.

The apparatus 400 includes a life control module 402 that that determines a maximum target state-of-charge for each battery cell 105 based on the battery state of each battery cell 105 compared to the reference charging characteristic and populates the objective map 114 of each battery cell 105 of the battery unit 102 to have the same target state-of-charge at the transition value of the reference state as the reference charging characteristic, and to diverge in target state-of-charge from the reference charging characteristic as the reference state approaches the maximum value of the reference state or the shared bus voltage approaches the maximum voltage $V_{SH,max}$ of the shared bus 180. In one embodiment, the objective map 114 for each battery cell 105 of the battery unit 102 diverges linearly from the same target state-of-charge at the transition value of the reference state to the maximum target state-of-charge of each battery cell 105 of the battery unit 102. The life control module 402 and associated charging characteristics above the transition value of the reference state are described in more detail with respect to FIG. 5B.

The apparatus 400 includes a power optimized balancing module 404 that determines values for the objective map 114 for a battery cell (e.g. 105*a*) of the battery unit based on an internal resistance of the battery cell 105*a*. The target state-of-charge for a particular value of the reference state below the transition value of the reference state or shared bus voltage $V_{SH}$ below the transition voltage, a particular state-of-charge of the reference state, etc. is correlated to a battery cell voltage $V_C$ 130 at or above a minimum battery cell voltage $V_{cell, min}$ plus a voltage drop across the internal resistance of the battery cell 105*a* at a maximum battery cell current $I_{max}$.

Typically, internal resistance of battery cells varies based on various parameters, such as battery age, battery health, and other factors. Batteries are often modeled as a battery cell plus a resistance internal to a battery cell 105 where voltage at terminals of the battery cell voltage $V_C$ 130 differs from the internal cell voltage based on voltage drop across the internal resistance. One objective in battery management may be to prevent cell voltage of a battery cell 105 from dropping below a minimum battery cell voltage $V_{cell, min}$, for example, to increase battery life, prevent damage, etc. The battery state module 302 for a battery cell 105 may estimate internal cell resistance using the battery model 260, state estimator 112, input from battery sensors 150, input from converter sensors 265, etc. Often weaker battery cells 105 have a higher internal resistance than healthier battery cells 105.

The power optimized balancing module 404 adjusts the objective map 114 of a particular battery cell (e.g. 105*a*) based on the minimum allowable cell voltage so that the cell voltage for the battery cell 105*a* does not drop below the minimum cell voltage when the battery cell 105*a* is discharging at a maximum allowable cell current. Note that cell voltage may dip on a transient basis due to chemical reactions within the battery to supply charge during discharging. The voltage drop across the internal resistance of the battery cell 105*a* is highest at the maximum allowable discharge or charge cell current. Typically cell voltage, which may be expressed as open circuit voltage $V_{OC}$ of a battery cell 105, correlates with state-of-charge of the battery cell 105 so that maintaining the state-of-charge at a particular level at the condition of the shared bus voltage minimum $V_{SH,min}$, or the reference state reaching a minimum value of the reference state, will maintain the cell voltage of the battery cell 105 at a particular level. The particular level is chosen accounting for voltage drop across the internal resistance of the battery cell 105 at the maximum cell discharge current.

In one embodiment, the power optimized balancing module 404 determines a minimum target state-of-charge corresponding to the minimum shared bus voltage $V_{SH,min}$ or the reference state reaching a minimum value of the reference state, such as a minimum state-of-charge, based on the internal resistance of the battery cell 105, where the minimum target state-of-charge of the battery cell is determined to maintain the battery cell voltage $V_C$ 130 at the minimum battery cell voltage $V_{cell, min}$, while the shared bus 180 is at the minimum shared bus voltage $V_{SH,min}$, the reference state reaching a minimum value of the reference state, accounting for voltage drop across the internal resistance while current for the battery cell is at a maximum cell current $I_{max}$. In one embodiment, the power optimized balancing module 404 populates the objective map 114 of the battery cell 105 to transition linearly between the minimum target state-of-charge and the same target state-of-charge at the transition voltage, which is explained further in relation to FIG. 5B.

Figure 5A:
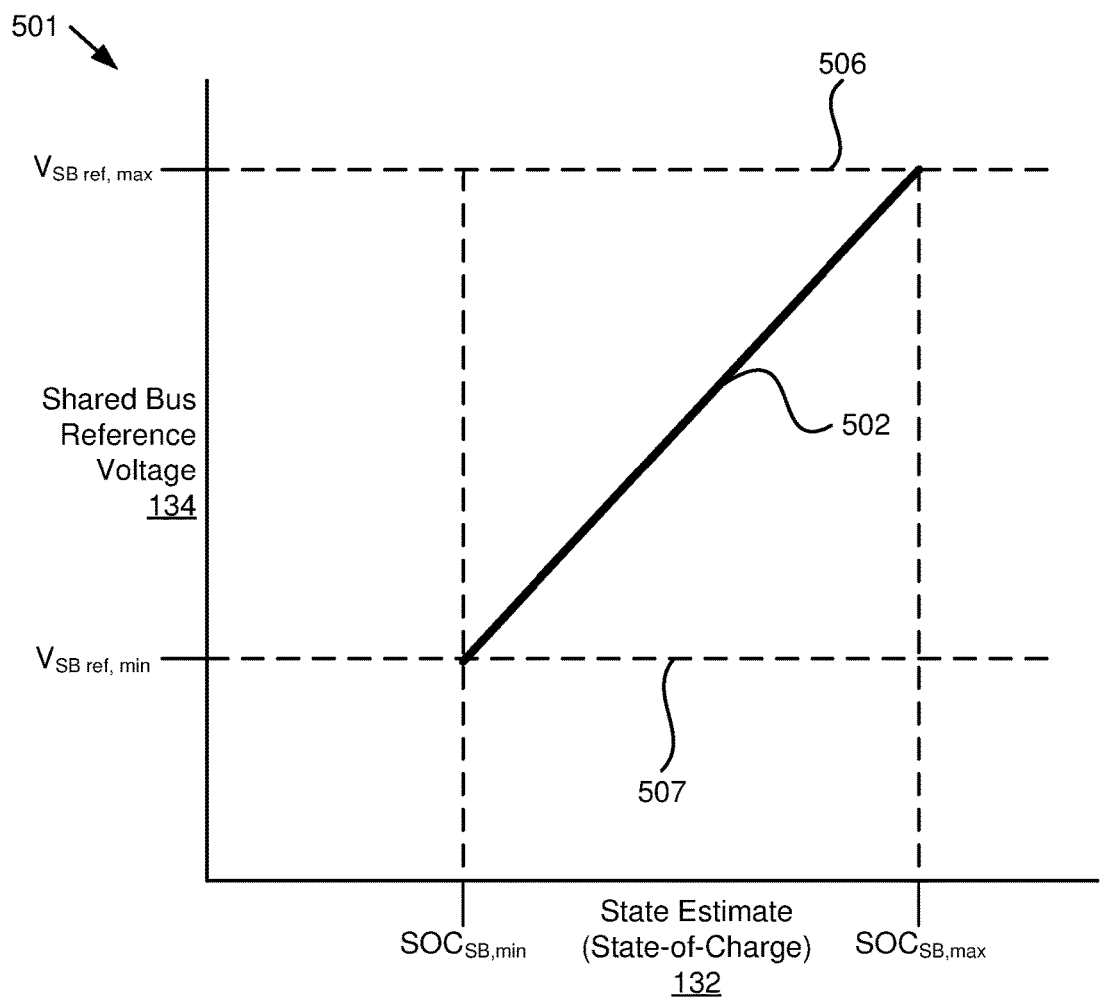
FIG. 5A is a graph illustrating one embodiment of control objectives.

FIG. 5A is a graph 501 illustrating one embodiment of control objectives. The control objectives may be embodied in the objective map 114. The graph 501 shows relationship of shared bus reference voltage 134 and a state estimate 132. The state estimate, in one embodiment, corresponds to a state-of-charge of a battery cell 105. In one embodiment, the battery state is controlled to a target state-of-charge during the charging and/or discharging of a battery cell 105 based on an objective map 114. The control limit 502.

of the control objective in FIG. 5A depicts a correlation between the state estimate (state-of-charge) 132 and a shared bus reference voltage 134 used to control the droop controller 116. The control limit 502 does not exceed a maximum shared bus reference voltage $V_{SB\ ref,\ max}$ 506. For the reference state, at the maximum shared bus reference voltage $V_{SB\ ref,\ max}$ 506, the battery cell state typically corresponds to a maximum state-of-charge for the particular battery cell 105.

The maximum state-of-charge for a battery cell 105 may be expressed in percent and may be 100%. In applications where life expectancy is more important than an amount of power available for use, the maximum state-of-charge for the reference state may be lower than 100%, such as 90% or 95%. In one embodiment, a healthiest battery cell (e.g. 105*a*) may be determined and chosen and a charging characteristic of the healthiest battery cell 105*a* may be designated as the reference state or reference charge characteristic. The battery controller 111 may control charging of the healthiest battery cell 105*a* to a maximum state-of-charge ($SOC_{max,i}$), which occurs at a maximum value of the reference state or a maximum shared bus voltage $V_{SH,\ max}$. The maximum state-of-charge also corresponds to the maximum value of the reference state or the maximum shared bus voltage $V_{SH,\ max}$.

Other less healthy battery cells 105b-n may be controlled so that at the maximum shared bus voltage $V_{SH,\ max}$, or at a maximum value of the reference state, such as a maximum state-of-charge, the maximum state-of-charge of a less healthy battery cell 105b-n is less than the maximum reference state-of-charge for the healthiest battery cell 105a. For example, if the maximum state-of-charge for the healthiest battery cell 105a is 100%, a less healthy battery cell (e.g. 105b) may have a maximum state-of-charge of 95%. Reducing the maximum state-of-charge for less healthy battery cells 105b-n typically extends the life of the less healthy battery cells 105b-n. In one embodiment, the maximum state-of-charge for each of the less healthy battery cells 105b-n are chosen and customized according to health of each less healthy battery cell 105b-n so that at an anticipated end of life, each of the battery cells 105 has a same capacity or nearly the same capacity. Since performance and useful life of the battery unit 102 is typically limited by one or more weakest battery cells 105, having all of the battery cells 105 at about the same capacity and health level extends the life of the battery unit 102 and may also increase useful capacity of the battery unit 102 prior to end of life.

Where the reference state is the shared bus voltage $V_{SH}$ 145, the shared bus reference voltage 134 extends between a maximum shared bus reference voltage $V_{SB\ ref,\ max}$ 506 and a minimum shared bus reference voltage $V_{SB\ ref,\ min}$ 507. Typically, the difference between the maximum and minimum shared bus voltage corresponds to an allowable voltage range regulated by the various bypass converters 110 and associated feedback control loops, which include a droop control technique. Since the bypass converters 110 are in parallel, a tightly regulated shared bus voltage is typically difficult to maintain without unwanted unequal current sharing between the bypass converters 110. Thus, a droop characteristic where the shared bus voltage is allowed to vary over a range allows for more equal or more controllable current sharing between bypass converters 110. To control the various bypass converters 110 so that the associated battery cells 105 each achieve a desired maximum state-of-charge, a control reference signal is used and varied as needed. The shared bus reference voltage 134, in one embodiment, is used as a control reference signal for the droop controllers 116.

While the control reference signal is called a shared bus reference voltage 134, the control reference signal may represent various control parameters. For example, the control reference signal may represent a target state-of-charge for a particular battery cell (e.g. 105b) and may be compared to a calculated state-of-charge from the battery state module 302 to produce an error signal used by a feedback loop of the associated bypass converter 110b to drive battery cell current to achieve the desired target state-of-charge for the battery cell 105b. In another embodiment, the control reference signal may represent cell open circuit voltage $V_{OC}$ and may be compared to an estimated open circuit voltage $V_{OC}$ of the battery cell 105b. In another embodiment, the control reference signal may represent cell voltage $V_C$ and may be compared to an estimated or measured cell voltage $V_C$ 130 of the battery cell 105b, where cell current and internal resistance may be taken into account. One of skill in the art will recognize other ways to implement a control reference signal. For simplicity, the control reference signal is referred to herein as shared reference voltage 134. The actual voltage range of the shared bus reference voltage 134 may correlate to a control range of hardware circuits controlling duty cycle, conduction angle, phase angle, etc. of the bypass converter 110b, thus the mapping of FIG. 5A may represent a mapping of the state estimate (i.e. state-of-charge, open circuit voltage, etc.) to the actual voltage fed to the bypass converter 110a.

In one embodiment, the control objectives of FIG. 5A include a particular state estimate 132, which may be state-of-charge, for each shared bus voltage $V_{SH}$ 145 within the control range from the maximum $V_{SH,\ max}$ and the minimum $V_{SH,\ min}$, which are located in the objective map 114. In another embodiment, the control objectives of FIG. 5A include a particular state estimate 132 for each value of the reference state between a maximum value of the reference state and a minimum value of the reference state. For example, an objective map 114 of a battery cell (e.g. 105b) may include state-of-charge values between a minimum state-of-charge of 30% and a maximum state-of-charge of 95%. The control objectives of FIG. 5A may then have corresponding shared bus reference voltages 134 corresponding to target state-of-charge values between 95% and 30%. Where the reference state is shared bus voltage $V_{SH}$ 145, for a particular shared bus voltage less than the maximum shared bus voltage $V_{SH,\ max}$, there is a target state-of-charge for the battery cell 105b. For example, if the voltage range of the shared bus 180 is 11.5 volts ("V") to 12.5 V, for a shared bus voltage $V_{SH}$ 145 of 12.2 V, the target state-of-charge may be 85%. The shared bus reference voltage 134 may be 3.85 V or some other value representative of a desired target state-of-charge. The collection of target state-of-charges and corresponding shared reference bus voltages 134 form a charging characteristic and correspond to a control objective.

Where the reference state is shared bus voltage $V_{SH}$ 145, the battery controller 111 of a particular battery cell (e.g. 105b) may receive information from sensors, such as cell voltage, cell temperature, cell current, etc. to calculate a state-of-charge for the battery cell 105b. Where the actual state-of-charge of the battery cell 105b differs from the target state-of-charge for a current voltage of the shared bus 180, the battery controller 111 of the battery cell 105b may adjust charging or discharging of the particular battery cell 105b to achieve the target state-of-charge corresponding to the current shared bus voltage $V_{SH}$ 145, the current state-of-charge, cell open circuit voltage, etc. of the reference state. Typically, a particular target state-of-charge corresponds to a particular open circuit voltage $V_{OC,b}$ of the battery cell 105b, which typically differs from the battery cell voltage $V_C$ 130 at the terminals of the battery cell 105b due to internal battery resistance, and the battery resistance typically changes over time. Battery models may be used to determine the open circuit voltage $V_{OC,b}$ of the battery cell 105b under current operating conditions of the battery cell 105b, such as cell current, cell temperature, etc. A particular shared bus reference voltage 134 may be used by the battery controller 111 of the battery cell 105b to achieve a particular target state-of-charge corresponding to a current shared bus voltage $V_{SH}$ 145 or a current value of the reference state.

Note that the shared bus reference voltage 134 may differ from the shared bus voltage $V_{SH}$ 145 for a particular target state-of-charge. For example, a battery cell 105 may have an open circuit voltage range of 3 V to 4 V, which may correspond to various state-of-charge levels. If the shared bus 180 varies over a control range from 12 V to 13 V, for a shared bus voltage $V_{SH}$ 145 of 12.6 V, the target state-of-charge from the objective map 114 of the battery cell 105 may be 55%, which may correspond to a shared bus reference voltage 134 of 3.55 V or other voltage value corresponding to a state-of-charge of 55%, which may then be used by the battery controller 111 of the battery cell 105 to drive the battery cell 105 to the target state-of-charge of 55%.

For the particular target state-of-charge for the battery cell 105b, the battery controller 111 for the battery cell 105b may adjust the gain across the bypass converter 110b for the battery cell 105b to increase or decrease battery charging or discharging to achieve the target state-of-charge for the current shared bus voltage $V_{SH}$ 145 or other reference state. In some embodiments, each bypass converter 110 for each battery cell 105 independently controls the battery charging/discharging so that each battery cell (e.g. 105b) achieves the particular target state of the battery cell 105b.

The charging characteristic for each battery cell 105, in one embodiment, is in an objective map 114 so that each battery cell 105 has a separate objective map 114. The control objective in FIG. 5A is depicted as a straight line, which may also correspond to a charging characteristic that is a straight line. Other charging characteristics are possible that differ from a straight line. In one embodiment, each objective map 114 includes a table with various shared bus voltages $V_{SH}$ 145, corresponding target state-of-charges and corresponding shared bus reference voltages 134. Values between entries in the table may be interpolated. In another embodiment, each objective map 114 includes a function with an input variable of shared bus voltage $V_{SH}$ 145 and an output variable of a target state-of-charge. Another function may use target state-of-charge as an input and may output shared bus reference voltage 134. The function may be for a straight line or may be a more complex equation.

In another embodiment where the reference state is shared bus voltage $V_{SH}$ 145, an objective map 114 includes a direct correlation between shared bus voltage $V_{SH}$ 145 and shared bus reference voltage 134 recognizing that each value of shared bus reference voltage 134 correlates to a particular state-of-charge. The charge/discharge modification module 304 may translate a desired maximum state-of-charge for a battery cell 105 to a corresponding shared bus reference voltage 134.

Note that while the shared bus voltage $V_{SH}$ 145 includes a maximum $V_{SH, max}$ and a minimum $V_{SH, min}$, the values in the objective map 114 are steady state values and one of skill in the art will recognize that the shared bus voltage $V_{SH}$ 145 may briefly exceed the maximum $V_{SH, max}$ and fall below the minimum $V_{SH, min}$ on a transient basis. Likewise, the target state-of-charge for a battery cell 105 may differ from an actual state-of-charge of a battery cell 105 on a transient basis while the battery controller 111 for the battery cell adjusts charging/discharging to achieve the target state-of-charge.

The state-of-charge for a particular battery cell (e.g. 105a) may then correlate to a shared bus reference voltage 134. The shared bus reference voltage 134 may be used as an input for the droop controller 116 and may correlate with a particular state-of-charge for the battery cell 105a. The shared bus reference voltage 134 is set by a current shared bus voltage $V_{SH}$ 145, a desired state-of-charge from the objective map 114, or other reference state. The state-of-charge for the current shared bus voltage $V_{SH}$ 145 may then be used with the control function depicted in FIG. 5A to produce a shared bus reference voltage 134 required to drive the battery cell 105a to the target state-of-charge for the current shared bus voltage $V_{SH}$ 145 and the droop controller 116 then drives current in or out of the battery cell 105a to get the desired target state-of-charge for the battery cell 105a, or in another embodiment to an appropriate cell voltage $V_C$ 130. In this other embodiment, due to the fact that the cell voltage $V_C$ 130 rarely equals the open circuit voltage $V_{OC}$ for the battery cell 105a, battery models along with model predictive control ("MPC") may be used to derive a current cell voltage $V_C$ 130 that correlates to a current open circuit voltage $V_{OC}$, which correlates to the desired target state-of-charge.

Where shared bus voltage $V_{SH}$ 145 is the reference state, while the droop controller 116 for a particular battery cell (e.g. 105a) may be useful to allow a voltage droop that correlates to output current of the associated bypass converter 110a, the droop function, in one embodiment, is realized on a battery unit 102 basis by correlating a particular allowable voltage range of the shared bus 180 with state-of-charge for the reference charging characteristic so that as the battery cells 105 are depleted, the shared bus voltage $V_{SH}$ 145 is reduced. While this is a "voltage droop," the droop controllers 116 allow better current sharing between bypass converters 110 on a transient basis by paralleling bypass converters 110 with a lower output impedance than if another type of control is used, such as proportional-integral ("PI") control or proportional-integral-derivative ("PID") control. However, other control techniques other than a droop control technique may be used that allow appropriate current sharing between bypass converters 110a.

Figure 5B:
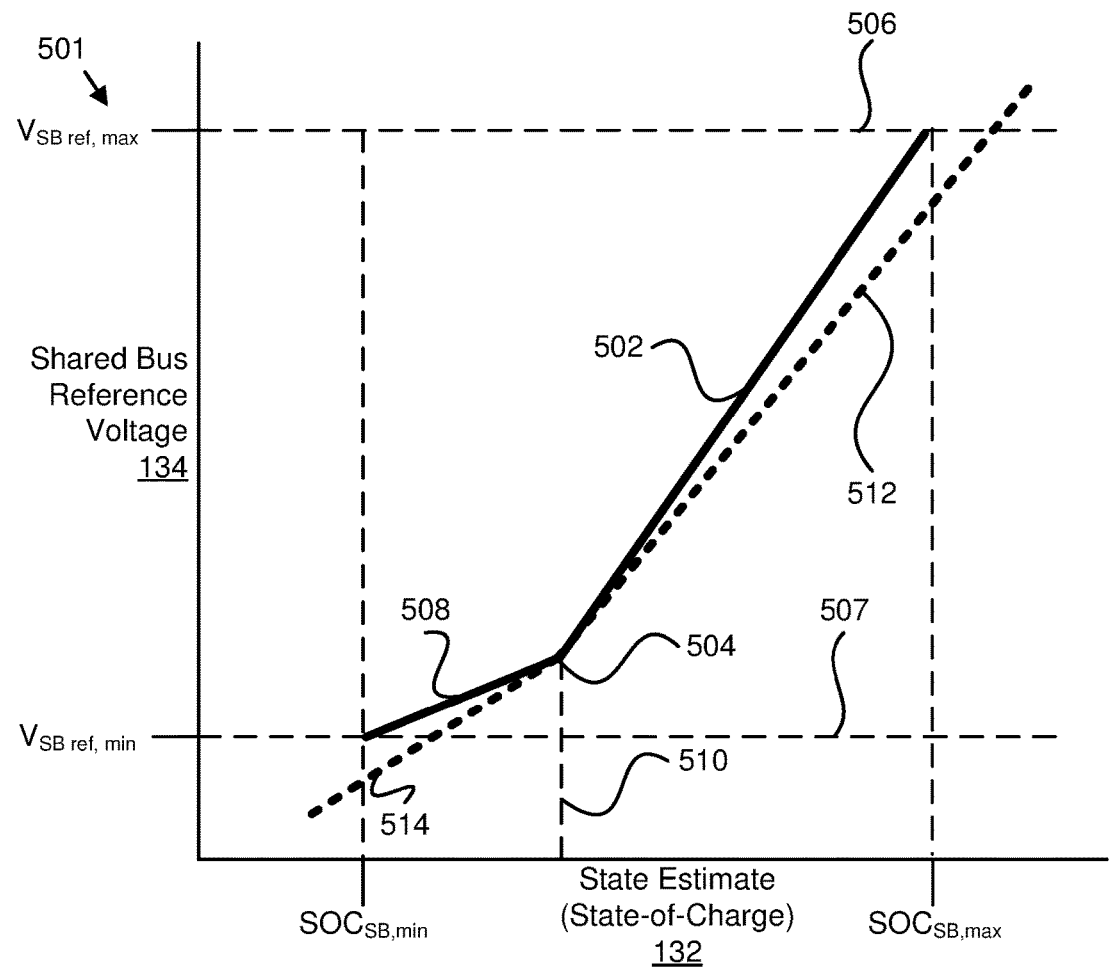
FIG. 5B is a graph illustrating one alternate embodiment of control objectives.

FIG. 5B is a graph 501 illustrating another alternate embodiment of control objectives. As in the graph 501 of FIG. 5A, relationship of shared bus reference voltage 134 and a state estimate 132, such as state-of-charge. The control threshold 504, which may also be correlated to a transition voltage where the reference state is shared bus voltage $V_{SH}$ 145, is also shown for a specified state estimate value 510 or state-of-charge. A lower control limit 508 is used for a state estimate 132 that is less than the control threshold 504 while an upper control limit 502 is used for state estimate 132 that is greater than the control threshold 504. The life control module 402 may be used to implement the upper control limit 502.

In one embodiment, the control threshold 504 is a transition from a life optimized control technique to a power optimized balancing control technique. The life optimized control technique is where a maximum state-of-charge for each battery cell 105 is modified to extend the life of weaker cells so that there is less of a difference in capacity between battery cells 105 of the battery unit 102 at end-of-life. The lower control limit 508, for below the control threshold 504 may be used for a power optimized balancing to keep the open circuit voltage $V_{OC}$ of a battery cell 105 above a minimum cell voltage. The power optimized balancing module 404 may be used to implement the lower control limit 508.

Figure 5C:
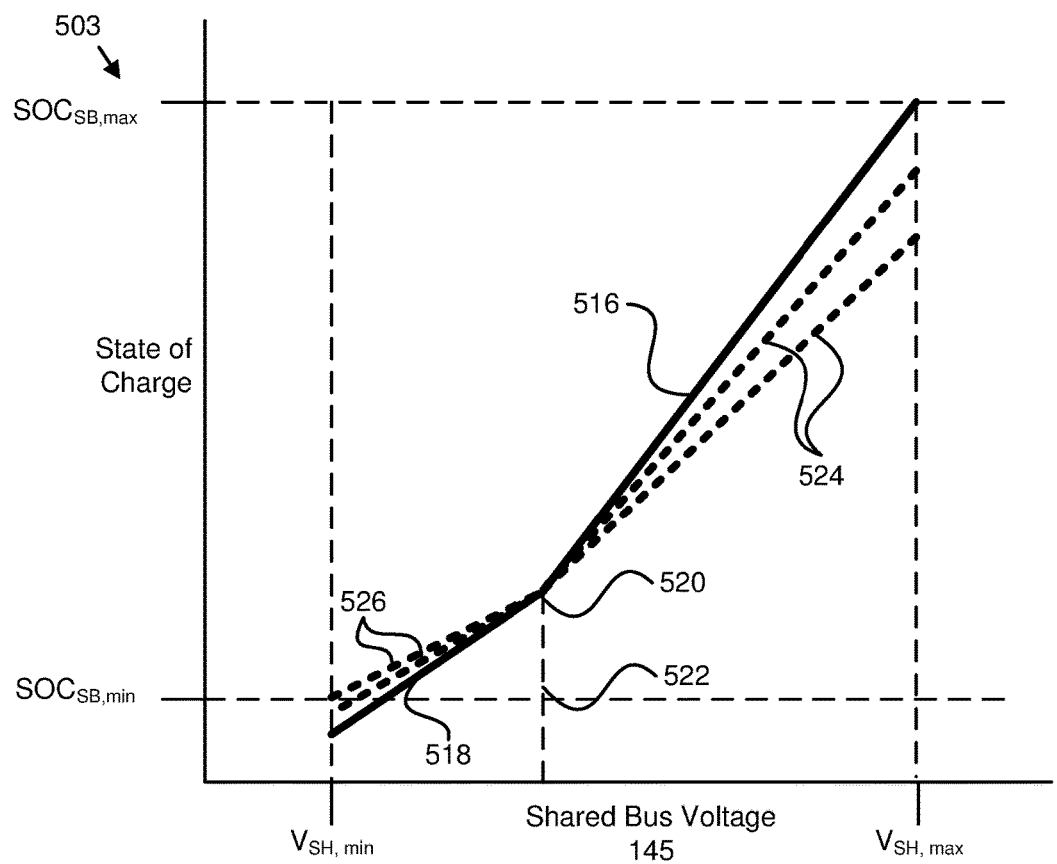
FIG. 5C is a graph illustrating charging characteristics of several battery cells 105.

For a particular battery cell 105, while state-of-charge correlates to open circuit voltage $V_{OC}$, battery cell voltage $V_C$ 130 differs from open circuit voltage open circuit voltage $V_{OC}$ due to internal resistance of the battery cell 105. The charging characteristic may correlate shared bus voltage $V_{SH}$ 145 with battery state-of-charge or open circuit voltage $V_{OC}$, as is depicted in FIG. 5C, but the state-of-charge or open circuit voltage $V_{OC}$ must then be correlated with battery cell voltage $V_C$ 130 where battery cell voltage $V_C$ 130 is used as a control signal for the droop controller 116. The shared bus reference voltage 134 is then modified to account for internal cell resistance, depending on the control mode employed at a given state-of-charge.

Below the control threshold 504 when operating in the power optimized balancing control technique, the lower control objective, in one embodiment, is based on the minimum state-of-charge $SOC_{SB,min}$ and will have a minimum corresponding shared bus reference voltage $V_{SB\ ref,\ min}$, which is higher than an open circuit voltage $V_{OC}$ corresponding to the minimum state-of-charge $SOC_{SB,min}$ due to the potential worst case voltage drop across the internal resistance of the battery cell 105 at maximum cell current $I_{max}$. The minimum state-of-charge $SOC_{SB,min}$ is set to maintain the open circuit voltage $V_{OC}$ above a minimum cell voltage. In one embodiment, accounting for the worst case voltage drop changes the trajectory of the lower control limit 508 below the control threshold 504. In one embodiment, the lower control limit 508 is linear, as shown in FIG. 5B, but may also be a curve or other trajectory.

A second control objective for a different battery cell 105, depicted as a dashed line, includes a different an upper control limit 512 and a lower control limit 514. The second control objective may correspond with a healthier battery cell (e.g. 105a) or a reference charging characteristic of a reference state. The healthier battery cell 105a/reference charging characteristic includes an upper control limit 512 that has a different maximum state-of-charge $SOC_{SB,\ max}$, which is higher than the less healthy battery cell 105, and a different maximum shared bus reference voltage $V_{SB\ ref,\ max}$, which is higher than the maximum shared bus reference voltage $V_{SB\ ref,\ max}$ of the less healthy cell 105, to drive the cell voltage $V_C$ 130 to a higher value, which causes the state-of-charge of the healthier cell 105a/reference charging characteristic to reach the higher maximum state-of-charge $SOC_{SB,\ max}$, as shown in FIG. 5C.

The two upper control limits 502, 512 reach a common state-of-charge 510, as will be seen in FIG. 5C, so the shared bus reference voltage 134 reaches a common point at the control threshold 504. However, accounting for differing internal resistance of the battery cells 105 may require some modification to the control objective in FIG. 5B at the control threshold 504. The upper control limit 512, all the way to the maximum shared bus reference voltage $V_{SB\ ref,\ max}$, may take into account voltage drop across the internal resistance of the battery cell 105. The higher shared bus reference voltage 134 drives the healthier battery cell 105a to a higher open circuit voltage $V_{OC}$ and different cell voltage $V_C$ 130. Therefore, the shared bus reference voltage 134 is higher for the second control objective to drive this healthier battery cell 105a to a higher state-of-charge than the first control objective.

The second lower control limit 514 has a lower minimum state-of-charge, because typically a healthier battery cell 105a has a lower resistance than a less healthy battery cell 105, meaning the healthier battery cell 105a can deliver maximum rated current $I_{max}$ from a lower state-of-charge than a less healthy, higher resistance battery cell 105 within the same minimum cell voltage constraint. The minimum shared bus reference voltage $V_{SB\ ref,\ min}$ is lower for the second lower control limit 514 than for the first lower control limit 508 to drive the healthier cell 105a to the lower minimum state-of-charge.

The slope of the control objectives in FIG. 5B change at the transition point due to a change in control technique. Above the control threshold 504, state-of-charge dominates and is controlled to a specific value for each battery cell 105. Below the control threshold 504 in the power optimized balancing control method, internal resistance become more of a factor to keep the battery cells 105 from dipping below the minimum allowable cell voltage.

FIG. 5C is a graph 503 illustrating charging characteristics of several battery cells 105. The graph 503 depicts a charging characteristic for a healthiest battery cell (e.g. 105a) as a solid line with an upper target state-of-charges 516 corresponding to shared bus voltages $V_{SH}$ 145. At a maximum shared bus voltage $V_{SH,\ max}$, the upper target state-of-charges 516 terminates in a maximum state-of-charge. For example, the maximum state-of-charge for the healthiest battery cell 105a may be 100%.

The graph 503 also depicts a lower target state-of-charges 518 for various shared bus voltages $V_{SH}$ 145. The charging characteristic changes slope at a transition point 520 corresponding to a transition voltage 522 of the shared bus 180. Additional charging characteristics for less healthy cells (e.g. 105b, 105c) are also depicted with upper control limits 524 and lower control limits 526. The upper control limits 524 of the less healthy cells 105b, 105c include a lower maximum state-of-charge than for the healthiest cell 105a. In one embodiment, for shared bus voltages $V_{SH}$ 145 above the transition point 520, the charging characteristics all merge at the transition point 520 with a same state-of-charge and diverge linearly to the various maximum state-of-charges. In other embodiments, the upper control objectives (target state-of-charges) 516, 524 diverge in a more complex way, such as a curve or based on a function.

The lower target state-of-charges 518 for the healthiest battery cell 105a is typically lower than the other lower target state-of-charge 526 because typically the healthiest battery cell 105a has a lower state-of-charge at the minimum shared bus voltage $V_{SH,\ min}$ due to lower internal resistance. Typically, a less healthy battery cell (e.g. 105b) may have higher internal resistance than a healthier cell battery cell (e.g. 105a). The lower minimum state-of-charge for the healthiest battery cell 105a is permissible due to its lower internal resistance than other battery cells 105.

Figure 6A:
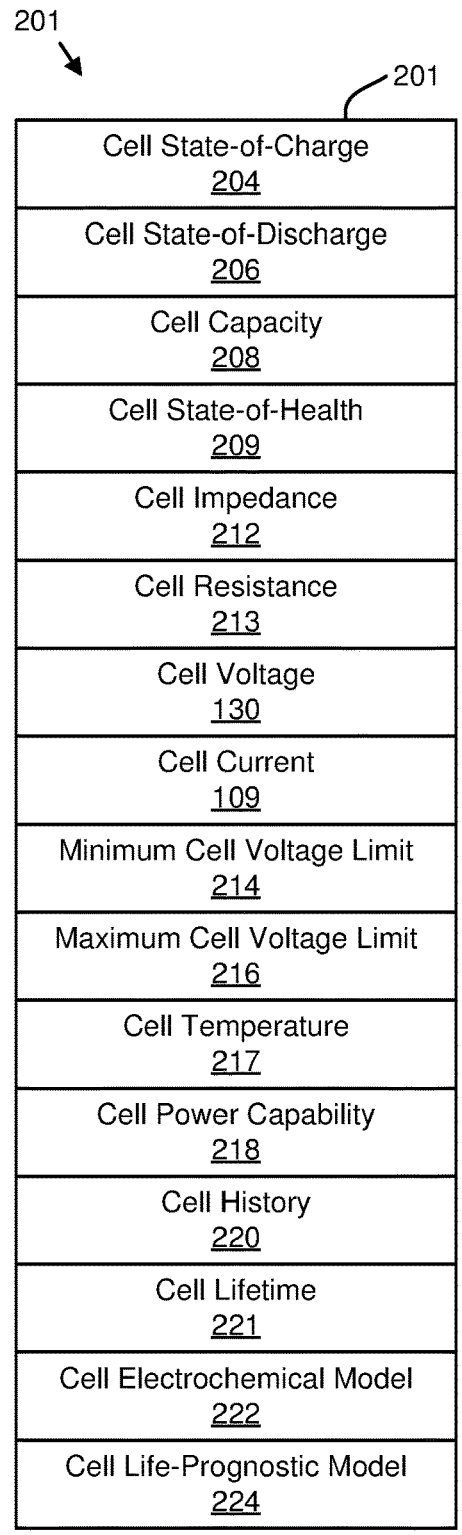
FIG. 6A is a schematic block diagram illustrating one embodiment of battery state data.

FIG. 6A is a schematic block diagram illustrating one embodiment of battery state data 201. The battery state data 200 maybe organized as a data structure in a memory. The battery state data 200 may be stored in the DC-DC controller 118, the central controller 160, or combinations thereof. In the depicted embodiment, the battery state data 200 includes a battery state 201 comprising the cell state-of-charge 204, the cell state-of-discharge 206, the cell capacity 208, the cell state-of-health 209, the cell impedance 212, the cell voltage 130, the cell current 109, the minimum cell voltage limit 214, the maximum cell voltage limit 216, the cell temperature 217, the cell power capability 218, the cell history 220, cell lifetime 221, the cell electrochemical model 222, and the cell life-prognostic model 224.

The cell state-of-charge 204 may measure a current charge of a battery cell 105. The cell capacity 208 may measure a maximum charge of the battery cell 105. The calculation of the cell state-of-charge 204 is described in the method 710 of FIG. 7C. The cell state-of-discharge 206 may measure a discharge of the battery cell 105 from the cell capacity 208. The cell state-of-health 209 may describe one or more failure related parameters. The cell impedance 212 may measure an internal impedance of the battery cell 105 and/or the battery cell connections. The cell impedance 212 may be measured during the characterization of the battery cell 105 in the battery characterization method 780 of FIG. 7G. The cell resistance 213 may measure an internal resistance of the battery cell 105 and/or the battery cell connections. The cell resistance 213 may be measured during the characterization of the battery cell 105 in the method 780 of FIG. 7G.

The cell voltage 130 may be an open circuit voltage for the battery cell 105. be measured by the battery sensors 150 as shown in FIG. 2A. The cell current 109 may be measured by the battery sensors 150 as shown in FIGS. 2K-M. The minimum cell voltage limit 214 may be a minimum control limit of the cell voltage 130 of the battery cell 105. The minimum cell voltage limit 214 may be used by the power optimized balancing module 404 and is useful in preventing the open circuit voltage $V_{OC}$ of the battery cell 105 from going below the minimum cell voltage limit 214. The maximum cell voltage limit 216 may a maximum control limit for the cell voltage 130. The cell temperature 217 may measure an internal temperature of the battery cell 105. The cell temperature 217 may include a temperature of the battery unit 102 or a cell temperature distribution within the battery unit 102 for the various battery cells 105.

The cell power capability 218 may be calculated as a function of the cell voltage 130 and the cell current 109. The cell power capability 218 may be a current cell power capability 218 calculated for a point in time. Alternatively, the cell power capability 218 may be calculated for an extended time interval such as a discharge cycle. The cell history 220 may record the battery state 201 at regular history intervals. For example, the cell history 220 may record the battery state 201 each 10 seconds. The cell electrochemical model 222 is described in more detail in FIG. 6D. The cell life-prognostic model 224 may forecast the cell lifetime 221 of the battery cell 105. The lifetime may be calculated as a function of the battery state 201.

Figure 6B:
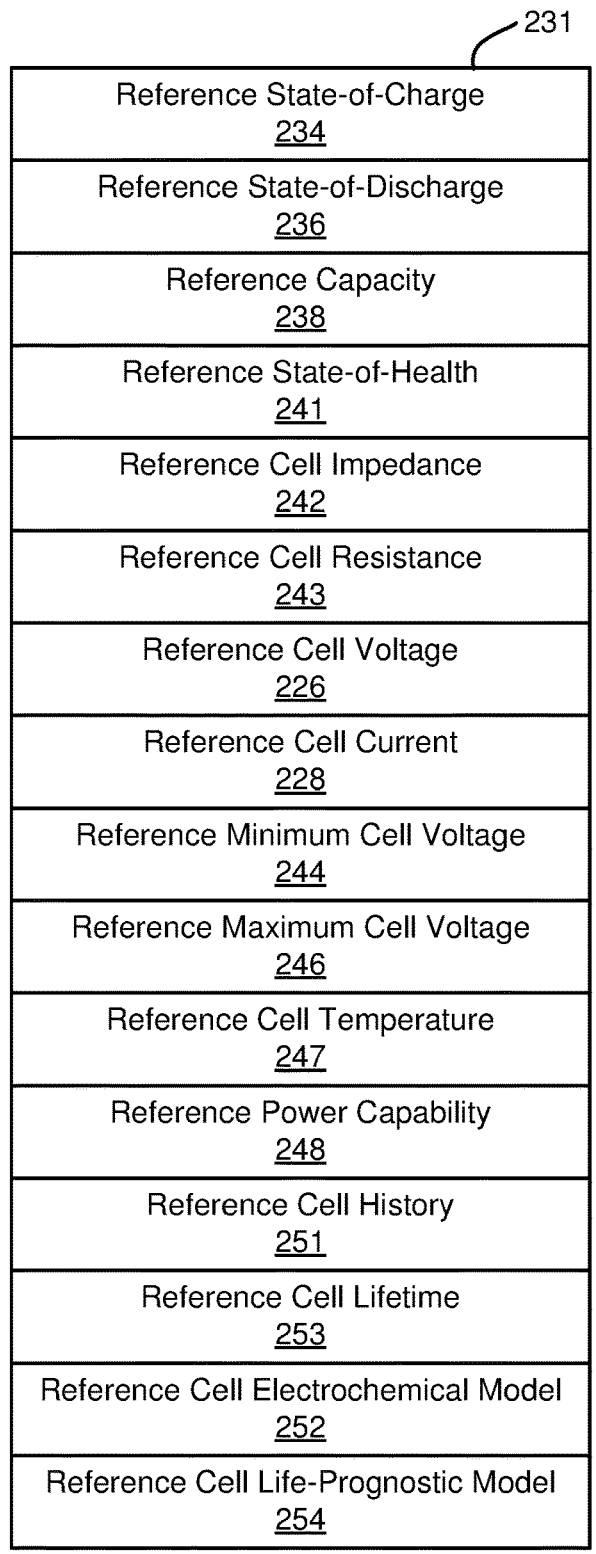
FIG. 6B is a schematic block diagram illustrating one embodiment of reference state data.

FIG. 6B is a schematic block diagram illustrating one embodiment of reference state data 229. The reference state data 229 maybe organized as a data structure in a memory. The reference state data 229 may be stored in the DC-DC controller 118, the central controller 160, or combinations thereof. In the depicted embodiment, the reference state data 229 includes the reference state 231 including the reference state-of-charge 234, the reference state-of-discharge 236, the reference capacity 238, the reference state-of-health 241, the reference cell impedance 242, the reference cell voltage 226, the reference cell current 228, the reference minimum cell voltage 244, the reference maximum cell voltage 246, the reference cell temperature 247, the reference power capability 248, the reference cell history 251, reference cell lifetime 253, the reference cell electrochemical model 252, and the reference cell life-prognostic model 254.

In one embodiment, the reference state-of-charge 234, the reference state-of-discharge 236, the reference capacity 238, the reference state-of-health 241, the reference cell impedance 242, the reference cell voltage 226, the reference cell current 228, the reference minimum cell voltage 244, the reference maximum cell voltage 246, the reference cell temperature 247, the reference power capability 248, the reference cell history 251, the reference cell lifetime 253, the reference cell electrochemical model 252, and the reference cell life-prognostic model 254 are target parameters corresponding to the cell state-of-charge 204, the cell state-of-discharge 206, the cell capacity 208, the cell state-of-health 209, the cell impedance 212, the cell voltage 130, the cell current 109, the minimum cell voltage limit 214, the maximum cell voltage limit 216, the cell temperature 217, the cell power capability 218, the cell history 220, cell lifetime 221, the cell electrochemical model 222, and the cell life-prognostic model 224 respectively. The bypass converter 110 and/or central controller 160 may determine the reference state 231 for the one or more battery cells 105 as will be described hereafter in FIG. 7D.

Figure 6C:
FIG. 6C is a schematic block diagram illustrating one embodiment of battery model data.

FIG. 6C is a schematic block diagram illustrating one embodiment of battery model data 261. The battery model data 261 may be employed by the battery model 260. The battery model data 261 maybe organized as a data structure in a memory. The battery model data 261 may be stored in the DC-DC controller 118, the central controller 160, or combinations thereof. The battery model data 261 may be used to define a battery model for a battery cell 105. In the depicted embodiment the battery model data 261 includes optical data 262, the cell voltage 130, the cell current 109, pH data 264, strain data 266, pressure data 268, and gas composition data 270.

The battery model data 261 may be a Laguerre expansion of a discrete-time dynamic model. Alternatively, the battery model data 261 may be a continuous-time realization algorithm that performs a discrete-time realization algorithm in continuous time. The performed algorithm may be converted into a discrete domain. In one embodiment, the battery model data 261 includes a reduced-order electrochemical state estimation of internal battery processes using the cell electrochemical model 222.

Figure 6D:
FIG. 6D is a schematic block diagram illustrating one embodiment of battery unit properties.

FIG. 6D is a schematic block diagram illustrating one embodiment of the cell electrochemical model 222. The cell electrochemical model 222 maybe organized as a data structure in a memory. The cell electrochemical model 222 may be stored in the DC-DC controller 118, the central controller 160, or combinations thereof. In the depicted embodiment, the cell electrochemical model 222 includes chemical properties 282, electrical properties 284, thermal properties 286, and physical properties 288.

The chemical properties 282 may include at least one of a formation of dendrites in the battery cell 105 and/or battery cells of the battery cell 105, a gas composition of the battery cell 105 and/or battery cells of the battery cell 105, a gas pressure of the battery cell 105 and/or battery cells of the battery cell 105, and a cell pH of the battery cell 105 and/or battery cells of the battery cell 105. The optical sensor may measure the formation of dendrites. The electrical properties 284 may include at least one of the cell impedance 212, the cell capacity 208, and the cell voltage 130 of the battery cell 105. The thermal properties 286 may comprise one or more of the cell temperature 217 and a cell temperature distribution with the battery cell 105. The physical properties may include an expansion of the cell package for the battery unit 102.

Figure 6E:
FIG. 6E is a schematic block diagram illustrating one embodiment of control data.

FIG. 6E is a schematic block diagram illustrating one embodiment of control data 380. The control data 380 maybe organized as a data structure stored in a memory. The control data 380 includes a divergence time interval 382, the divergence limits 384, a control constant 386, a maximum shared bus voltage 388, a maximum supply current 390, a predefined cell capacity 392, a predefined nominal capacity 394, and a predefined cell resistance 396.

In one embodiment, the divergence time interval 382 may specify a time interval for reducing the divergence of the battery state 201 relative to the reference state 231. The divergence time interval 382 may be a number of months and/or a lifetime of the battery system 100. The divergence limits 384 may specify an acceptable divergence of the battery state 201 from the reference state 231. In one embodiment, the divergence limits 384 are specified for a plurality of time intervals and/or for a plurality of milestones.

The control constant 386 may control a rate of reducing the divergence of the battery state 201 from the reference state 231. In addition, the control constant 386 may control a rate of converging the battery state 201 to the reference state 231. The maximum shared bus voltage 388 may specify a maximum for the shared bus voltage 145. The maximum supply current 390 may specify a maximum for the supply current 198. The predefined cell capacity 392 may specify a default value for a cell capacity 208. The predefined nominal capacity 394 may specify a default value for nominal cell capacity 208. The predefined cell resistance 396 may specify default value for cell resistance 213.

Figure 7A:
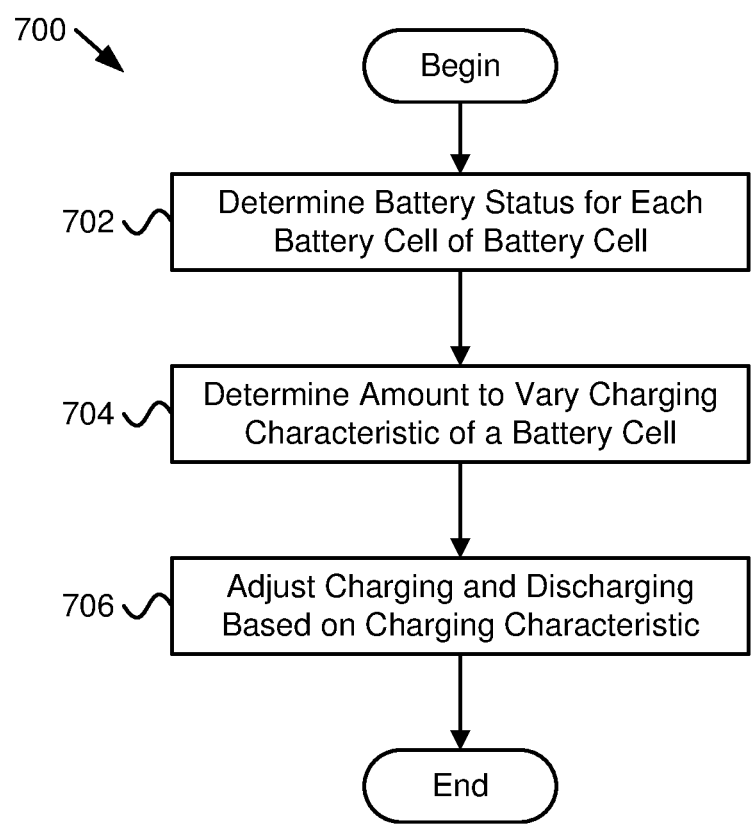
FIG. 7A is a schematic flow chart diagram illustrating one embodiment of a battery control method.

FIG. 7A is a schematic flow chart diagram illustrating one embodiment of a battery control method 700. The method 700 begins and determines 702 a battery state of each battery cell 105 of a plurality of battery cells 105 forming a battery unit 102. A battery state of a battery cell includes a health of the battery cell, where a battery state of at least one battery cell (e.g. 105*a*) of the battery unit 102 differs from a battery state of one or more other battery cells (e.g. 105*b-n*) of the battery unit 102. Each battery cell 105 is connected to a shared bus 180 through a bypass converter 110, which may be bidirectional or unidirectional, and each bypass converter 110 provides power from the battery cell 105 to the shared bus 180. In one embodiment, the battery state module 302 determines 702 each battery state.

The method 700 determines 704, based on the determined battery state of each battery cell 105 of the battery unit 102, an amount to vary a charging characteristic for each battery cell 105 of the battery unit with respect to a reference charging characteristic. The charging characteristic for each battery cell 105 varies as a function of a reference state. In one embodiment, the charge/discharge modification module 304 determines 704 an amount to vary a charging characteristic for each battery cell 105. The method 700 adjusts 706 charging and discharging of a battery cell (e.g. 105*a*) of the battery unit 102 based on the charging characteristic of the battery cell 105*a* and based on the reference state, and the method 700 ends. In one embodiment, the charge/discharge module 306 adjusts 706 charging/discharging of the battery cell 105*a*.

Figure 7B:
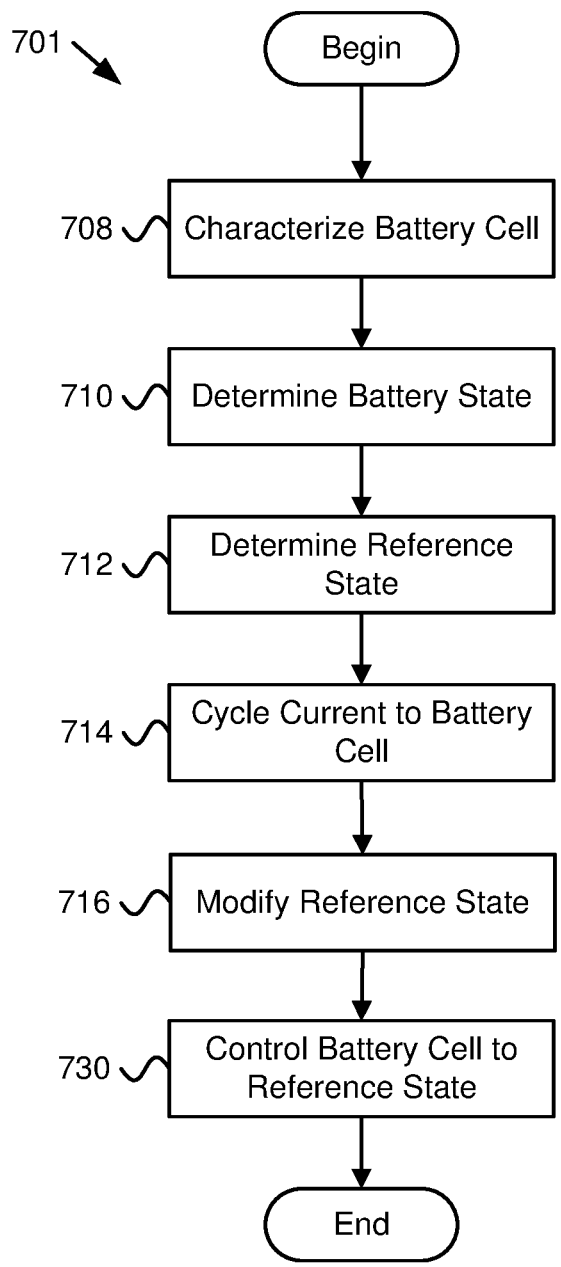
FIG. 7B is a schematic flow chart diagram illustrating another embodiment of a battery control method.

FIG. 7B is a schematic flow chart diagram illustrating one embodiment of a battery control method 701. The battery control method 701 may control a battery cell 105 of the battery system 100. The battery control method 701 may be performed by the battery controller 111. Alternatively, the method 701 may be performed by the central controller 160. In one embodiment, the battery control method 701 is performed by a combination of one or more bypass converters 110 and the central controller 160 and/or battery controllers 111. In a certain embodiment, the method 701 is performed by a processor. In addition, the method 701 may be performed by computer readable storage medium storing code.

The method 701 begins and, in one embodiment, characterizes 708 a battery cell 105. The battery controller 111 may characterize 708 the associated battery cell 105. The battery controller 111 may characterize the battery cell 105 in an off-line state. In another embodiment, the central controller 160 characterizes one or more battery cells 105. The characterization 708 is described in detail in FIG. 7F. In another embodiment, the method 700 uses data from a similar battery unit 102 that has been characterized.

The method 700 determines 710 a battery state 201 for a battery cell 105. For example, the battery state module 302 may be used to determine 710 the battery state. In one embodiment, the battery state 201 may initially be determined 710 from the characterization method 708 and in FIG. 7F. In addition, the battery controller 111 and/or battery state module 302 may determine 710 a modified battery state 201 in order to manage the battery cell 105. For example, the charge/discharge modification module 304 of a battery controller 111 may modify the battery state 201 in order to reduce variability between the battery states 201 of the battery cells 105, to extend the lifetime of the battery cell 105, to balance the lifetimes of one or more battery cells 105, to balance the power of one or more battery cells 105, etc.

In one embodiment, the method 700 may determine 710 the battery state of each battery cell 105 to increase the charging rate for some battery cells 105 and reduce the charging rate for other battery cells 105 to reduce the variability of the parameter mismatch 126 among the battery cells 105. For example, the charge/discharge modification module 340 may determine an amount to vary the charging characteristics of the battery cells 105. In one embodiment, the method 700 populates an objective map 114 for each battery cell 105 to input the parameter mismatches 126. The parameter mismatch 126 may be evaluated over a target interval and adjusted as necessary based on battery health and status. The target interval may be a time interval such as three weeks. Alternatively, the target interval may be a number of charge/discharge cycles for the system 100. The method 700 may re-evaluate battery status at the end of the target interval and may readjust the parameter mismatch 126. The determination 710 of the battery state 201 is described in more detail in FIG. 7C.

The method 700 may determine 712 the reference state 231 for the associated battery cell 105. The determination 712 of the reference state is described in more detail in FIG. 7D. Determining 712 the reference state, in various embodiments, is a function of the battery state module 302, the charge/discharge modification module 304, the central controller 160, etc. The method 700 may optionally cycle 714 current to one or more battery cells 105 to heat the battery cells 105. The battery controller 111 for a battery cell 105 or the central controller 160 may cycle 714 the current in a battery cell 105. The cell impedance 212 of the battery cell 105 may decrease as the battery cell 105 is heated. Reducing the cell impedance 212 of the battery cell 105 may improve the performance of the battery cell 105. By cycling current from the shared bus 180 through the DC to DC converter 280 the battery cell 105, the battery controller 111 may heat the battery cell 105 and improve the performance of the battery cell 105.

The method 700 may modify 716 the reference state 231 of each battery cell 105, for example by modifying the objective map 114 of each battery cell 105. In one embodiment, the charge/discharge modification module 304 modifies 716 the reference state 231 of a battery cell 105 based on a parameter mismatch 126 between parameters of the battery state 201 of one or more battery cells 105. In one embodiment, the parameter mismatch 126 is reduced to within divergence limits 384.

In one embodiment, modifying 716 the reference state 231 reduces a rate of divergence of the parameter mismatch 126 over time. Typically, the rate of divergence of the parameter mismatch 126 is reduced over the divergence time interval 382. The charge/discharge modification module 304 may modify 716 the reference state 231 of a battery cell 105 based on a capacity mismatch between a cell capacity 208 of the given battery cell 105 and one of a cell capacity 208 of a maximum capacity battery cell 105, an average cell capacity 208 of the plurality of battery cells 105, a maximum capacity of a least healthy battery cell (e.g. 105*n*) and a predefined cell capacity 392. As a result, a battery cell 105 with a higher cell capacity 208 reaches a higher maximum cell state-of-charge 204 than a battery cell 105 with a lower cell capacity 208 at a maximum shared bus voltage $V_{SH,\,max}$, or a maximum value of the reference state.

The upper limit of the open circuit cell voltage $V_{OC,i}$, which typically correlates to a maximum state-of-charge of the battery cell 105, may be modified based on a cell capacity parameter mismatch 126 wherein the cell capacity mismatch is calculated for each given $i^{th}$ battery cell 105 using Equation 1, where $V_{max}$ is a maximum cell voltage limit 216, K is a control constant 386, $Q_i$ is a cell capacity 208 of the given battery cell 105, and Q is one of a cell capacity 208 of a battery cell 105 with a greatest cell capacity 208 max(Q), an average cell capacity 208 of the plurality of battery cells 105, a cell capacity 208 of a battery cell 105 with a lowest cell capacity 208, and the predefined cell capacity 392. Equation 1 calculates a maximum open circuit cell voltage $V_{OC,max}$ for a charging cell current 109 to the battery cell 105. Reversing the cell current 109 modifies the Equation.

$$V_{OC,max} = V_{max} - K\frac{\partial V_{OC}}{\partial Q}(Q - Q_i) \quad \text{Equation 1}$$

In one embodiment, cell capacity mismatch $\Delta Q_i$ given in Equation 2 is determined by the central controller 160 for each bypass converter 110. Alternatively, $\Delta Q_i$ may be determined locally by each cell bypass converter 110 using the shared bus voltage 145 and/or the data available locally from the battery sensors 150 and converter sensors 265.

$$\Delta Q_i = Q - Q_i \quad \text{Equation 2}$$

In one embodiment, the cell capacity mismatch is calculated using Equation 3, where $I_{str}$ is the string current, $I_{g,i}$ is a bypass converter input current 196 for the given battery cell 105, $m_{nom}$ is the predefined nominal capacity 394 and $m_i$ is capacity parameter calculated as described below. As a result, each bypass converter 110 may calculate the cell objective map 114 in a distributed manner. If there is a load current 195, Equation 3 is modified to account for the additional converter current.

$$\Delta Q_i = Q_i - \frac{m_i Q_i I_{str}}{m_{nom}(I_{str} + I_{g,i})} \quad \text{Equation 3}$$

The capacity parameter $m_i$ may calculated using Equation 4, is where $V_{bus}$ is the shared bus voltage 145 and $b_i$ is a defined capacity constant. Parameter $m_i$ may be calculated for a given battery cell 105 and $m_{nom}$ may be the predetermined nominal capacity 394.

$$m_i = \frac{Q_i - b_i}{V_{bus}} \quad \text{Equation 4}$$

In one embodiment, the open circuit cell voltage $V_{OC}$ 130 may be modified using Equation 5, where $V_{OCD}$ is the modified shared bus reference voltage 136, $i_g$ is the bypass converter input current 196 and $R_{droop}$ is a droop control resistance. The bypass converter input current and the droop control resistance may be droop inputs 128.

$$V_{OCD} = V_{OC} - i_g * R_{droop} \quad \text{Equation 5}$$

In another embodiment, Equation 2 is reversed subtract the capacity of the reference cell from the capacity of a current cell ($Q_i - Q$) to determine a capacity difference $\Delta Q_i$, which is then used to determine a maximum open circuit voltage $V_{OC\ max,i}$ according to Equation 6 where $K_1$, $K_2$ and $K_3$ are constants and the resulting quadratic equation defines a relationship between open circuit voltage $V_{OC\ max,i}$ and capacity difference $\Delta Q_i$ for a particular battery cell 105 or cell type.

$$V_{OC\ max,i} = K_1(\Delta Q_i)^2 + K_2 \Delta Q_i + K_3 \quad \text{Equation 6}$$

Figure 8A:
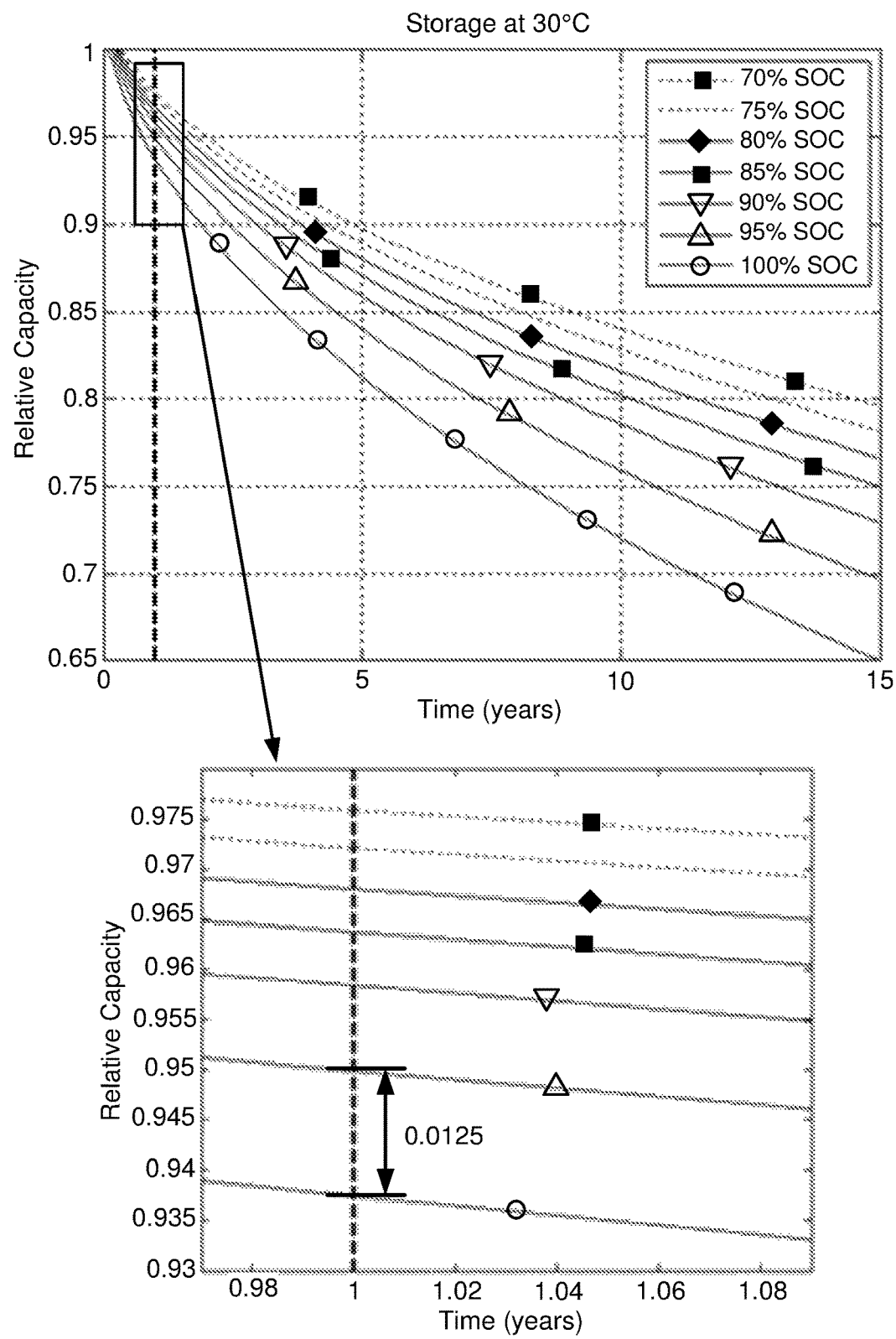
FIG. 8A is a graph depicting a relationship between relative capacity of a battery cell over time based on maximum state-of-charge.
Figure 8B:
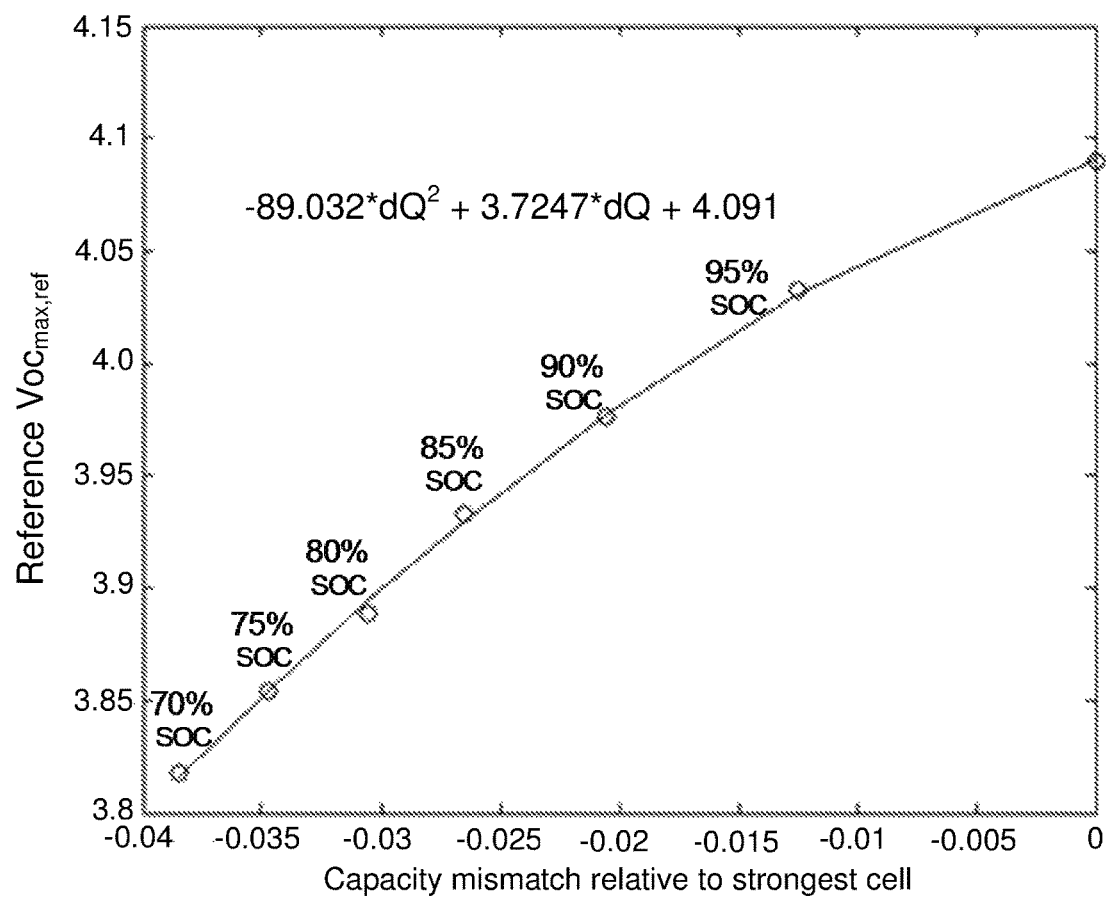
FIG. 8B is a graph depicting a relationship between maximum open circuit voltage of a battery cell and capacity mismatch relative to a strongest battery cell.

An example of the relationship between open circuit voltage $V_{OC\ max,i}$ and capacity difference $\Delta Q_i$ for a particular battery cell 105 is depicted in FIGS. 8A and 8B. FIG. 8A depicts a top graph of relative capacity over time for battery cells 105 stored at 30 degrees Celsius at different states of charge. As can be seen, storing a battery cell at a higher state-of-charge negatively impacts capacity over time than storing the same battery cell at a lower state-of-charge. The lower part of the graph in FIG. 8A is a zoomed in view of a time of 1 year. The change in capacity after 1 year of storage between a battery cell at 100% versus 95% results in a relative capacity change of –0.0125.

FIG. 8B depicts a graph of maximum open circuit voltage of a reference battery cell $V_{OCmax\ ref}$ versus capacity mismatch relative to a strongest cell. The line depicted in FIG. 8B matches Equation 6 where $K_1$=–89.032, $K_2$=3.7247 and $K_3$=4.091. If the state-of-charge had been reduced to 95% rather than 100%, after 1 year the battery capacity would have 1.25% more remaining capacity. This relationship may be used to determine how much to lower a maximum state-of-charge for a weaker battery cell (e.g. 105b-n) versus a healthier cell (e.g. 105a), or versus an average battery cell, a weakest battery cell or a predefined battery characteristic. $K_1$, $K_2$ and $K_3$ will differ from battery to battery, for various battery types, etc.

Note that actual relative capacity changes will differ depending on actual battery usage because battery cells 105 will not remain in storage but will be discharged and charged so that the battery cells 105 will spend time below a maximum state-of-charge. The charge/discharge modification module 304 may adjust the parameters in Equation 6 based on anticipated or actual usage and battery state module 302 may determine a battery state 201 for the battery cells 105 at various time intervals so that the charge/discharge modification module 304 may adjust a maximum state-of-charge based on current battery states 201.

In one embodiment, Equation 6 may be approximated by a straight line instead of a curve to simplify calculations so that there is a proportional relationship between maximum open circuit voltage $V_{OCmax\ ref}$ and capacity mismatch relative to a reference battery cell. In the embodiment, FIG. 8B would have a straight line instead of the depicted curve. For example, Equation 7 may be used to determine a state-of-charge of a battery cell 105 relative to a maximum state-of-charge of a reference battery cell. $SOC_{max,obj}$ is a maximum end-of-charge SOC for the reference battery cell and $SOC_{max,i}$ is a maximum end-of-charge SOC for battery cell i. $K_{SOC}$ is a multiplier converting capacity to state-of-charge. $Q_i$ is a fractional capacity of battery cell i (fraction is Ah-capacity relative to nameplate Ah-capacity) and $Q_{obj}$ is the fractional capacity of the reference battery cell. Depending on the end-of-charge control objective, $Q_{obj}$ may be for the healthiest capacity cell $$Q_{obj} = \max_i(Q_i),$$

for an average capacity cell $$Q_{obj} = \text{avg}_i(Q_i),$$

or a minimum capacity cell $$Q_{obj} = \min_i(Q_i).$$

$$SOC_{max,i} = SOC_{max,obj} - K(Q_i - Q_{obj})\qquad\text{Equation 7}$$

Note that because open circuit voltage of a battery cell 105 correlates to state-of-charge for the battery cell, Equation 7 may also be modified to return an open circuit voltage $V_{OC\,max,i}$ for the $i^{th}$ battery cell 105 by multiplying Equation 7 by another constant.

For the power optimized balancing control technique below the transition voltage 522, the bypass converter may control 718 the cell state-of-charge 204 for the given battery cell 105 as a function of a cell voltage 130 and a cell resistance 213 for the power optimized balancing control method below the threshold voltage 522. In one embodiment, the state-of-charge is represented by the open circuit cell voltage $V_{OC}$. The open circuit cell voltage $V_{OC}$ may be calculated using Equation 8, where $V_{OC,i}$ is a cell voltage 130 at open circuit for a given $i^{th}$ battery cell 105, $V_{max}$ is a maximum cell voltage limit 216, $V_{min}$ is a minimum cell voltage limit 214, $R_i$ is a cell resistance 213 for the given battery cell, and $I_{max}$ is a maximum cell current for the given battery cell. Equation 8 calculates the cell voltage $V_{C,i}$ 130 for and $i^{th}$ battery cell 105 for charging cell current 109 to the battery cell 105 under maximum current conditions. Reversing the cell current 109 modifies Equation 8.

$$V_{C,i} = \frac{V_{max}(V_{OC,i} - R_i|I_{max}|) - V_{min}(V_{OC,i} + R_i|I_{max}|)}{V_{max} - V_{min} - 2R_i|I_{max}|}\qquad\text{Equation 8}$$

In one embodiment, the droop controller 116 controls cell voltage $V_{C,i}$ 130, which indirectly controls open circuit voltage $V_{OC,i}$. Where open circuit voltage $V_{OC,i}$ correlates to state-of-charge for the battery cell 105, Equation 8 may be used to calculate a shared bus reference voltage 134 for worst case discharge current $I_{max}$ conditions for any given open circuit voltage $V_{OC,i}$, calculated by the battery state module 302 where open circuit voltage $V_{OC,i}$ is calculated instead of state-of-charge. The shared bus reference voltage 134 calculated using Equation 8 may maximize instantaneous cell power capability 218 for the battery cell 105. Equation 8 may be easily reformulated without a maximum cell voltage $V_{max}$ where the maximum cell voltage is not used.

In another embodiment, the battery state module 320 determines a minimum open circuit voltage $V_{OC,i}$ and internal resistance of a battery cell 105 and the charge/discharge modification module 304 populates a table in the objective map 114 to produce a shared bus reference voltage 134 instead of using an equation, such as Equation 8. The charge/discharge modification module 304 compensates for the difference between the shared bus voltage $V_{SH}$ 145 and a corresponding open circuit voltage $V_{OC,i}$ and/or cell voltage $V_C$ 130. For example, there may be a gain based on a difference between a reference battery cell (e.g. 105a) and the shared bus voltage $V_{SH}$ 145 and there may be a difference between the shared bus voltage $V_{SH}$ 145 and a modified battery cell voltage due to changes in maximum and minimum state-of-charge of a less healthy battery cell 105 versus the reference state or reference battery cell 105a to minimize parameter divergence and/or compensation due to internal cell resistance.

The battery controller 111 may control 718 the battery state 201 of a battery cell 105 to the reference state 231. In one embodiment, the reference state 231 is based on the shared bus voltage 145. In another embodiment, the reference state 231 is related to state-of-charge of a reference battery cell. In one embodiment, a parameter mismatch 126 between the battery state 201 and the reference state 231 controlled 718 to minimize a reduction in cell capacity 208. The cell capacity 208 of the battery cell typically diminishes over time. The battery controller 111 may decrease the rate of divergence of the battery state 201 from the reference state 231 for the battery cell 105. In one embodiment, the DC-DC controller 118 employs model predictive control ("MPC") to decrease the rate of divergence the battery state 201 to the reference state 231.

Figure 7C:
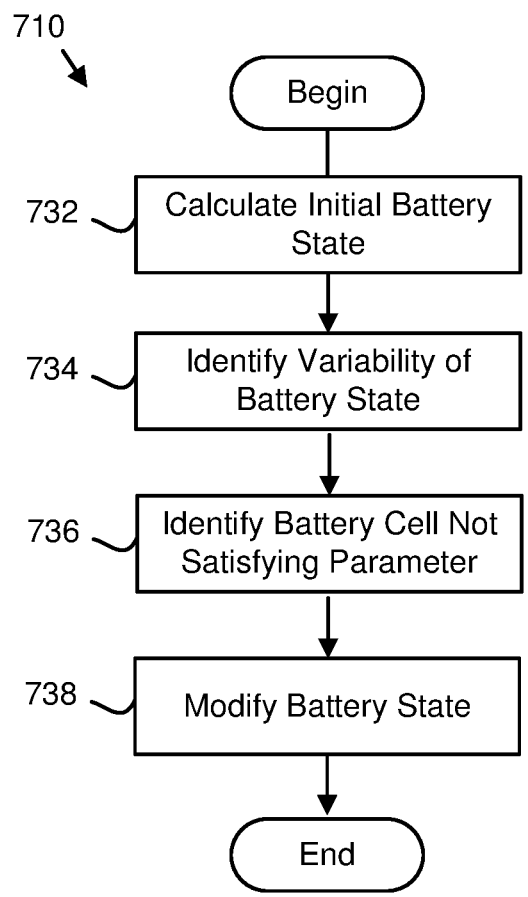
FIG. 7C is a schematic flow chart diagram illustrating one embodiment of a battery state modification method.

FIG. 7C is a schematic flow chart diagram illustrating one embodiment of a battery state modification method 710. The battery state modification method 710 may be performed by the battery state module 302, which may be part of the battery controller 111 and/or the central controller 160. In one embodiment, the method 710 is performed by a combination of one or more bypass converters 110 and the central controller 160. In a certain embodiment, the method 710 is performed by a processor. In addition, the method 710 may be performed by computer readable storage medium storing code.

The method 710 begins calculates 732 the initial battery state 201 for the battery cell 105. For example, the battery state module 302 may calculate 732 the battery state 201. The calculation 732 of the initial battery state 201 may be performed as part of the characterization of the battery cell 105 is described in FIG. 7F. Alternatively, the calculation 732 may be performed periodically such as after a representation calculation interval, or on an ongoing basis using battery models and/or model predictive control.

In one embodiment, the method 710 identifies 734 the variability of the battery states 201 between the plurality of battery cells 105. The battery state module 302 may identify 734 the variability of the battery states 201. The battery state module 302 may compare parameters of the battery states 201 of the battery cells 105. In one embodiment, if a first battery cell (e.g. 105a) has a parameter of the battery state 201 that exceeds a corresponding average of the parameters of the battery states 201 one of the other battery cells (e.g. 105b) by greater than a variability threshold, the battery state module 302 may identify 560 the difference as a variability.

Alternatively, the method 710 may rank parameters for each battery cell 105. If the first battery cell 105a has a parameter of the battery state 201 that is least desirable and that exceeds a corresponding parameter of the binary representation of the battery cell 105a with the next least desirable parameter of the battery state 201 by greater than the variability threshold, the method 710 may identify 560 the difference is a variability. In one embodiment, the method 710 may identify 736 a battery cell 105 that is not satisfying a parameter of the reference state 231. For example, the cell lifetime 221 may not satisfy the reference cell lifetime 253 or the cell capacity may be less than the reference capacity 238.

In one embodiment, the method 710 modifies 738 the battery state 201 for each battery cell 105 and the method 710 ends. For example, the charge/discharge modification module 304 may modify 738 the battery state 201 for each battery cell 105 and may alter a charging characteristic, such as the objective map 114, of each battery cell 105. The battery state 201 may be modified 738 to decrease a rate of divergence of a parameter of the battery state 201 to the corresponding parameter of the reference state 231. For example, the battery state 201 may be modified 738 to decrease a rate of divergence of the cell lifetime 221 from the reference cell lifetime 253. Alternatively, the battery state 201 may be modified to converge the cell lifetime 221 to the reference cell lifetime 253.

Alternatively, the method 710 may modify 738 the battery state 201 for each battery cell 105 to reduce variability between the battery states 201, and the method 710 ends. For example, the battery states 201 may be modified 738 to match the cell power capability 218 between the plurality of battery cells 105. The battery state 201 of each battery cell 105 may be modified 738 so that the charging and discharging of the battery cells 105 modifies the overall cell power capability 218 of the plurality of battery cells 105. In one embodiment, the battery state 201 for each battery cell 105 is modified 738 to extend a system lifetime of the battery system 100. In one embodiment, the system lifetime is a minimum of the cell lifetimes 221 for the plurality of battery cells 105. Alternatively, the system lifetime may be an average of the cell lifetimes 221. The battery state 201 for each battery cell 105 may be modified 738 to extend a range of the battery pack for a drive cycle. In one embodiment, the drive cycle may comprise charging the battery pack and then discharging the battery pack, such as to motivate an electric vehicle. The range may be a function of a sum of the cell power capabilities of the plurality of battery cells 105.

Figure 7D:
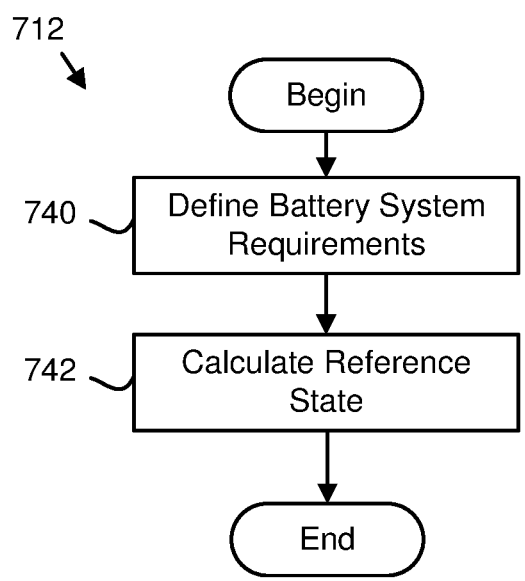
FIG. 7D is a schematic flow chart diagram illustrating one embodiment of a reference state determination method.

FIG. 7D is a schematic flow chart diagram illustrating one embodiment of a reference state determination method 712. The reference state determination method 712 may be performed by a battery controller 111. In one embodiment, the method 712 is performed by a combination of one or more bypass converters 110 and the central controller 160. In a certain embodiment, the method 712 is performed by a processor. In addition, the method 712 may be performed by computer readable storage medium storing code.

The method 712 begins and defines 740 requirements for the battery system 100. The requirements may include a system power, the system voltage, a system current, and a system discharge rate. The requirements may be based on power needs of the device such as an electric car. In one embodiment, the requirement may be one or more of the reference capacity 238, a reference state-of-health 241, a reference power capability 248, a reference cell lifetime 253 and a reference charging characteristic. The battery controller 111 may further calculate 742 the reference state 231 and the method 712 ends. In one embodiment, a single reference state 231 is calculated for all battery cells 105. Alternatively, a unique reference state 231 may be calculated for each battery cell 105.

In one embodiment, the battery controller 111 may calculate 742 the divergence time interval 382 and the divergence limits 384. The divergence time interval 382 may be short if the requirements specify to more rapidly decrease a rate of divergence of the battery state 201 from the reference state 231. Alternatively, the divergence time interval 382 may be longer if the requirements specify slowly reducing the rate of divergence of the battery state 201 from the reference state 231. The divergence limits 384 may be narrow if the requirements specify to more rapidly decrease the rate of divergence of the battery state 201 from the reference state 231. In addition, the divergence limits 384 may be broad if the requirements allow a slow decrease of the rate of divergence of the battery state 201 from the reference state 231.

In addition, the battery controller 111 may calculate 742 the control constant 386 based on the divergence time interval 382 and/or the divergence limits 384. For example, if the divergence time interval 382 is short and/or the divergence limits 384 are narrow, the control constant 386 may be high. Alternatively, if the divergence time interval 382 is long and/or the divergence limits 384 are broad, the control constant 386 may be low.

Figure 7E:
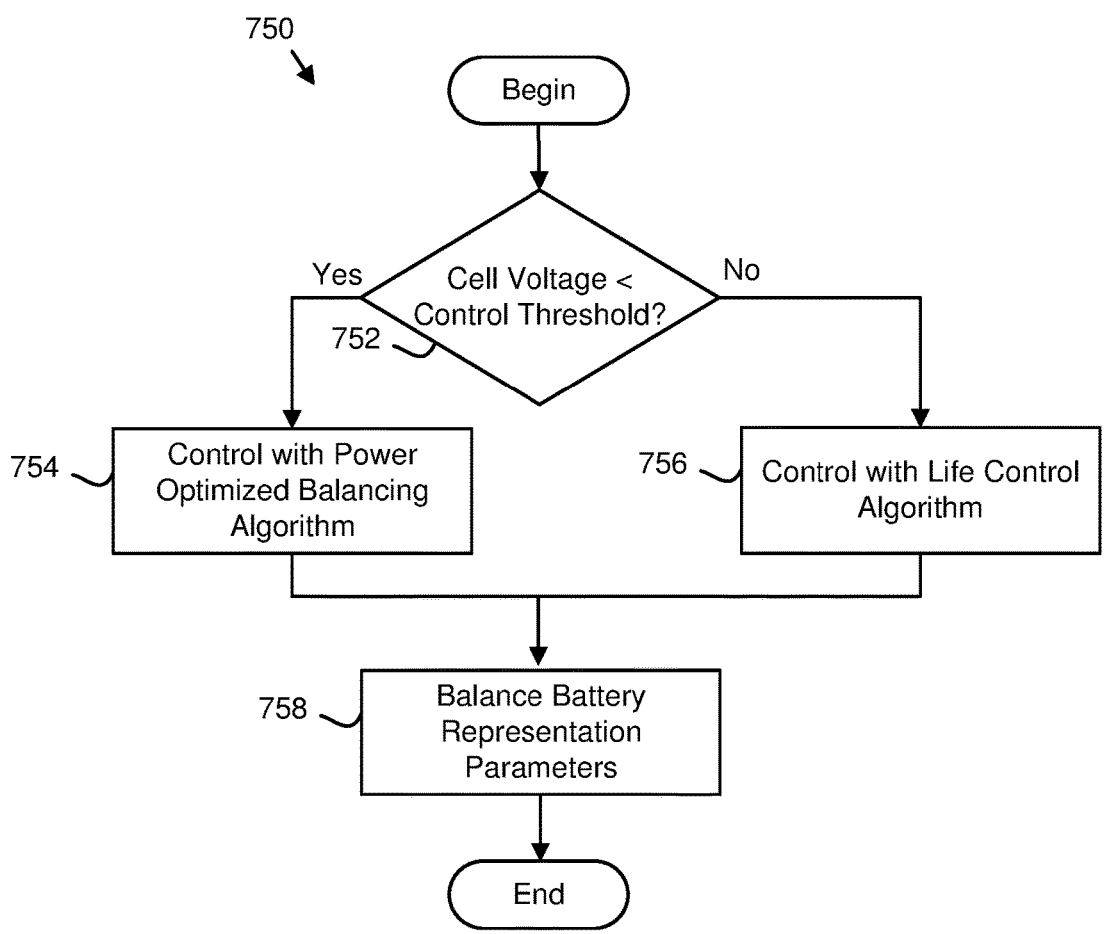
FIG. 7E is a schematic flow chart diagram illustrating one embodiment of a balancing control method.

FIG. 7E is a schematic flow chart diagram illustrating one embodiment of a balancing control method 750. The balancing control method 750 may be performed by the charge/discharge module 306, which may be embodied in a battery controller 111, to reduce a parameter mismatch 126 of two or more battery state parameters. In one embodiment, the balancing control method 750 is performed by a combination of one or more bypass converters 110 and the central controller 160. In a certain embodiment, the balancing control method 750 is performed by a processor. In addition, the balancing control method 750 may be performed by a computer readable storage medium storing code. One of skill in the art will recognize other ways to implement the balancing control method 750.

The balancing control method 750 begins and determines 752 if one or more first parameters of the battery state 201 are less than the control threshold 504. For example, the balancing control method 750 may determine that the cell voltage for a battery cell 105 is less than the control threshold 504. In another embodiment, the balancing control method 750 determines 752 if the shared bus voltage $V_{SH}$ 145 is below the transition voltage 522. In addition, the battery controller 111 may balance the cell lifetime 221 of one or more battery cells 105 and the cell power capability 218 of the one or more battery cells to determine a control threshold 504.

If the one or more first battery parameters are less than the control threshold 504, the battery controller 111 may control 754 the battery state 201 to the reference state 231 using the power optimized balancing control algorithm. The power optimized balancing control algorithm may calculate a minimum cell voltage 130 using Equation 8.

In one embodiment, the power optimized balancing control algorithm calculates the lower limit of the cell voltage $V_{C,i\ min}$ using Equation 9, where $V_{min}$ is a minimum cell voltage limit 214, $I_{max}$ is a maximum cell current 109, $R_i$ is a cell resistance 213 for the given battery cell 105, and R is one of an average cell resistance 213 for the plurality of battery cells, a cell resistance 213 of a maximum resistance battery cell 105, a minimum resistance battery cell 105 and the predefined cell resistance 396. Equation 9 calculates the lower limit of the cell voltage $V_C$ 130 for a discharging cell current 109 to the battery cell 105. Reversing the current modifies Equation 9.

$$V_{OCimin} = V_{min} - I_{max}(R - R_i) \qquad \text{Equation 9}$$

If the one or more first battery parameters are not less than the control threshold 504, the battery controller 111 may control 756 the battery state 201 to the reference state 231 using a life control algorithm. In one embodiment, according to the life control algorithm, the life control module 402 calculates the upper limit of the open circuit cell voltage $V_{OC,i}$ 130 at open circuit using Equation 1. In another embodiment, the life control module 402 uses Equation 6 to determine a maximum open circuit voltage of a battery cell and determines various open circuit voltages correlated to shared bus voltages $V_{SH}$ 145 between a maximum shared bus voltage $V_{SH\ max}$ and the transition voltage 522. The life control module 402 may also define a relationship between the shared bus reference voltage 134 and state-of-charge, such as state-of-charge of the reference state, as depicted in FIG. 5B. In another embodiment, the life control module 402 defines a relationship between the shared bus reference voltage 134 and the shared bus voltage $V_{SH}$ 145 or reference state-of-charge accounting for internal resistance of the battery cell 105.

By selecting the power optimized balancing algorithm or the life control algorithm based on the relationship of the one or more first parameters to the control threshold, the battery controller 111 balances 758 the two or more battery state parameters, such as the cell lifetime 221 and the cell power capability 218, and the balancing control method 750 ends.

Figure 7F:
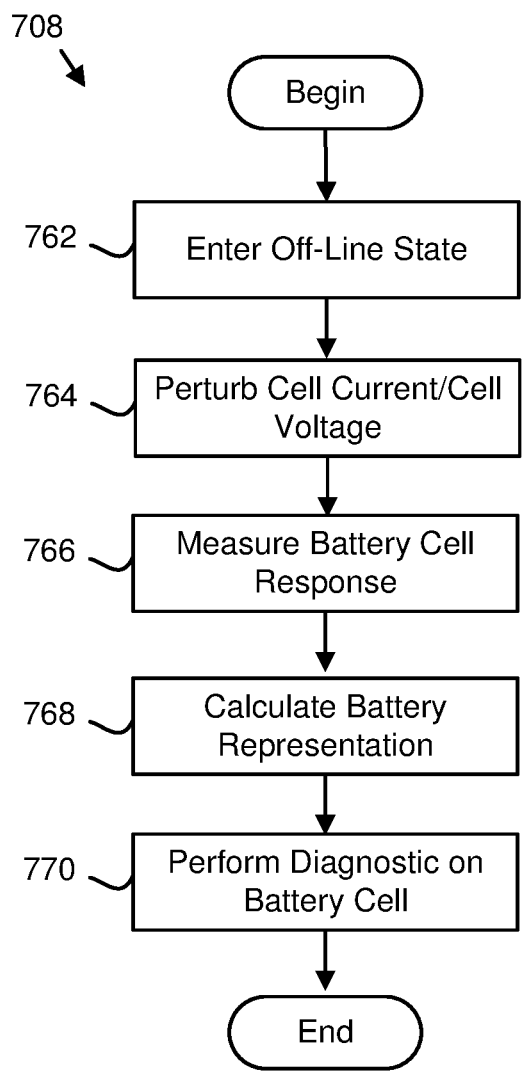
FIG. 7F is a schematic flowchart diagram illustrating one embodiment of a battery characterization method.

FIG. 7F is a schematic flowchart diagram illustrating one embodiment of a battery characterization method 708. The battery characterization method 708 may determine the battery state 201. The battery characterization method 708 may be performed by the battery state module 302, which may be part of a battery controller 111. Alternatively, the battery characterization method 708 may be performed by the battery state module 302 in the central controller 160. In one embodiment, the battery characterization method 708 is performed by a combination of one or more bypass converters 110 and the central controller 160. In a certain embodiment, the battery characterization method 708 is performed by a processor. In addition, the battery characterization method 708 may be performed by computer readable storage medium storing code.

The battery characterization method 708 begins and causes one or more battery cells 105 to enter 762 an off-line state. The method 70 may cause the battery cells 105 to enter 762 the off-line state while the battery system 100 is not being discharged, for example. The battery characterization method 708 may cause the battery cells 105 to enter 762 the off-line state in response to a command. Alternatively, the battery characterization method 708 may cause the battery cells 105 to automatically enter 762 the off-line state when the battery system 100 has not been discharged for an unused time interval. In a certain embodiment, the battery characterization method 708 perturbs 764 the cell current 109 and/or the cell voltage 130 for the battery cell 105. For example, the battery controller 111 may vary the cell current and/or the cell voltage of the battery cell 105. The battery controller 111 may perturb 764 the battery cell 105 by placing the battery cell 105 in a no load state.

In an alternate embodiment, the battery characterization method 708 perturbs 764 the battery cell 105 by drawing no cell current 109 from the battery cell 105 in a no load state for a perturbation time interval, followed by drawing cell current 109 at one of the maximum cell voltage limit 216 and the cell power capability 218 for the perturbation time interval. In addition, the battery characterization method 708 may subsequently draw no cell current 109 from the battery cell 105 for the perturbation time interval. The battery characterization method 708 measure 766, for example using battery sensors 150, the cell voltage 130 and the cell current 109 during the perturbation 764 of the battery cell 105. The battery characterization method 708 may determine the battery state 201 from the measurements of the battery cell 105 from the perturbation 764 is described in step 710 of FIG. 7B.

In one embodiment, the battery characterization method 708 calculates 768 the battery state 201. For example, the battery state module 302 may calculate 768 the battery state 201. The battery state 201 may include at least one of the cell impedance 212, the cell capacity 208, the cell temperature 217, the cell state-of-charge 204, and the cell state-of-health 209 for the battery cell 105.

In one embodiment, the cell state-of-charge 204 is calculated 768 as a function of the cell voltage 130 of the battery cell 105 in a no load state $V_{NL}$. The cell voltage 130 in the no load state $V_{NL}$ may be calculated as a function of the cell voltage 130, the cell current 109, and a cell resistance 213 of the battery cell 105. In one embodiment, the cell voltage 130 in the no load state $V_{NL}$ is calculated using Equation 10, where $V_C$ is the measured cell voltage 130, $R_C$ is the cell resistance 213 of the battery cell 105 and battery cell connections, and $I_C$ is the cell current 109 of the battery cell 105. Equation 10 calculates $V_{NL}$ for a cell current 109 flowing from the battery cell 105. Reversing the flow will modify Equation 10. The no load voltage $V_{NL}$ may be similar to the battery open circuit voltage $V_{OC}$, however, often the open circuit voltage $V_{OC}$ requires the battery cell 105 to be at rest for a period of time to allow stabilization of chemical reactions within the battery cell 105.

$$V_{NL}=V_C+(R_C*I_C) \hspace{2cm} \text{Equation 10}$$

In one embodiment, the battery characterization method 708 optionally performs 770 a diagnostic on the battery cell 105. The battery model 260 may employ the measurements of the battery sensors 150 to diagnose failures and potential failures for the battery cell 105. In addition, information from the diagnostic may be included in the battery state 201.

Figure 7G:
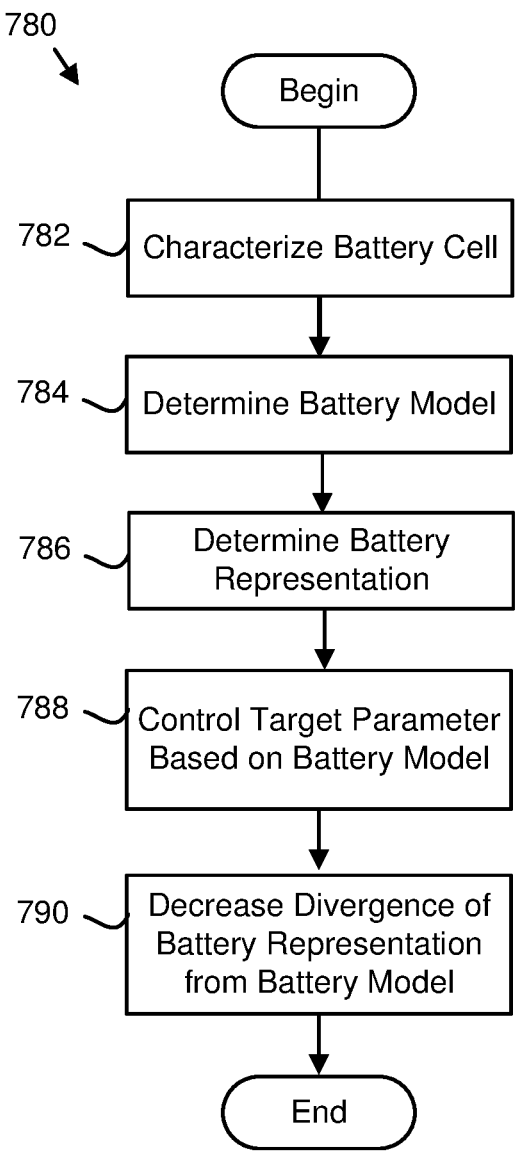
FIG. 7G is a schematic flowchart diagram illustrating one embodiment of a battery model control method.

FIG. 7G is a schematic flowchart diagram illustrating one embodiment of a battery characterization method 780. The battery characterization method 780 may determine the battery state 201. The battery characterization method 780 may be performed by the battery state module 302, which may be in the battery controller 111 and/or the central controller 160. In a certain embodiment, the battery characterization method 780 is performed by a processor. In addition, the battery characterization method 780 may be performed by computer readable storage medium storing code.

The battery characterization method 780 begins and characterizes 782 the battery cell 105, for example, as described in the battery characterization method 708 of FIG. 7F. In addition, the battery characterization method 780 may determine 784 the battery model data 261 for the battery cell 105. The battery characterization method 780 may determine 786 the battery state 201 in response to inputs from one or more of a temperature sensor, an optical sensor, a voltage sensor, a current sensor, a pH sensor, a strain sensor, a pressure sensor, and/or a gas composition sensor. For example, the battery characterization method 780 may determine the battery state 201 based on the cell temperature 217, optical data 262, cell voltage 130, cell current 109, pH data 264 before, strain data 266, pressure data 268, and/or gas composition data 270. The battery characterization method 780 may control 788 the target parameter based on the battery model data 261. In one embodiment, the battery characterization method 780 controls 788 the target parameter to decrease 790 a rate of divergence of the battery state 201 from the battery model data 261 and the battery characterization method 780 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a battery state module that determines a battery state of each battery cell of a plurality of battery cells forming a battery unit, a battery state of a battery cell comprising a health of the battery cell, wherein a battery state of at least one battery cell of the battery unit differs from a battery state of one or more other battery cells of the battery unit, each battery cell is connected in parallel to a shared bus through a bypass converter, each bypass converter comprising a direct current ("DC")-to-DC converter, each bypass converter providing power from the battery cell to the shared bus;
a charge/discharge modification module that determines, based on the determined battery state of each battery cell of the battery unit, an amount to vary a charging characteristic for each battery cell of the battery unit with respect to a reference charging characteristic, wherein the charging characteristic for each battery cell varies as a function of a reference state; and
a charge/discharge module that adjusts charging and discharging of a battery cell of the battery unit based on the charging characteristic of the battery cell by controlling the bypass converter connected to the battery cell, wherein the charge/discharge modification module populates an objective map for each battery cell of the battery unit, the objective map of a battery cell comprising a target state-of-charge for each value of the reference state between at least a maximum value of the reference state and a minimum value of the reference state.

2. The apparatus of claim 1, wherein the reference state comprises one of voltage of the shared bus, a reference state-of-charge, a reference cell voltage, a reference cell open circuit voltage, a reference cell history, and a reference signal from an equation calculating one or more parameters of the reference state.

3. The apparatus of claim 1, wherein each charging characteristic comprises a maximum target state-of-charge correlated to a maximum value of the reference state.

4. The apparatus of claim 3, wherein the reference charging characteristic comprises a maximum target state-of-charge of a healthiest battery cell of the battery unit correlated to the maximum value of the reference state, wherein the maximum target state-of-charge of the healthiest battery cell is higher than the maximum target state-of-charge of the battery cells of the battery unit other than the healthiest battery cell.

5. The apparatus of claim 4, wherein the maximum target state-of-charge of a battery cell is proportionally related to the maximum target state-of-charge of the healthiest battery cell based on battery state.

6. The apparatus of claim 1, wherein the reference charging characteristic comprises a charging characteristic of an average battery cell, wherein each charging characteristic comprises a maximum target state-of-charge correlated to a maximum value of the reference state, wherein the maximum target state-of-charge of each battery cell is related to the maximum target state-of-charge of the average battery cell based on battery state compared to the battery state of the average battery cell.

7. The apparatus of claim 6, wherein the charging characteristic of the average battery cell comprises one of:

an average battery state based on the battery states of each battery cell of the battery unit; and
a predetermined reference charging characteristic.

8. The apparatus of claim 1, wherein each objective map comprises a same target state-of-charge for a transition value of the reference state, the transition value of the reference state comprising a value of the reference state between the minimum value of the reference state and the maximum value of the reference state.

9. The apparatus of claim 8, further comprising a life control module that determines a maximum target state-of-charge for each battery cell based on the battery state of each battery cell compared to the reference charging characteristic and populates the objective map of each battery cell of the battery unit to have the same target state-of-charge at the transition voltage as the reference charging characteristic and to diverge in target state-of-charge from the reference charging characteristic as the reference state approaches the maximum value of the reference state.

10. The apparatus of claim 9, wherein the objective map for each battery cell of the battery unit diverges linearly from the same target state-of-charge at the transition value of the reference state to the maximum target state-of-charge of each battery cell of the battery unit.

11. The apparatus of claim 8, further comprising a power optimized balancing module that determines values for the objective map for a battery cell of the battery unit based on an internal resistance of the battery cell, wherein the target state-of-charge for a particular reference state below the transition value of the reference state is correlated to a battery cell voltage at or above a minimum battery cell voltage plus a voltage drop across the internal resistance of the battery cell at a maximum battery cell current.

12. The apparatus of claim 11, wherein the power optimized balancing mode module determines a minimum target state-of-charge corresponding to the minimum value of the reference state based on the internal resistance of the battery cell, wherein the minimum target state-of-charge of the battery cell is determined to maintain the battery cell voltage at the minimum battery cell voltage, while the reference state is at the minimum value of the reference state, accounting for voltage drop across the internal resistance while current for the battery cell is at a maximum cell current, wherein the power optimized balancing mode module populates the objective map of the battery cell to transition linearly between the minimum target state-of-charge and the same target state-of-charge at the transition value of the reference state.

13. The apparatus of claim 1, wherein the charge/discharge modification module determines the amount to vary the charging characteristic of a battery cell of the battery unit based on a current age of the battery cell and a target end-of-life age of a reference battery cell associated with the reference charging characteristic and a difference between a capacity of the battery cell and the reference battery cell at the current age of the battery cell and the reference battery cell.

14. The apparatus of claim 13, wherein the charge/discharge modification module adjusts a maximum target state-of-charge of the battery cell to minimize a projected difference between the capacity of the battery cell and the capacity of the reference battery cell at the target end-of-life age of the reference battery cell.

15. The apparatus of claim 1, wherein the charge/discharge module of a battery cell of the battery unit controls the bypass converter for the battery cell to adjust charging and discharging the battery cell based on the charging characteristic of the battery cell.

16. The apparatus of claim 15, wherein the bypass converter comprises at least one dual active bridge converter stage.

17. The apparatus of claim 15, wherein each bypass converter is controlled by a separate charge/discharge module and autonomously controls charging and discharging of the connected battery cell independent of other bypass converters and associated charge/discharge modules of other battery cells of the battery unit, wherein each charge/discharge module adjusts charging and discharging based on the charging characteristic for the associated battery cell as determined by the charge/discharge modification module.

18. The apparatus of claim 17, wherein each charge/discharge module further comprises a droop controller that provides a control characteristic for each bypass converter for control of output voltage of each bypass converter, wherein the control characteristic comprises a ratio of output voltage of the bypass converter to output current of the bypass converter, the ratio comprising a value wherein output voltage of the bypass converter decreases as output current of the bypass converter decreases and the bypass converters connected to the shared bus each contribute current to the shared bus based on the charging characteristic of the respective bypass converters while output voltage of each bypass converter remains within a voltage regulation range.

19. The apparatus of claim 1, wherein the battery state module determines the battery state of a battery cell based on a battery model and input from one or more battery sensors, the battery model describes properties of the battery cells of the battery unit comprising one or more of chemical properties, electrical properties, thermal properties, and physical properties, the one or more battery sensors comprising one or more of a temperature sensor, an optical sensor, a voltage sensor, a current sensor, a pH sensor, a strain sensor, a pressure sensor, and a gas composition sensor.

20. The apparatus of claim 1, wherein at least a portion of the battery cells of the battery unit are connected in series and form a high voltage bus, the high voltage bus connected to one or more high voltage loads of an electric vehicle and wherein the shared bus feeds one or more of a battery and an auxiliary load at a voltage lower than a voltage of the high voltage bus.

21. A method comprising:
determining a battery state of each battery cell of a plurality of battery cells forming a battery unit, a battery state of a battery cell comprising a health of the battery cell, wherein a battery state of at least one battery cell of the battery unit differs from a battery state of one or more other battery cells of the battery unit, each battery cell is connected in parallel to a shared bus through a bypass converter, each bypass converter comprising a DC-to-DC converter, each bypass converter providing power from the battery cell to the shared bus;
determining, based on the determined battery state of each battery cell of the battery unit, an amount to vary a charging characteristic for each battery cell of the battery unit with respect to a reference charging characteristic, wherein the charging characteristic for each battery cell varies as a function of a reference state; and
adjusting charging and discharging of a battery cell of the battery unit based on the charging characteristic of the battery cell by controlling the bypass converter connected to the battery cell, wherein the charge/discharge modification module populates an objective map for each battery cell of the battery unit, the objective map of a battery cell comprising a target state-of-charge for each value of the reference state between at least a maximum value of the reference state and a minimum value of the reference state.

22. The method of claim 21, wherein the reference state comprises one of voltage of the shared bus, a reference state-of-charge, a reference cell voltage, a reference cell open circuit voltage, a reference cell history, and a reference signal from an equation calculating one or more parameters of the reference state.

23. The method of claim 21, wherein each charging characteristic comprises a maximum target state-of-charge correlated to a maximum value of the reference state, the reference charging characteristic comprising a maximum target state-of-charge of a healthiest battery cell of the battery unit correlated to the maximum value of the reference state, wherein the maximum target state-of-charge of the healthiest battery cell is higher than the maximum target state-of-charge of the battery cells of the battery unit other than the healthiest battery cell.

24. The method of claim 21, further comprising populating an objective map for each battery cell of the battery unit, the objective map of a battery cell comprising a target state-of-charge for each value of the reference state between at least a maximum value of the reference state and a minimum value of the reference state.

25. The method of claim 24, further comprising determining a maximum target state-of-charge for each battery cell based on the battery state of each battery cell compared to the reference charging characteristic and populating the objective map of each battery cell of the battery unit to have the same target state-of-charge at a transition value of the reference state as the reference charging characteristic and to diverge in target state-of-charge from the reference charging characteristic as the reference state approaches the maximum value of the reference state, wherein the objective map for each battery cell of the battery unit diverges linearly from the same target state-of-charge at the transition value of the reference state to the maximum target state-of-charge of each battery cell of the battery unit.

26. The method of claim 24, further comprising determining values for the objective map for a battery cell of the battery unit based on an internal resistance of the battery cell, wherein the target state-of-charge for a particular value of the reference state below a transition value of the reference state is determined to be at or above a minimum battery cell voltage plus a voltage drop across the internal resistance of the battery cell at a maximum discharge battery cell current.

27. The method of claim 26, further comprising determining a minimum target state-of-charge corresponding to the minimum value of the reference state based on the internal resistance of the battery cell, wherein the minimum target state-of-charge of the battery cell is determined to maintain the battery cell voltage at the minimum battery cell voltage, while the reference state is at the minimum value of the reference state, accounting for voltage drop across the internal resistance while current for the battery cell is at a maximum cell current, and populating the objective map of the battery cell to transition linearly between the minimum target state-of-charge and the same target state-of-charge at the transition value of the reference state.

28. The method of claim 21, wherein determining the amount to vary the charging characteristic of a battery cell of the battery unit is based on a current age of the battery cell and a target end-of-life age of a reference battery cell associated with the reference charging characteristic and a difference between a capacity of the battery cell and the reference battery cell at the current age of the battery cell and the reference battery cell.

29. The method of claim 28, further comprising adjusting a maximum target state-of-charge of the battery cell to minimize a projected difference between the capacity of the battery cell and the capacity of the reference battery cell at the target end-of-life age of the reference battery cell.

30. A system comprising:
- a plurality of direct current ("DC") to DC bypass converters, each bypass converter connected to a battery cell of a plurality of battery cells forming a battery unit, and to a shared bus, the battery unit providing power to a load, each bypass converter connected in parallel to the shared bus and each bypass converter providing power from the battery cell to a shared bus;
- a battery state module that determines a battery state of each battery cell of the battery unit, a battery state of a battery cell comprising a health of the battery cell, wherein a battery state of at least one battery cell of the battery unit differs from a battery state of one or more other battery cells of the battery unit;
- a charge/discharge modification module that determines, based on the determined battery state of each battery cell of the battery unit, an amount to vary a charging characteristic for each battery cell of the battery unit with respect to a reference charging characteristic, wherein the charging characteristic for each battery cell varies as a function of a reference state; and
- a charge/discharge module that adjusts charging and discharging of a battery cell of the battery unit based on the charging characteristic of the battery cell by controlling the bypass converter connected to the battery cell, wherein the charge/discharge modification module populates an objective map for each battery cell of the battery unit, the objective map of a battery cell comprising a target state-of-charge for each value of the reference state between at least a maximum value of the reference state and a minimum value of the reference state.

31. The system of claim 30, further comprising one or more of the battery unit and the shared bus, wherein the shared bus provides power to one or more of a shared bus battery and an auxiliary load.

* * * * *